US008352341B1

(12) United States Patent
Greenberg et al.

(10) Patent No.: US 8,352,341 B1
(45) Date of Patent: Jan. 8, 2013

(54) METHOD AND SYSTEM FOR MANAGING WORKFORCE MOBILITY WITHIN A BUSINESS ENTITY

(75) Inventors: Barbara N. Greenberg, Portland, OR (US); Sabrina M. Jetton, Portland, OR (US)

(73) Assignee: Relocation Management, LLC, Portland, OR (US)

( * ) Notice: Subject to any disclaimer, the term of this patent is extended or adjusted under 35 U.S.C. 154(b) by 962 days.

(21) Appl. No.: 12/024,019

(22) Filed: Jan. 31, 2008

Related U.S. Application Data

(60) Provisional application No. 60/887,768, filed on Feb. 1, 2007.

(51) Int. Cl.
*G06F 15/02* (2006.01)
*G07C 1/10* (2006.01)

(52) U.S. Cl. ........................................................ 705/35

(58) Field of Classification Search .................... 705/1.1
See application file for complete search history.

(56) References Cited

U.S. PATENT DOCUMENTS

| | | | | |
|---|---|---|---|---|
| 4,108,356 | A | 8/1978 | Bengtson | |
| 4,451,067 | A | 5/1984 | Williams | |
| 4,700,297 | A | 10/1987 | Hagel, Sr. et al. | |
| 4,776,799 | A | 10/1988 | Walsh | |
| 4,859,187 | A | 8/1989 | Peterson | |
| 5,338,202 | A | 8/1994 | Saari | |
| 5,577,915 | A | 11/1996 | Feldman | |
| 5,687,971 | A | 11/1997 | Khaladkar | |
| 5,918,219 | A | 6/1999 | Isherwood | |
| 6,049,781 | A | 4/2000 | Forrest et al. | |
| 6,237,915 | B1 | 5/2001 | Ledet et al. | |
| 6,315,484 | B1 | 11/2001 | Oates, Jr. | |
| 6,442,527 | B1 * | 8/2002 | Worthington | 705/7.19 |
| 6,443,453 | B1 | 9/2002 | Wallice | |
| 6,567,941 | B1 * | 5/2003 | Turnquist et al. | 714/724 |
| 6,750,885 | B1 * | 6/2004 | Finch et al. | 715/777 |
| 6,766,334 | B1 | 7/2004 | Kaler et al. | |
| 6,767,215 | B2 | 7/2004 | Robertson | |
| 6,817,613 | B2 | 11/2004 | Hasek | |

(Continued)

OTHER PUBLICATIONS

Provided by Federal Information & News Dispatch, Inc. (FIND) 202-544-4800. "Systems Engineering and Configuration MGMT MH53 ISEO Support Norfolk VA :[1]." Commerce Business Daily : Issue: PSA-2777 Feb. 2, 2001,Research Library, ProQuest. Web. Jul. 29, 2012.*

Barbara N. Greenberg Declaration under 37 CFR 1.132 describing the relocation services provided by her company, Relocation Management, LLC, dated Jul. 11, 2008, 19 pages.

(Continued)

*Primary Examiner* — Seye Iwarere
(74) *Attorney, Agent, or Firm* — Stoel Rives LLP

(57) ABSTRACT

The present disclosure is directed toward incorporating corporate culture, change management, and employee morale concerns into a business facilities management process to ensure continuity of operations and revenues when managing a change event. A preferred methodology focuses on flexible and careful consideration of human factors throughout the change process, with frequent status re-assessment and plan re-alignment. A preferred system may allow the user to incorporate existing preferred software tools to manage logistics associated with an office move, and together with an information-based kit, address human factors and provide a form factor solution to facilitate teamwork and buoy employee morale. In a preferred configuration, the relocation kit may simplify the change process and enable managers of change and mobile employees to experience a sense of control, order, calm, and fun.

14 Claims, 92 Drawing Sheets

U.S. PATENT DOCUMENTS 7,010,530 B2 3/2006 Bartkowiak et al.
7,114,719 B2 10/2006 Steenstra et al.
7,774,221 B2 * 8/2010 Miller et al. ................. 705/7.19
7,774,224 B2 * 8/2010 Xiao et al. ................... 705/7.18
2007/0168286 A1 * 7/2007 Nishioka et al. ................ 705/51
2009/0158173 A1 * 6/2009 Palahnuk et al. ............. 715/753

* cited by examiner

©Moreidata 2008

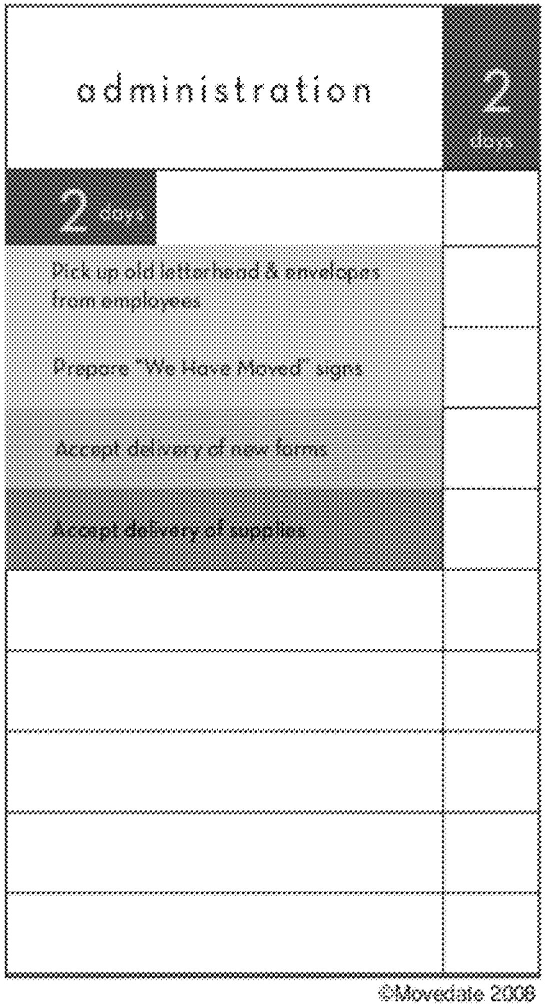
©Movedate 2008
Fig. 8A1
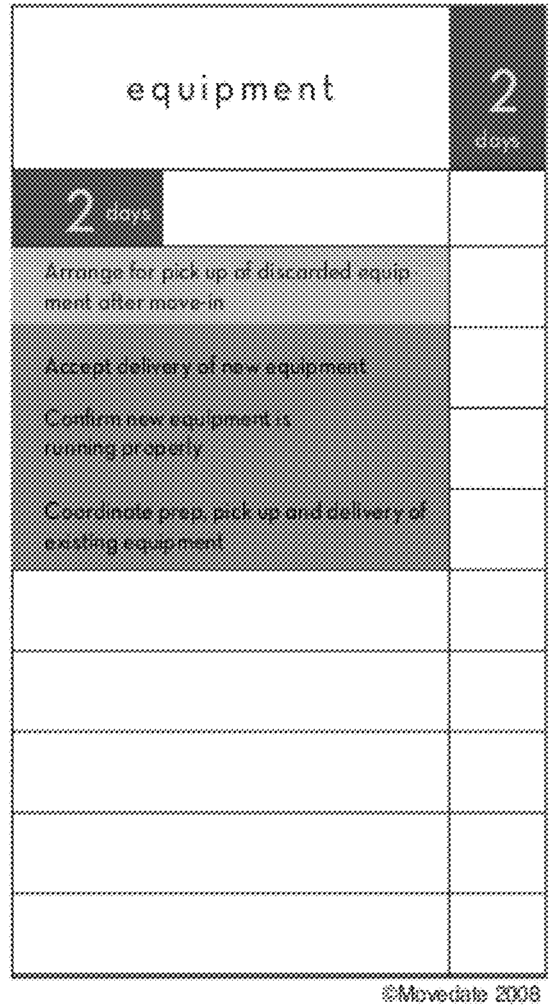
©Movedate 2008
Fig. 8A2

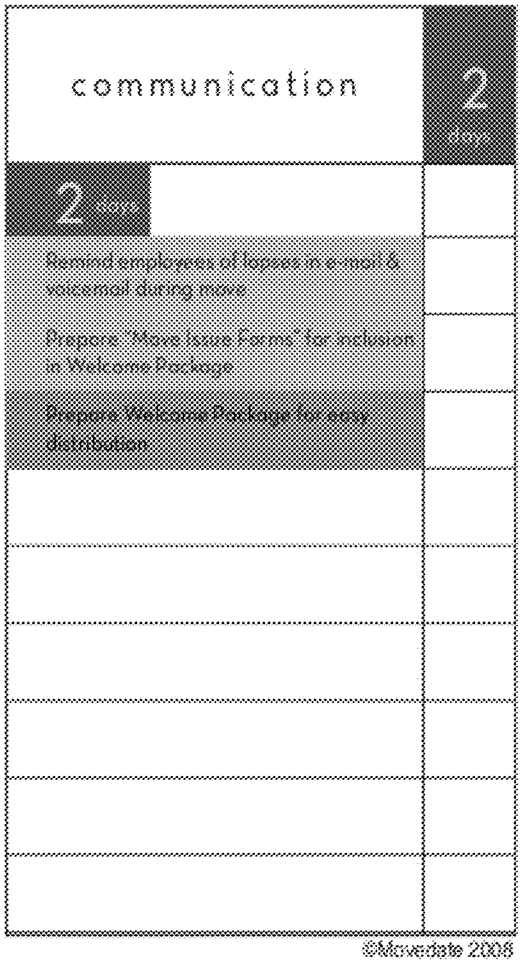
Fig. 8A3
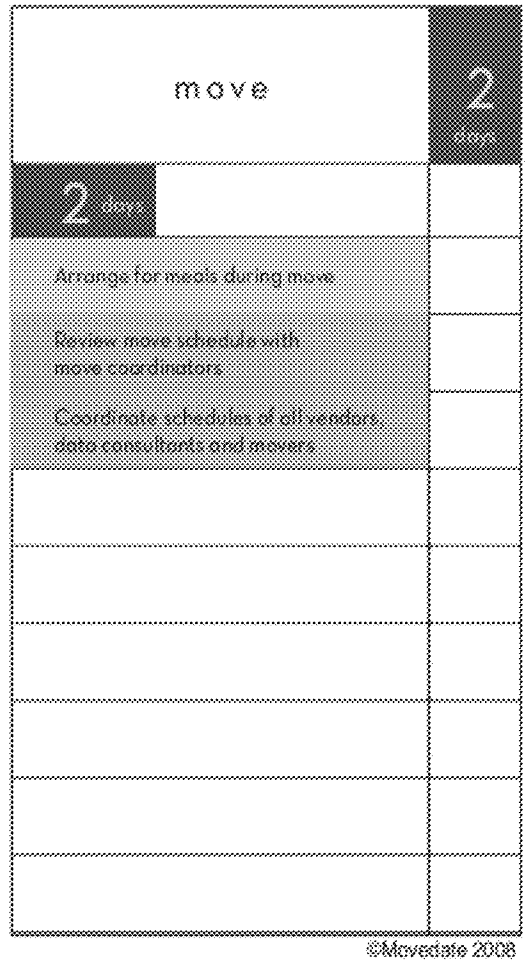
Fig. 8A4

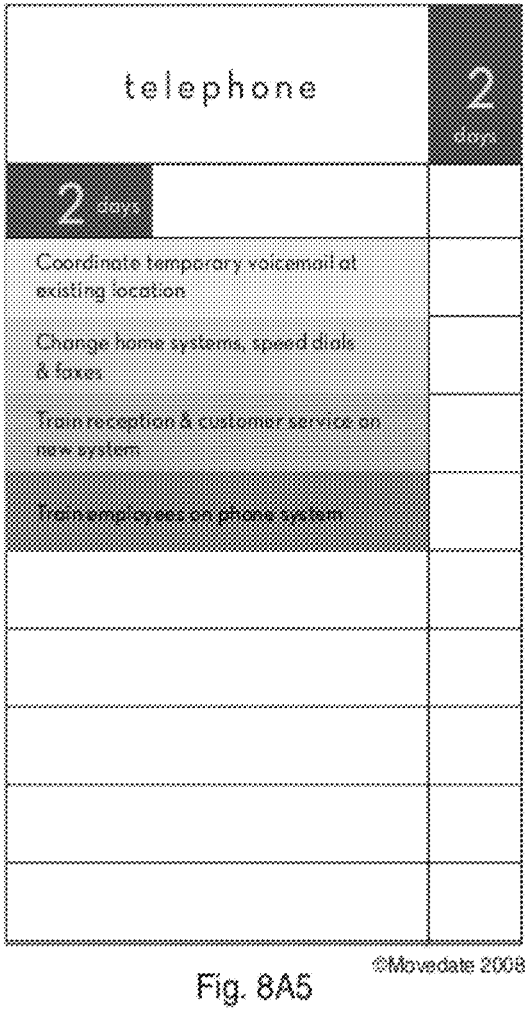
Fig. 8A5
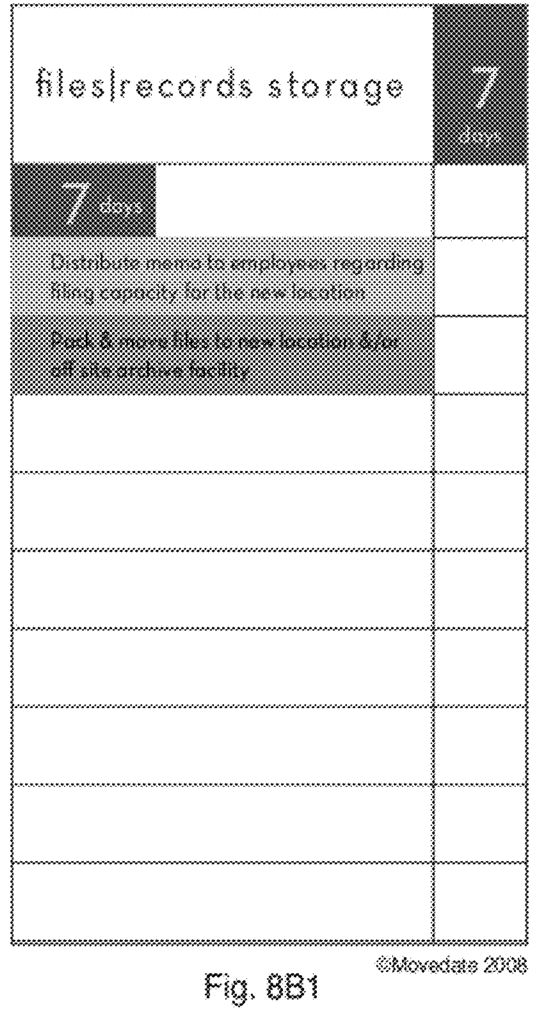
Fig. 8B1

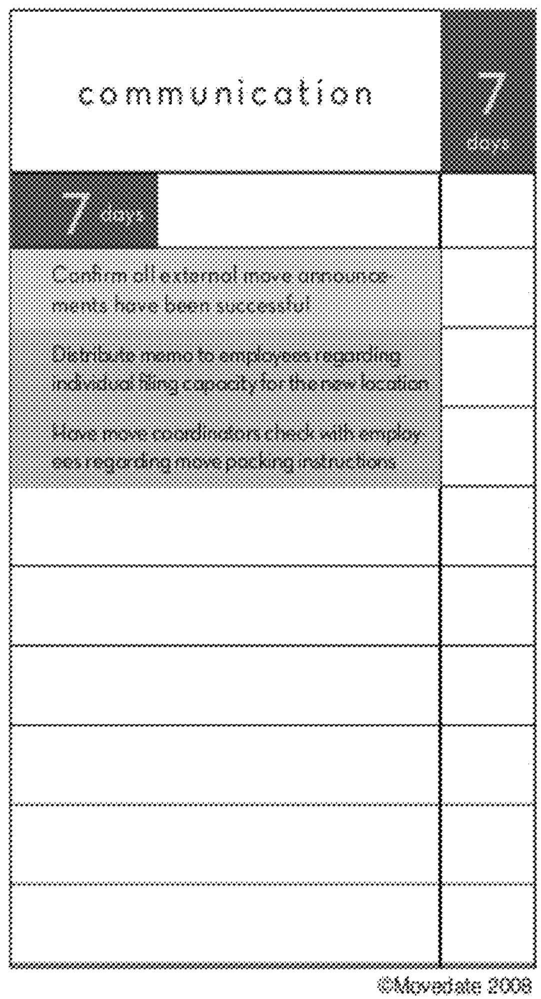
Fig. 8B2
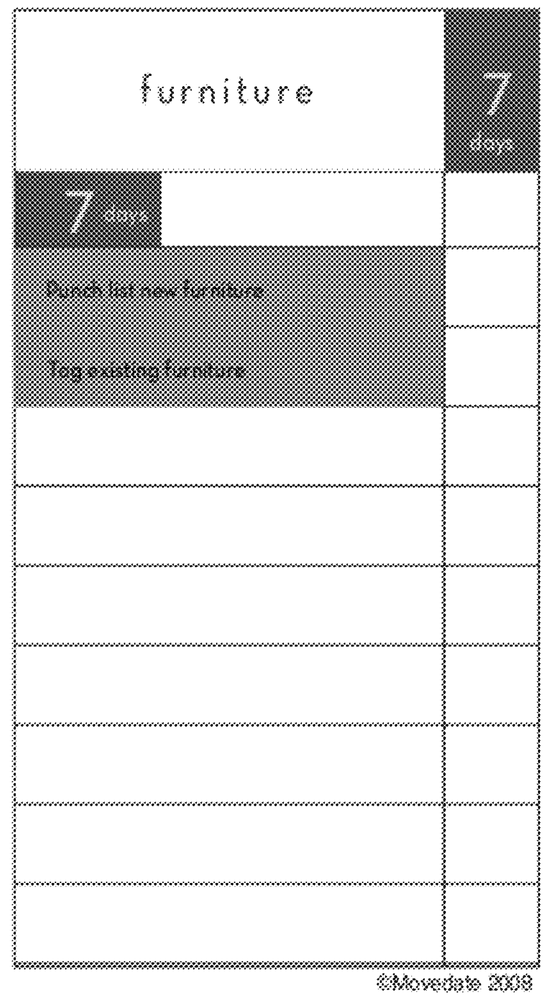
Fig. 8B3

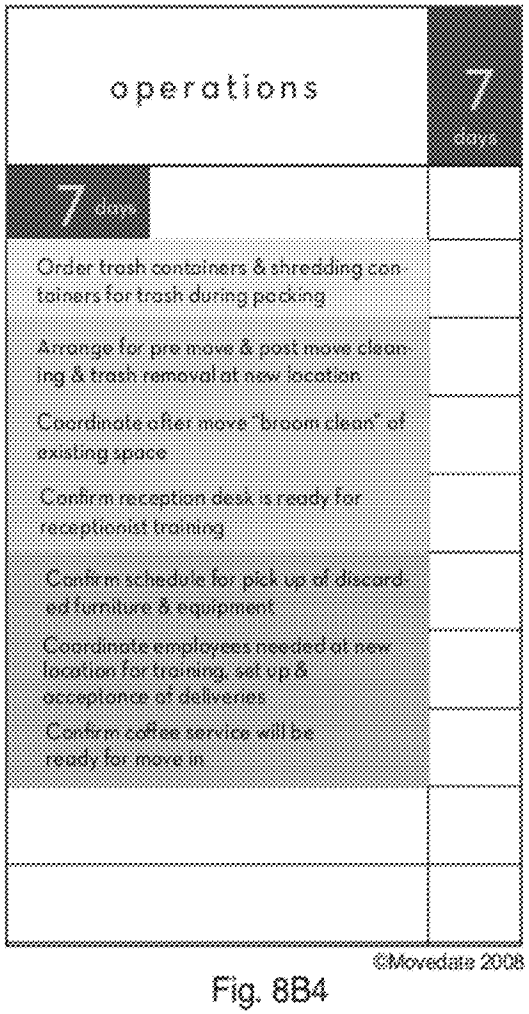
Fig. 8B4
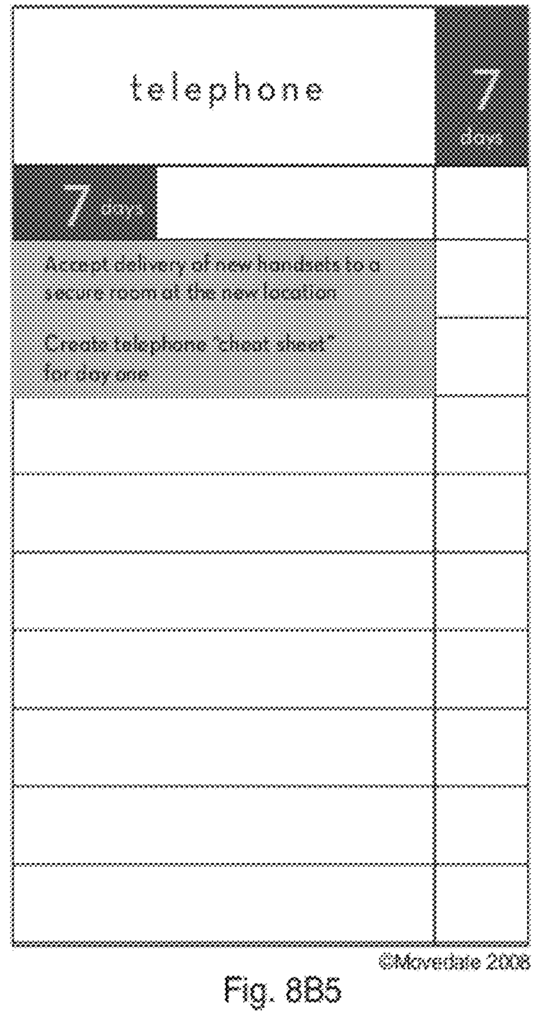
Fig. 8B5

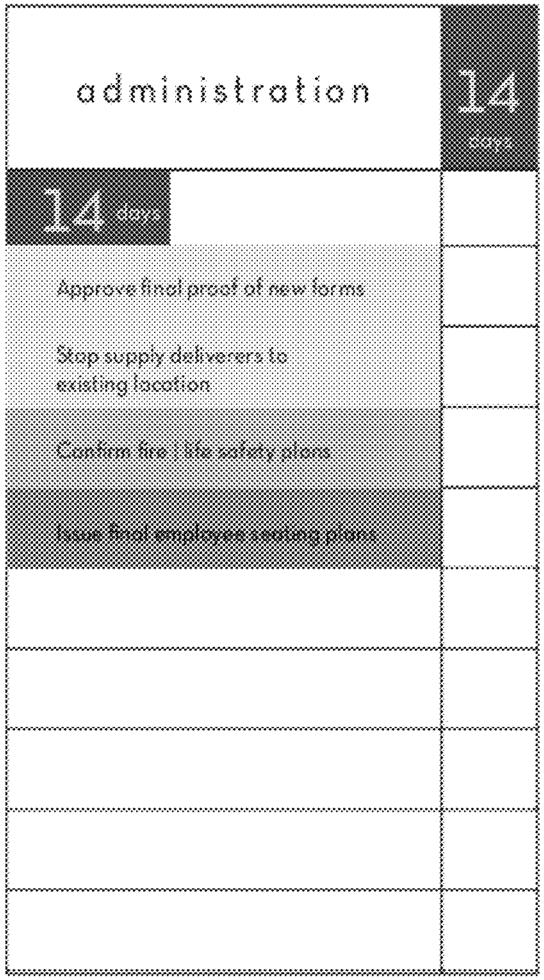
©Movedate 2008
Fig. 8C1
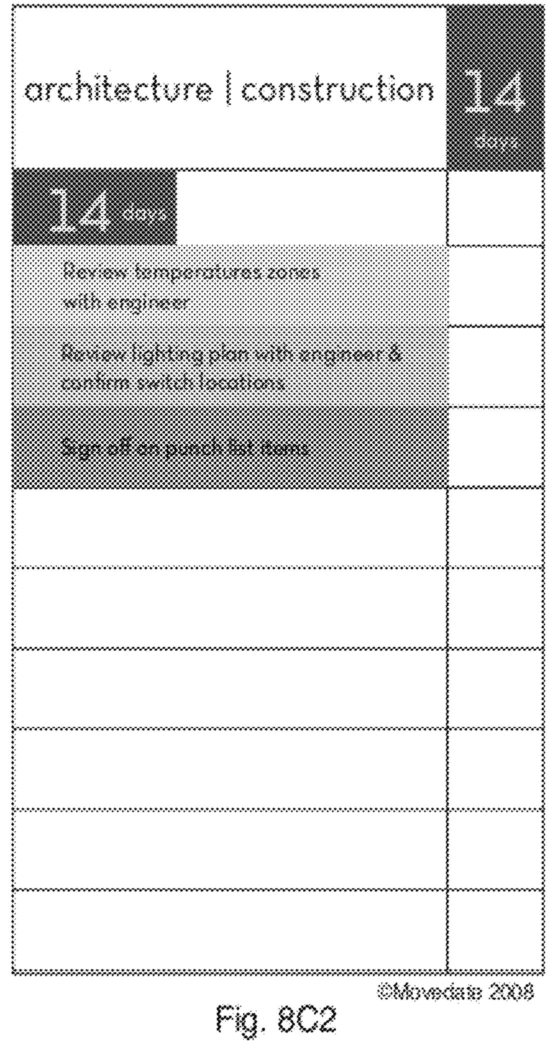
©Movedate 2008
Fig. 8C2

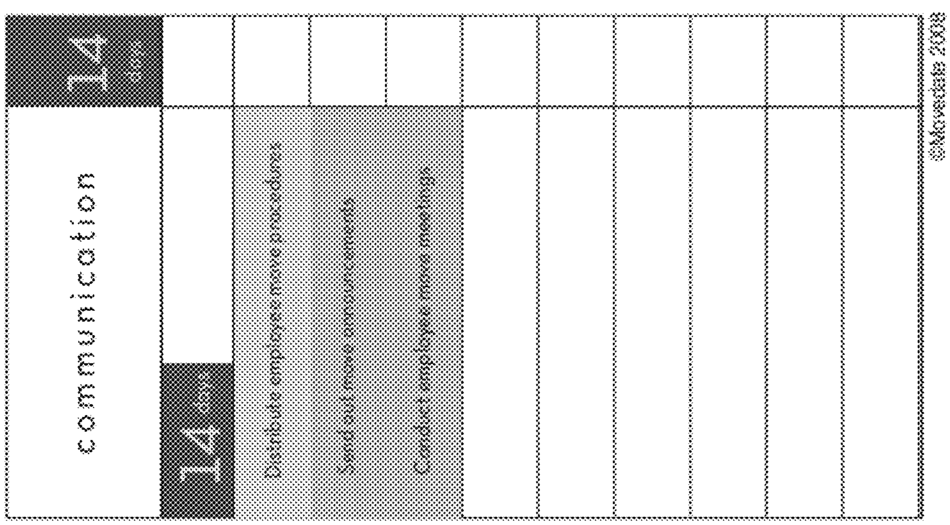
Fig. 8C3
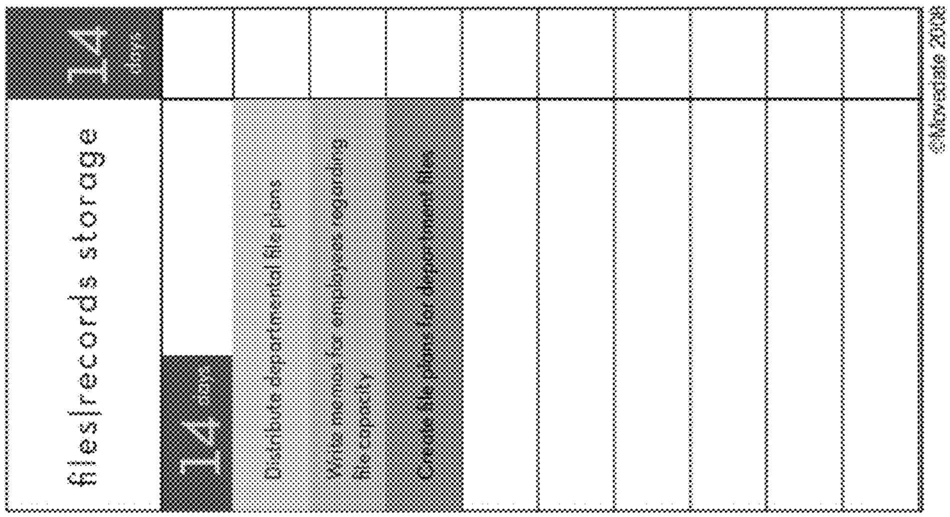
Fig. 8C4

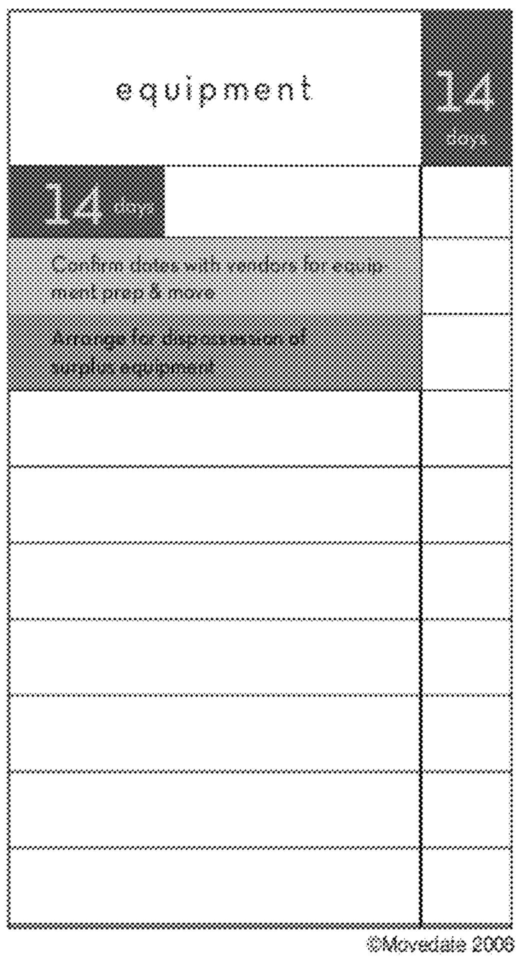
Fig. 8C5
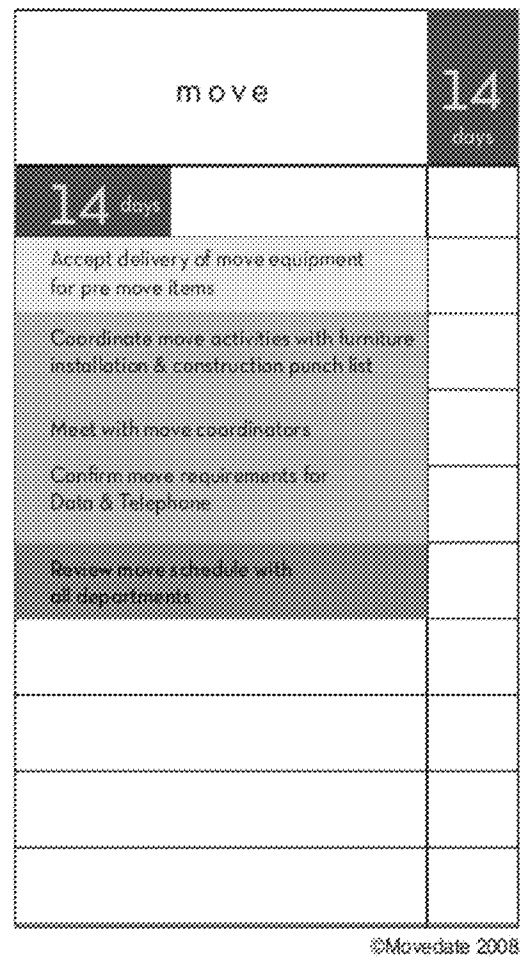
Fig. 8C6

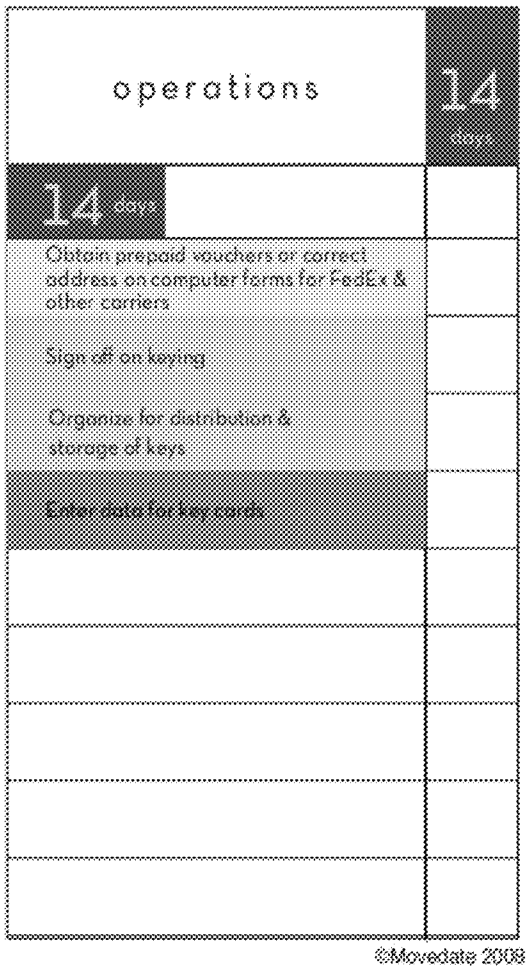
Fig. 8C7
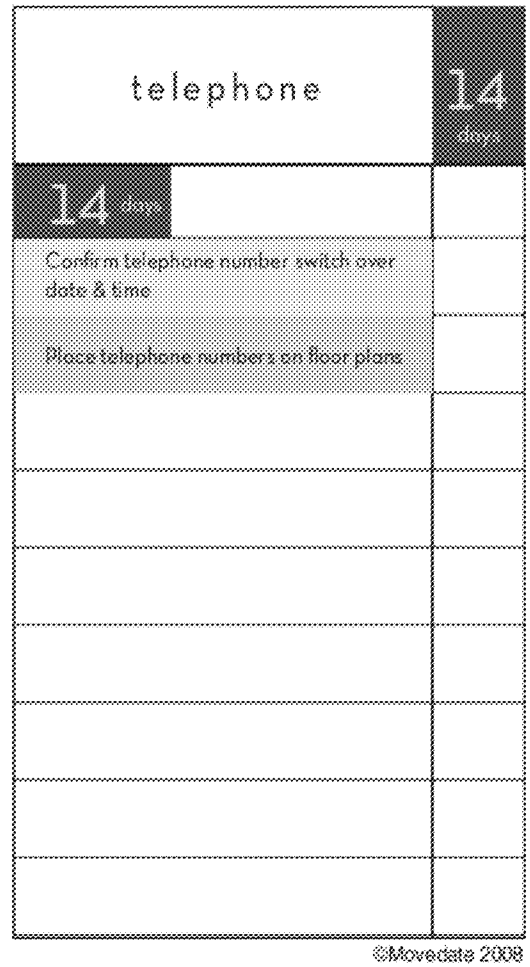
Fig. 8C8

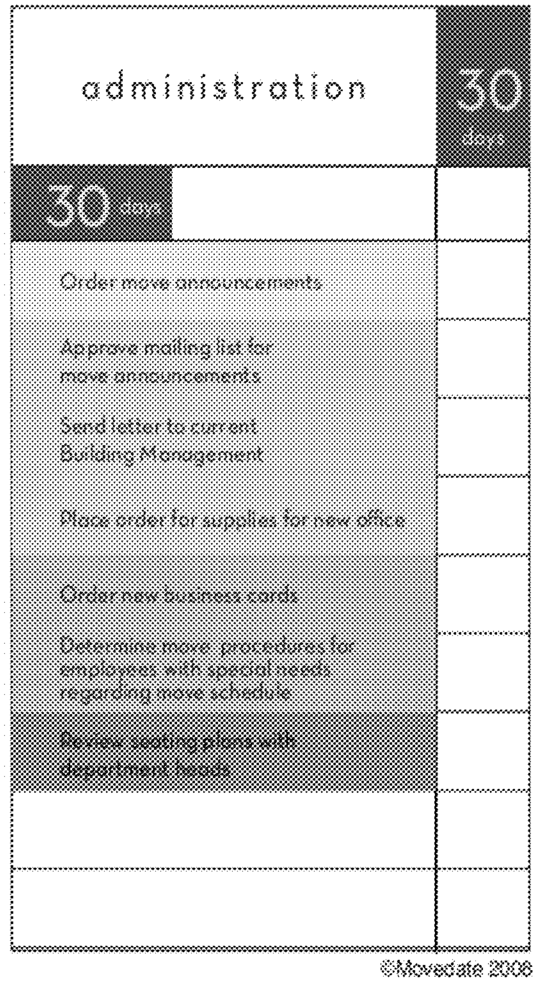
Fig. 8D1
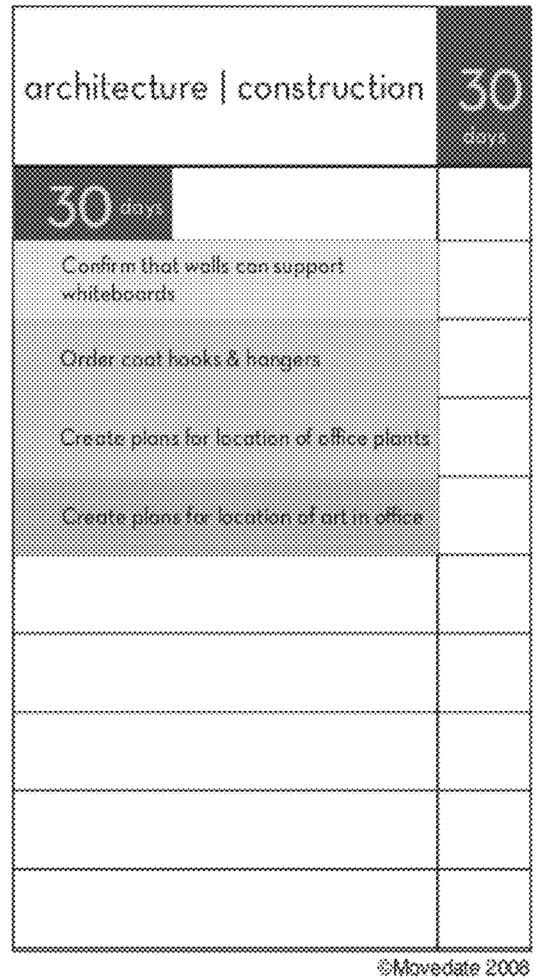
Fig. 8D2

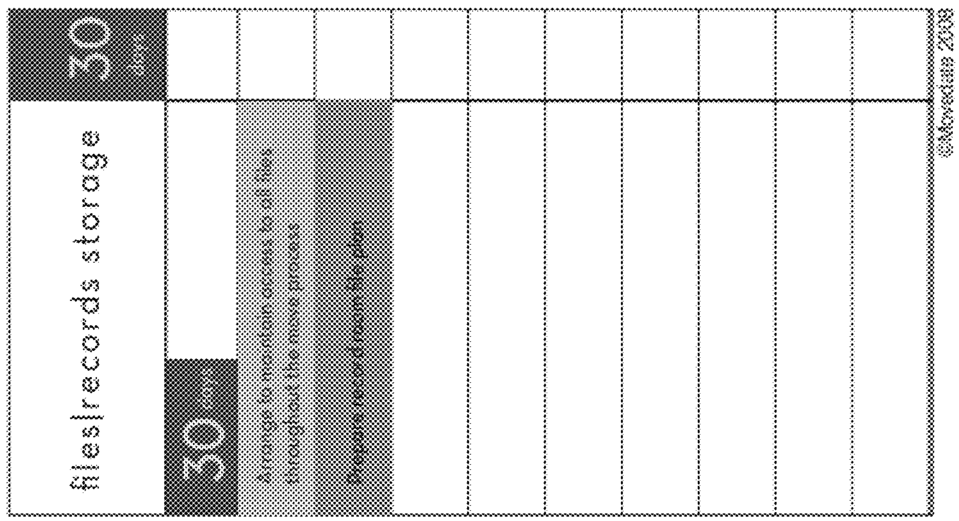
Fig. 8D4
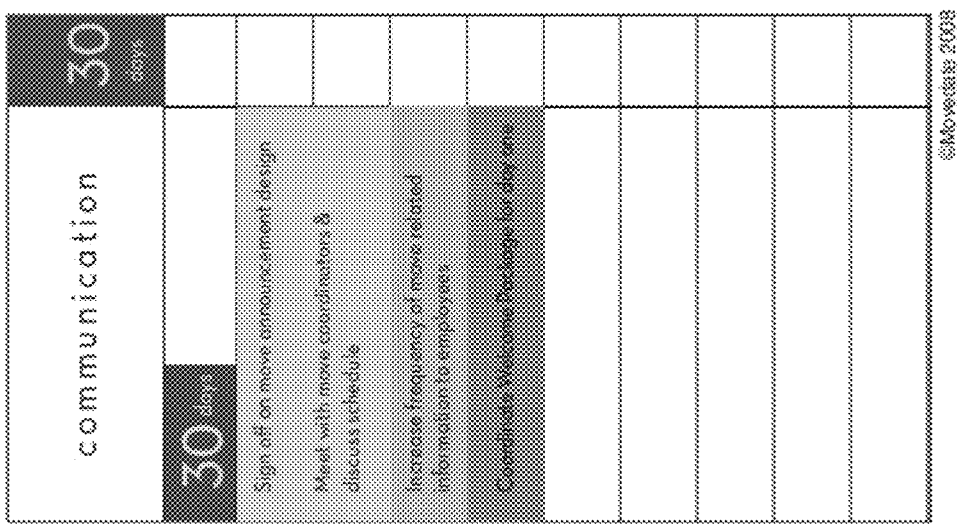
Fig. 8D3

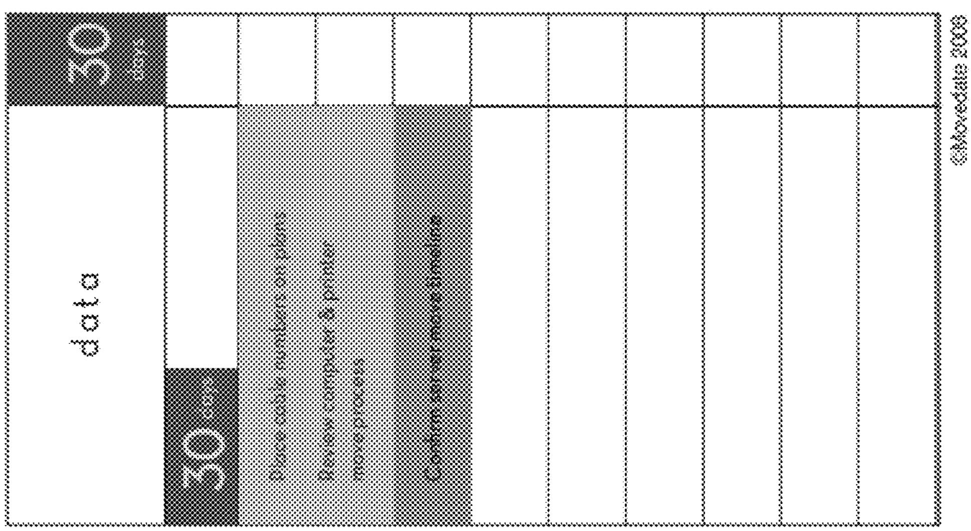
Fig. 8D5
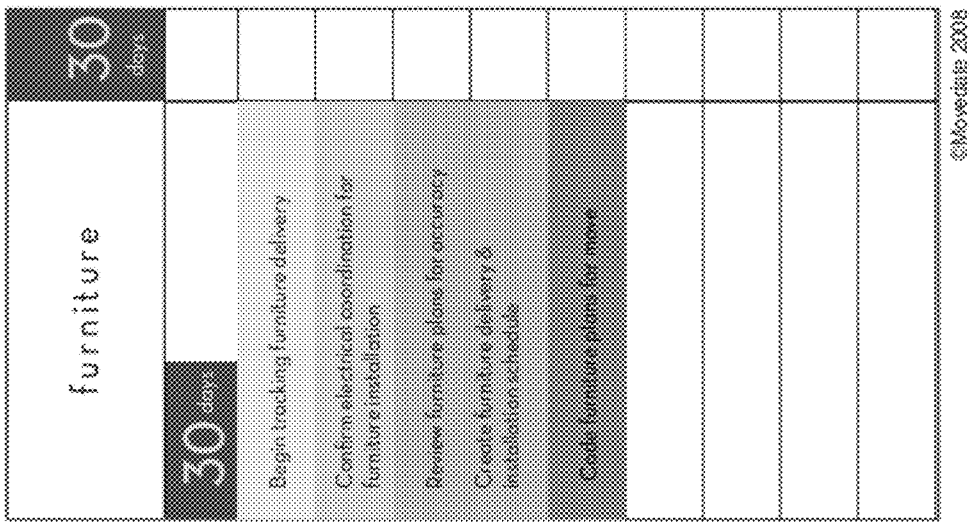
Fig. 8D6

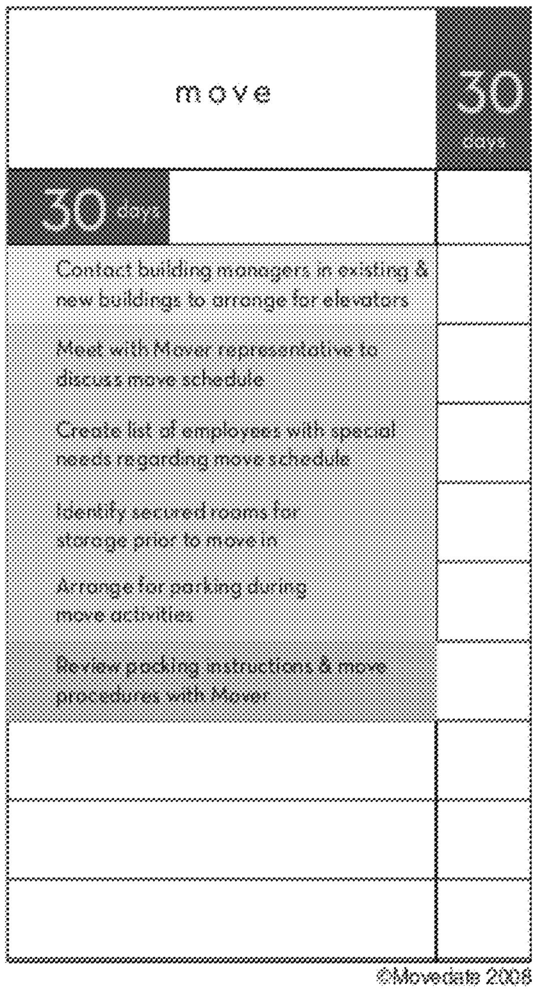
Fig. 8D7
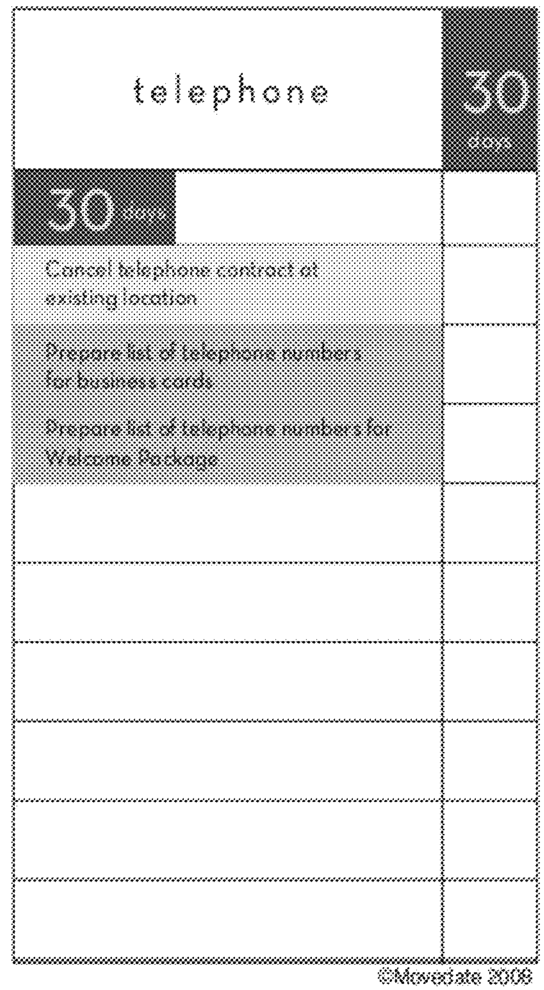
Fig. 8D8

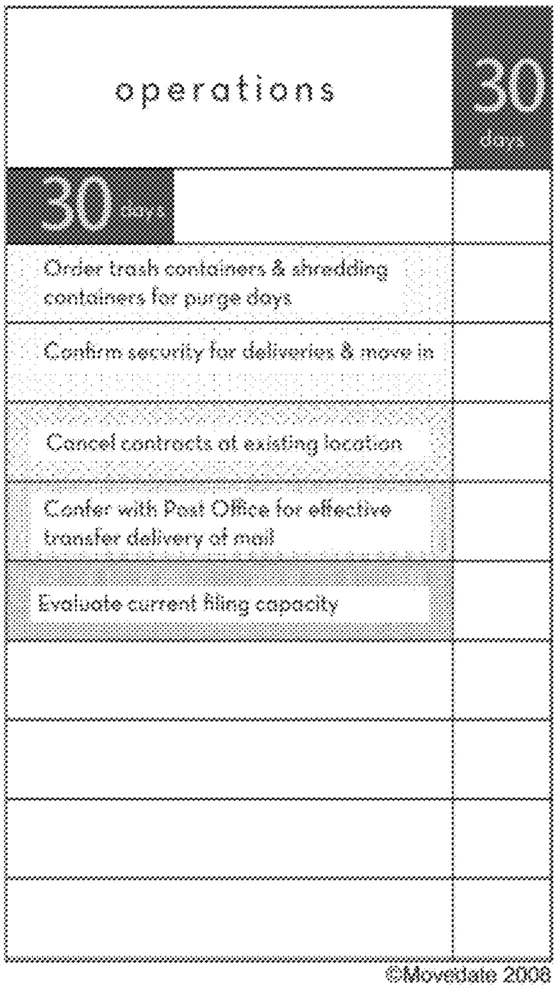
Fig. 8D9
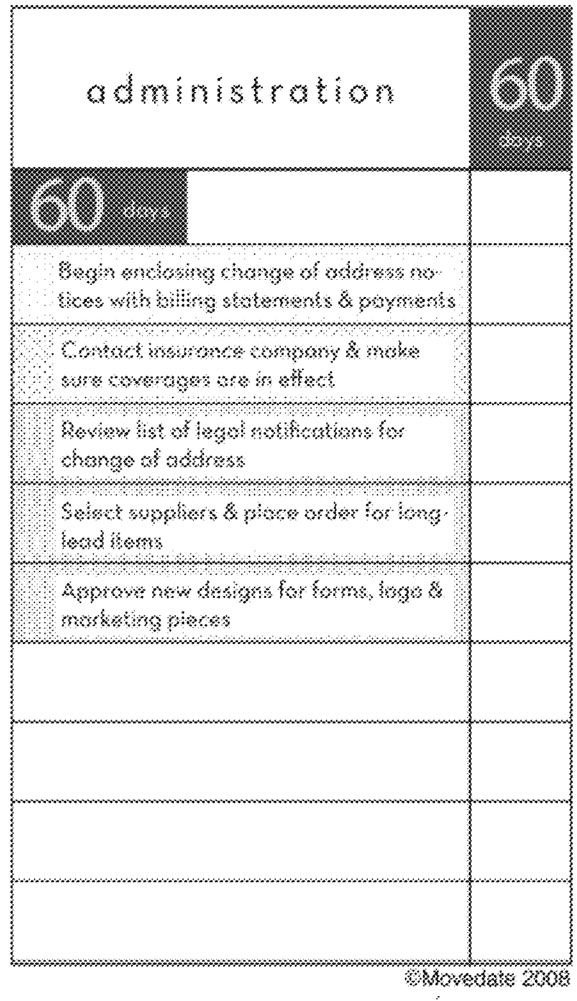
Fig. 8E1

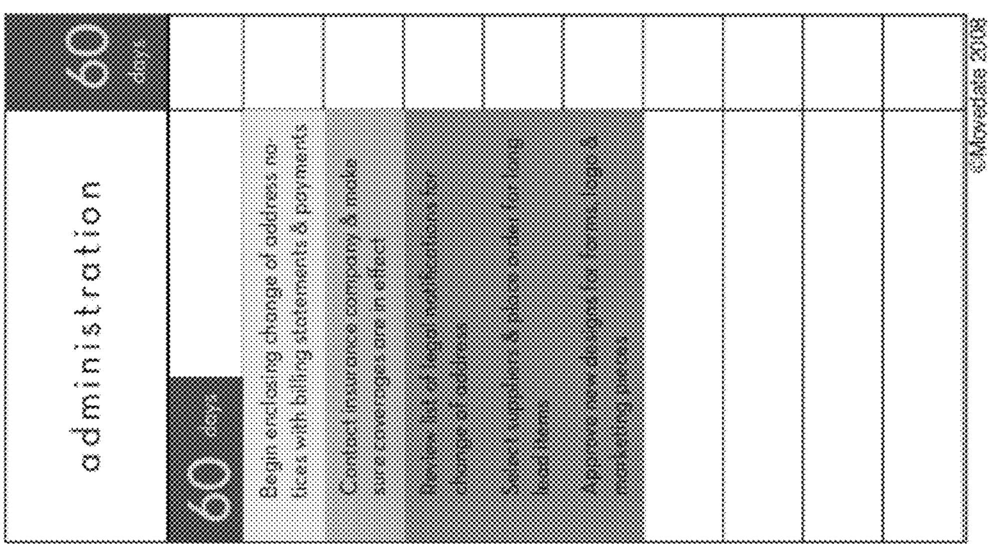
Fig. 8E2
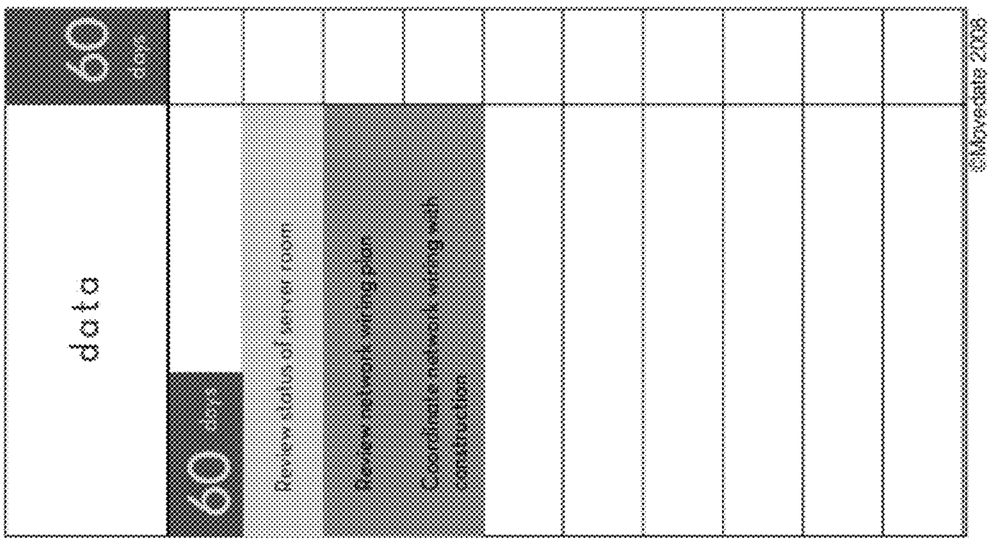
Fig. 8E3

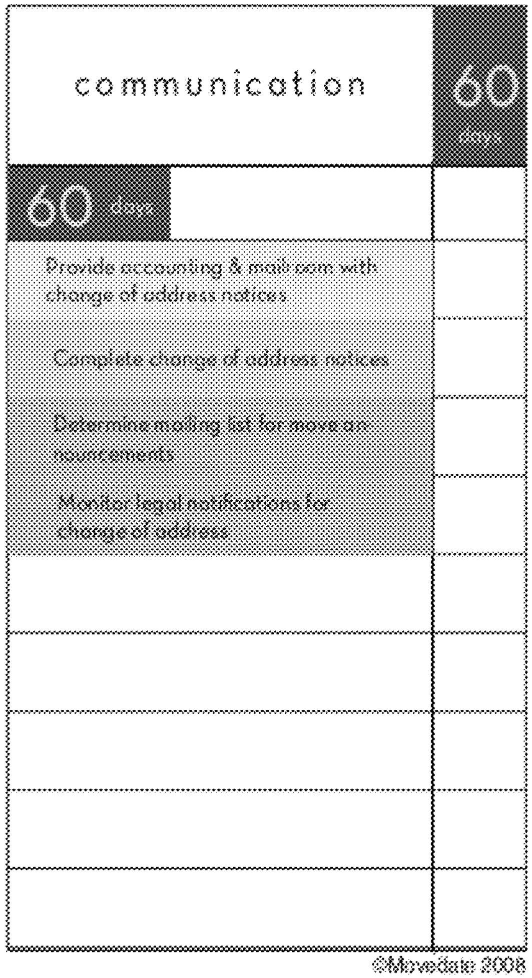
Fig. 8E4
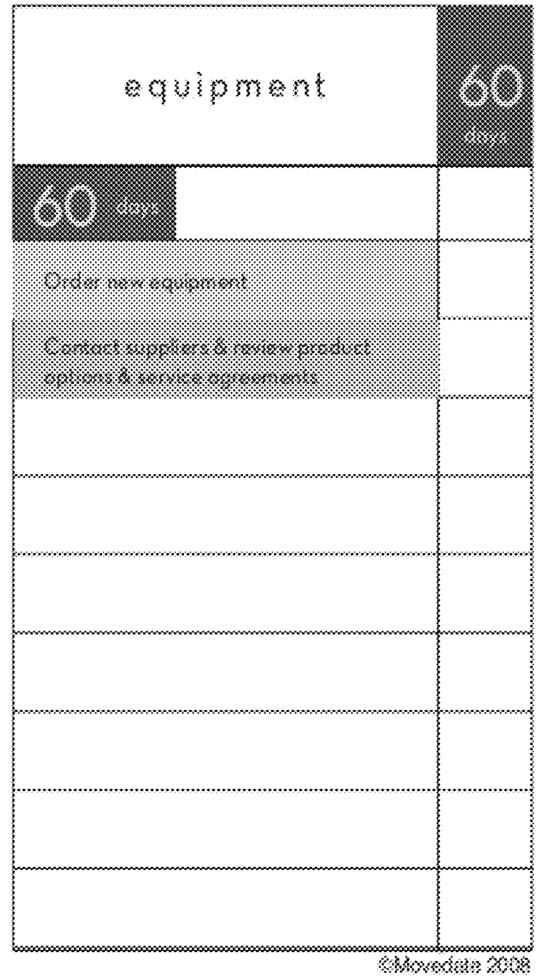
Fig. 8E5

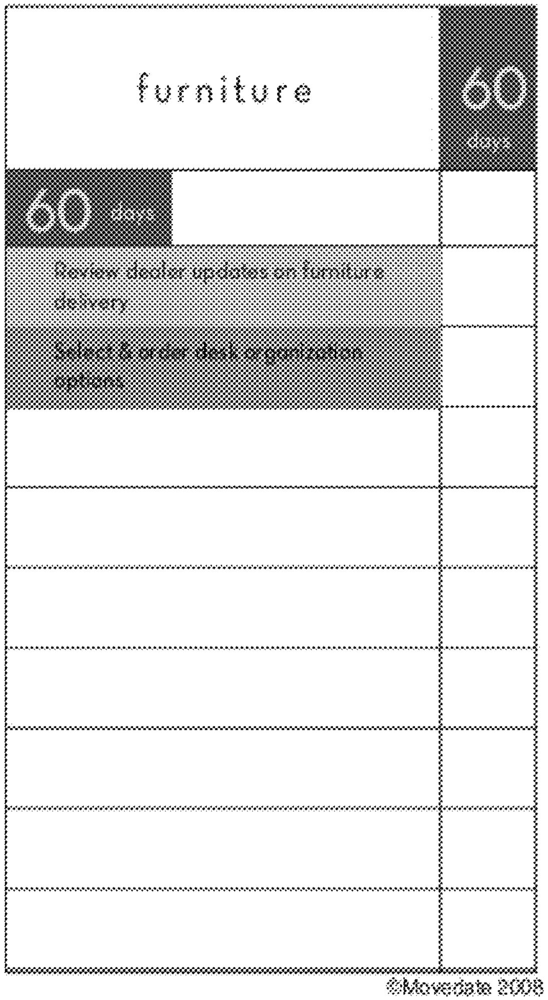
Fig. 8E6
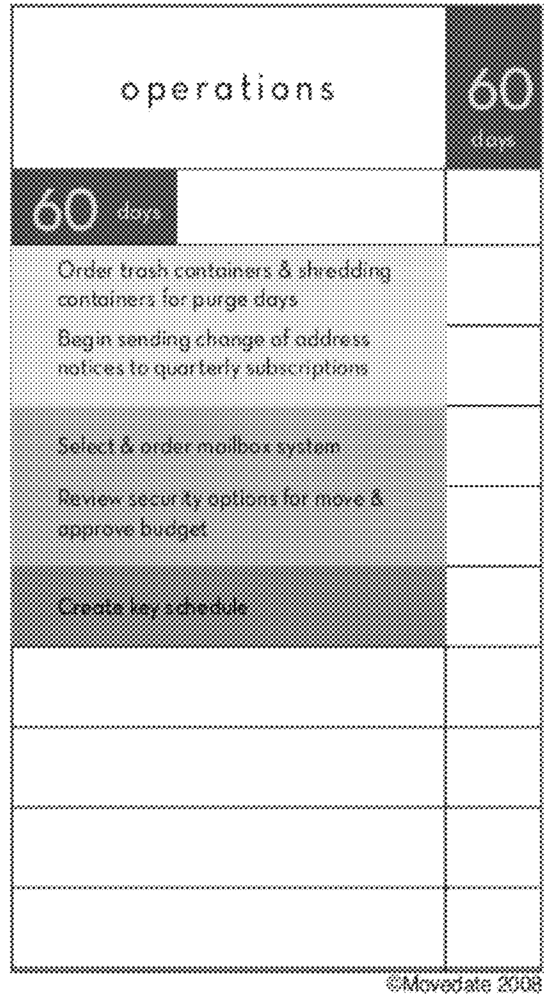
Fig. 8E7

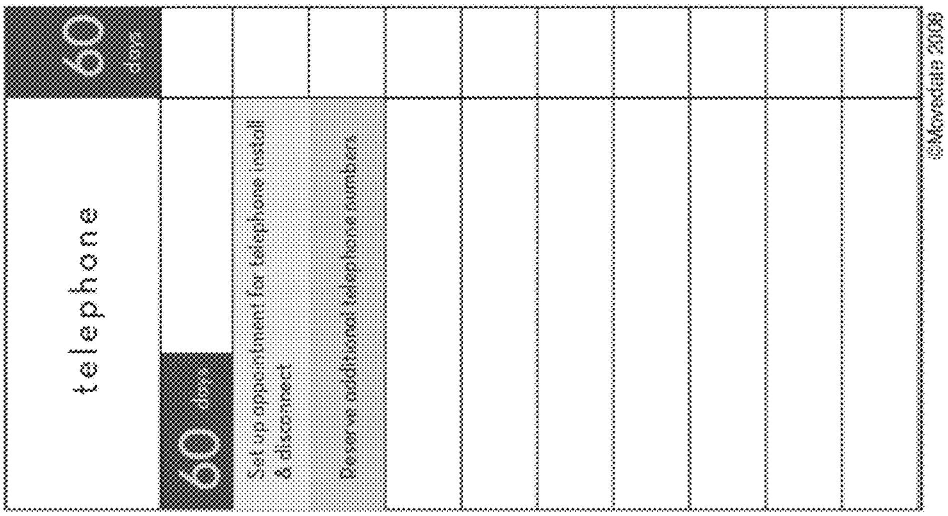
Fig. 8E9
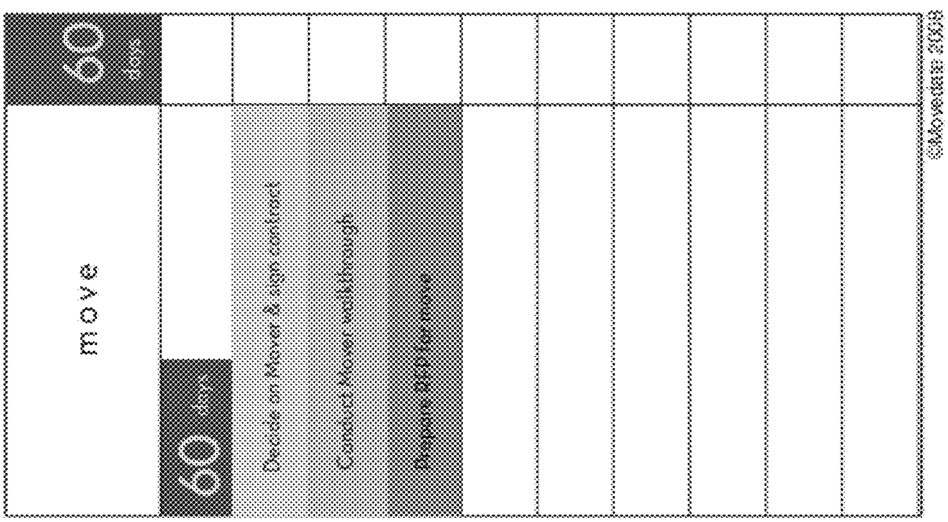
Fig. 8E8

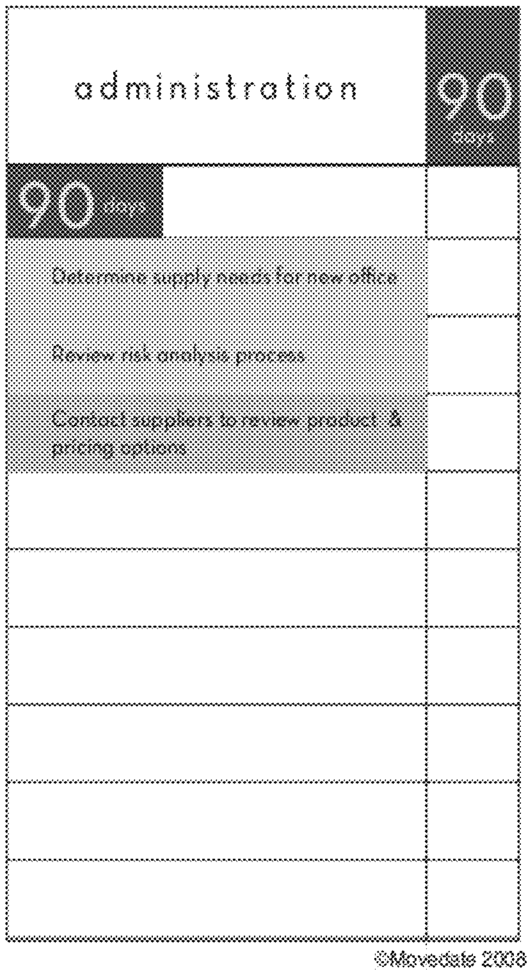
Fig. 8F1
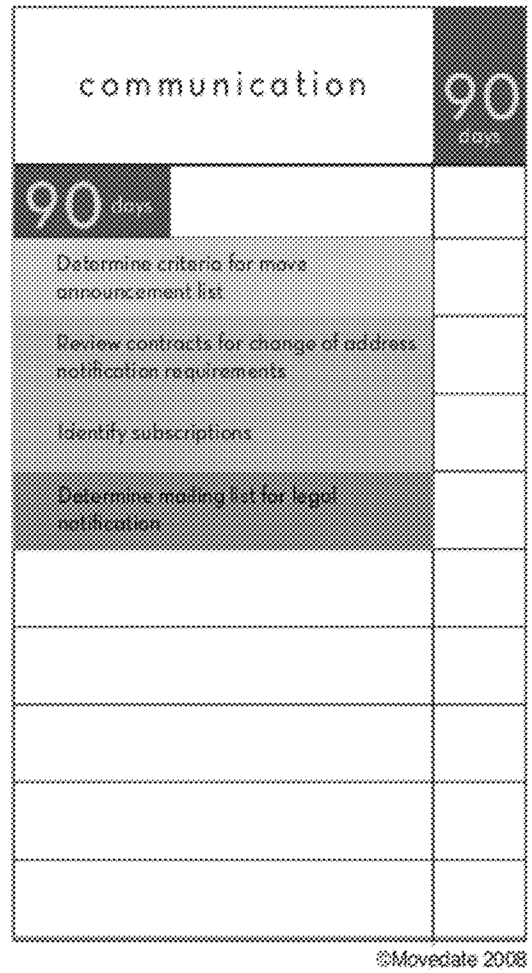
Fig. 8F2

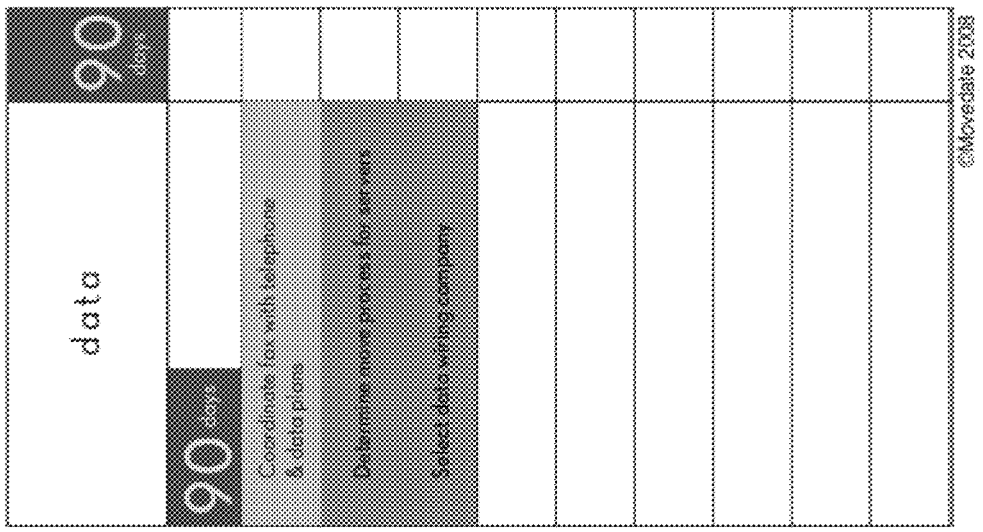
Fig. 8F4
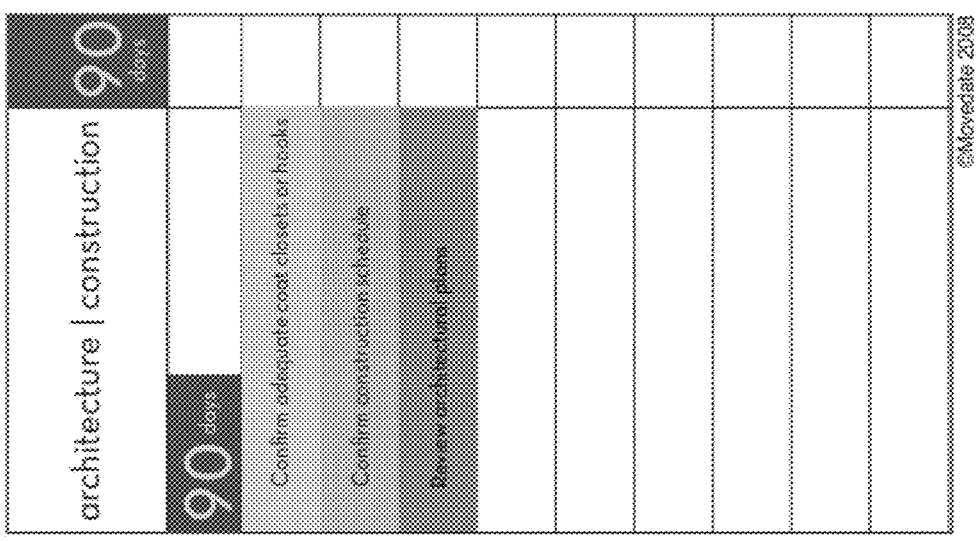
Fig. 8F3

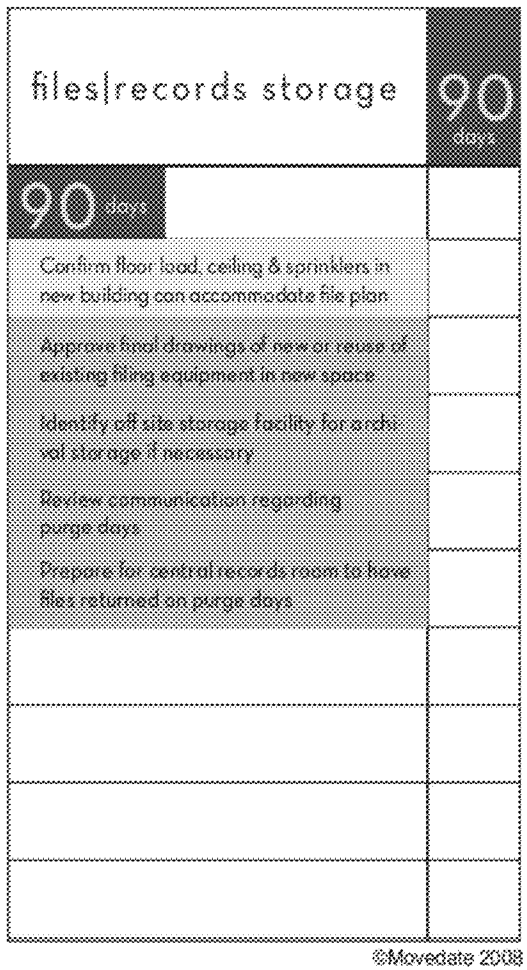
Fig. 8F5
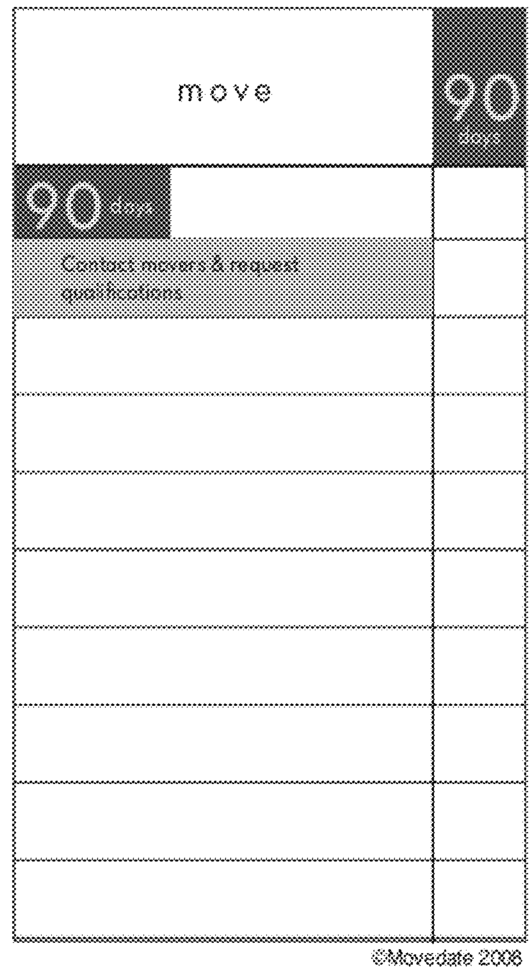
Fig. 8F6

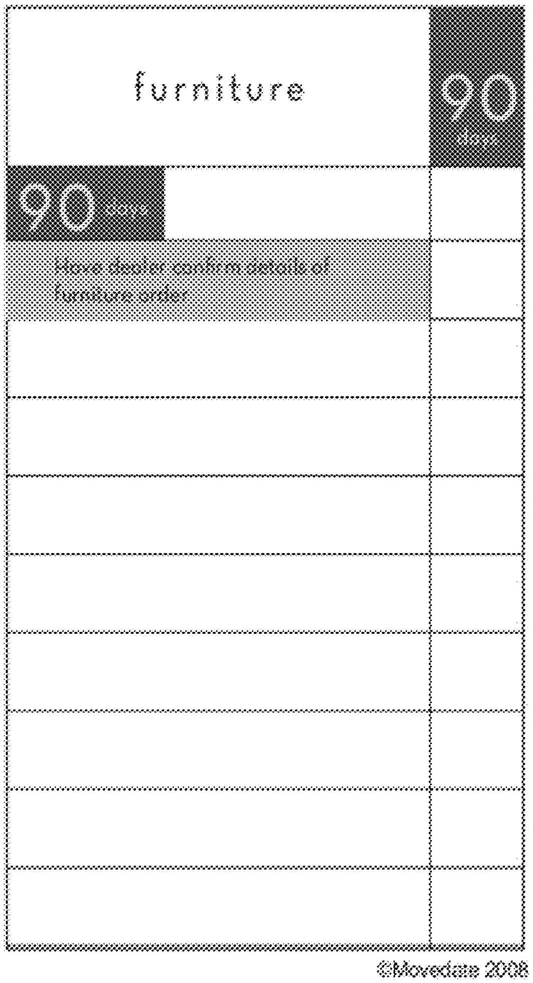
Fig. 8F7
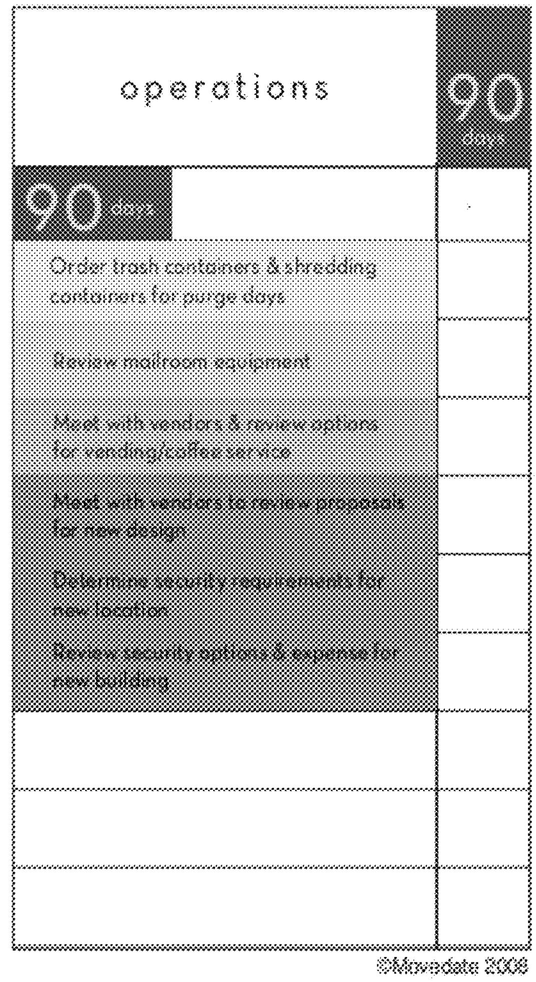
Fig. 8F8

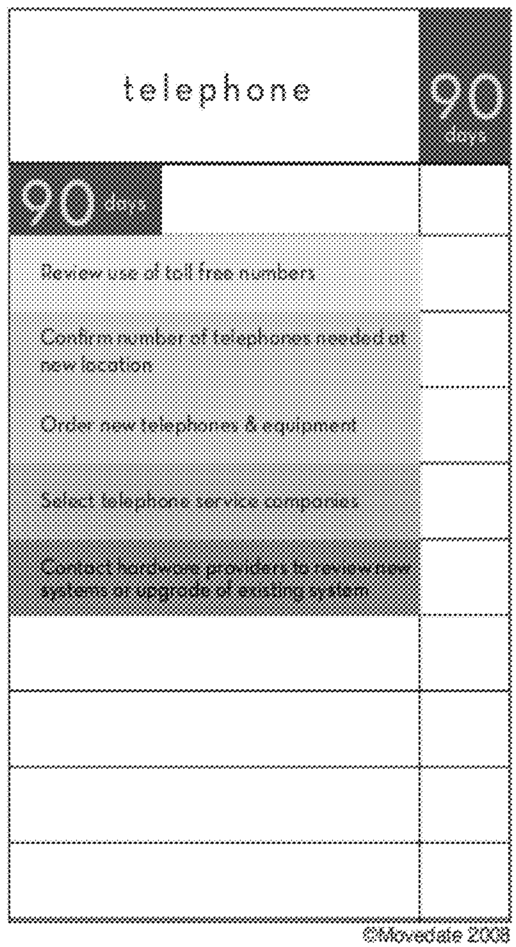
Fig. 8F9
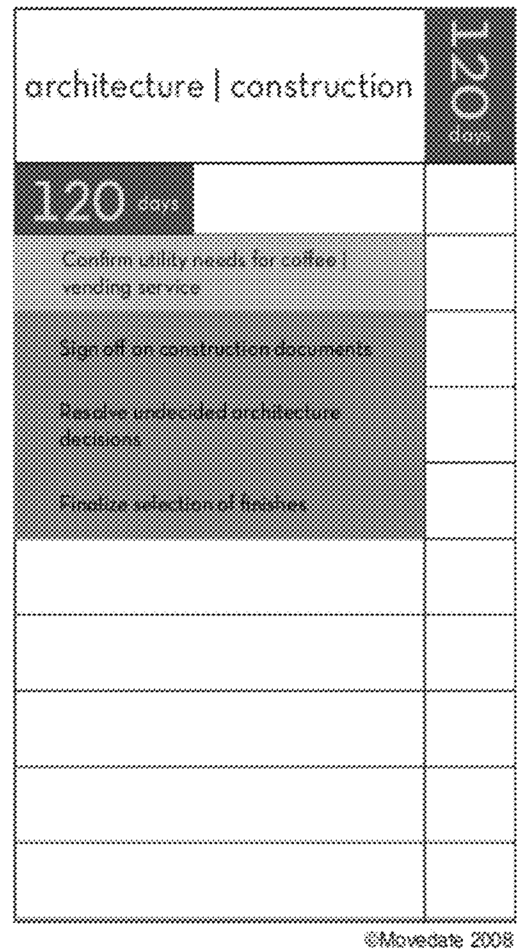
Fig. 8G1

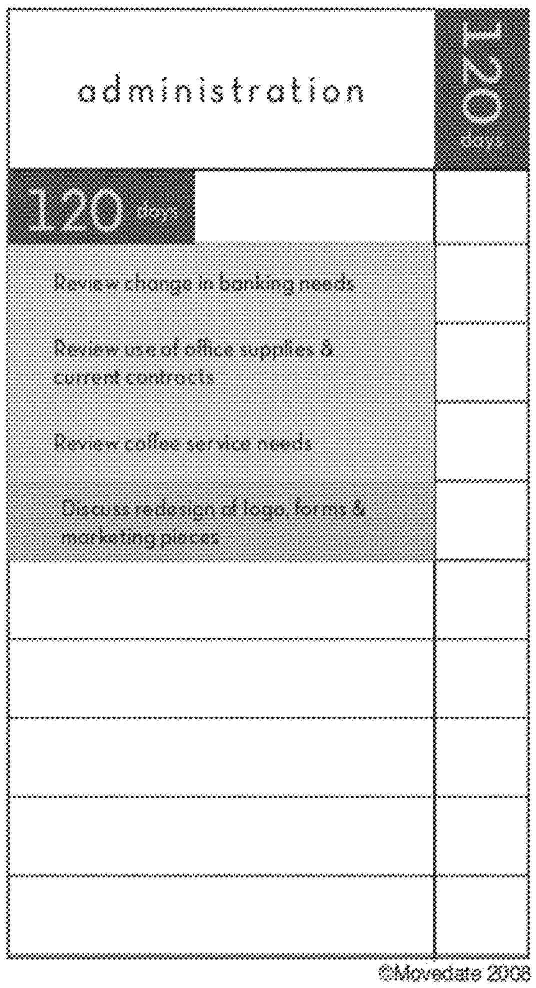
Fig. 8G2
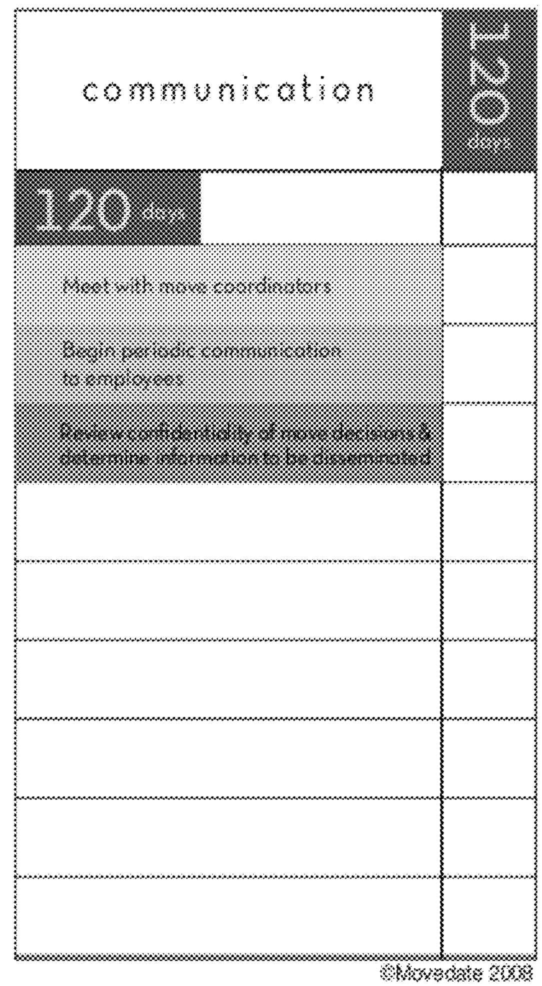
Fig. 8G3

| data | 120 days |
|---|---|
| 120 days | |
| Review HVAC plans for server room | |
| Confirm server room requirements are included in the final architectural plan | |
| Determine fire protection system for server room | |
| | |
| | |
| | |
| | |
| | |
| | |

©Movedate 2006

Fig. 8G4

| files\|records storage | 120 days |
|---|---|
| 120 days | |
| Request information on physical limitations of file locations in new building | |
| Review electronic filing & off site filing options | |
| Review current or create new records retention policy | |
| Determine use of existing or new file storage system | |
| Evaluate current filing capacity | |
| | |
| | |
| | |
| | |

©Movedate 2006

Fig. 8G5

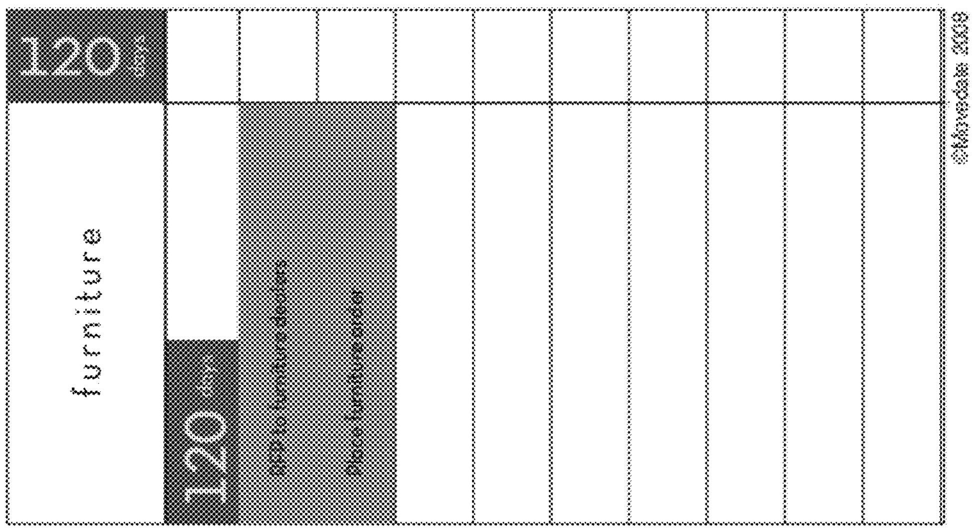
Fig. 8G7
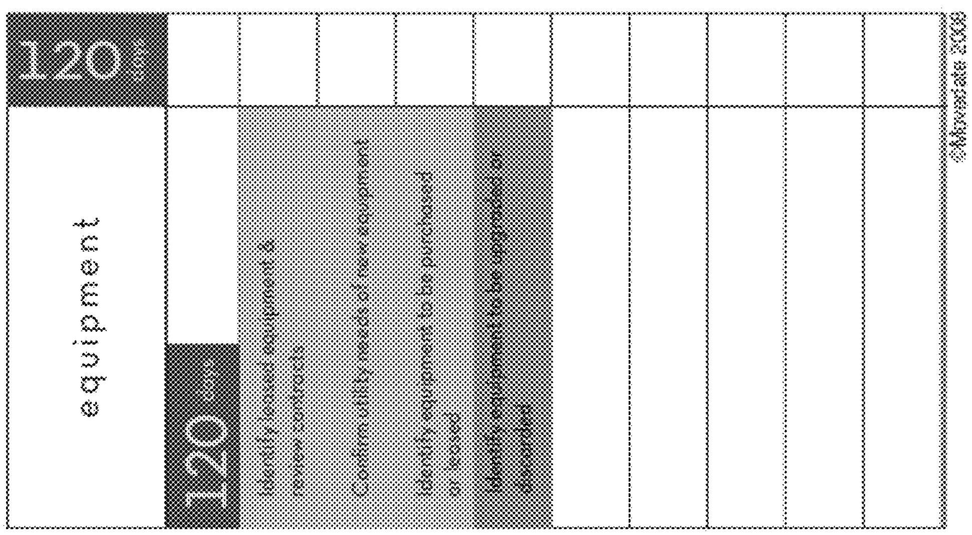
Fig. 8G6

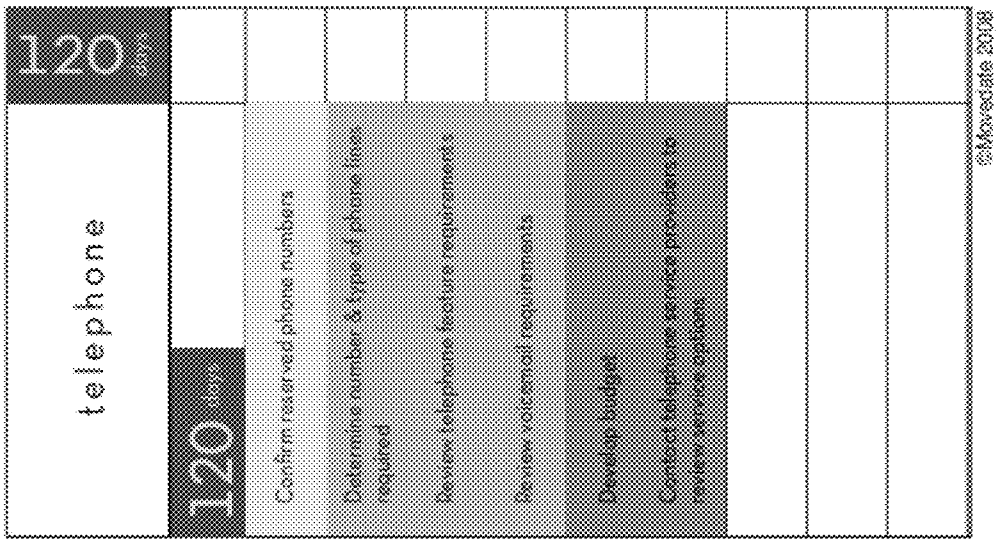
Fig. 8G9
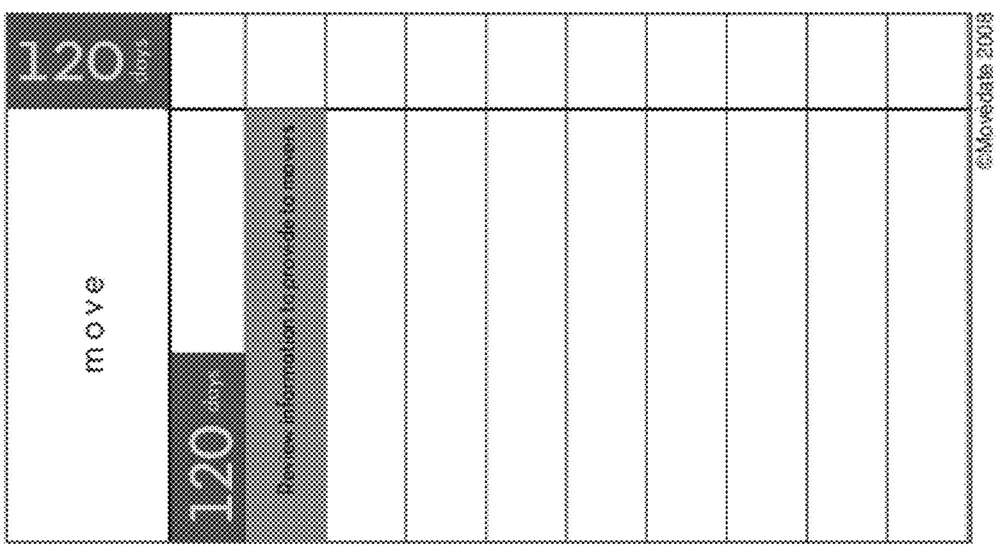
Fig. 8G8

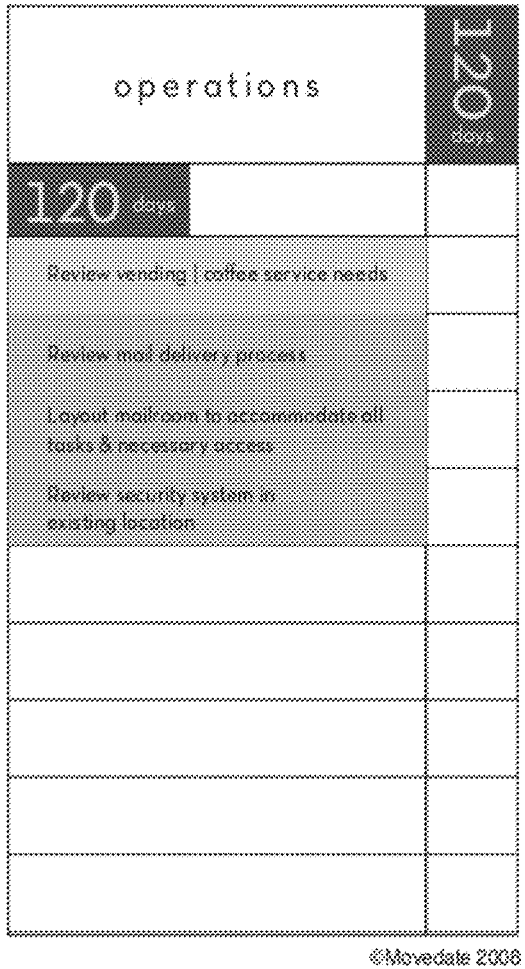
Fig. 8G10
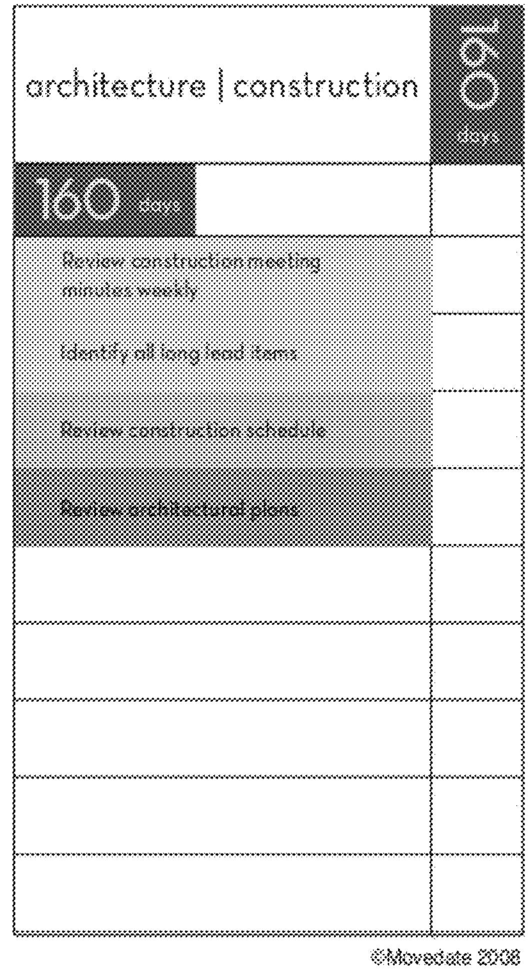
Fig. 8H1

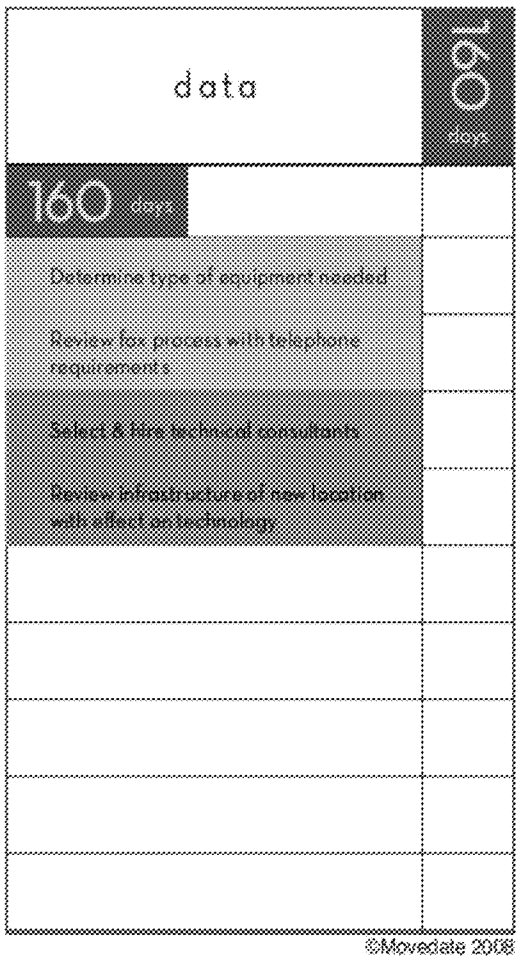
Fig. 8H2
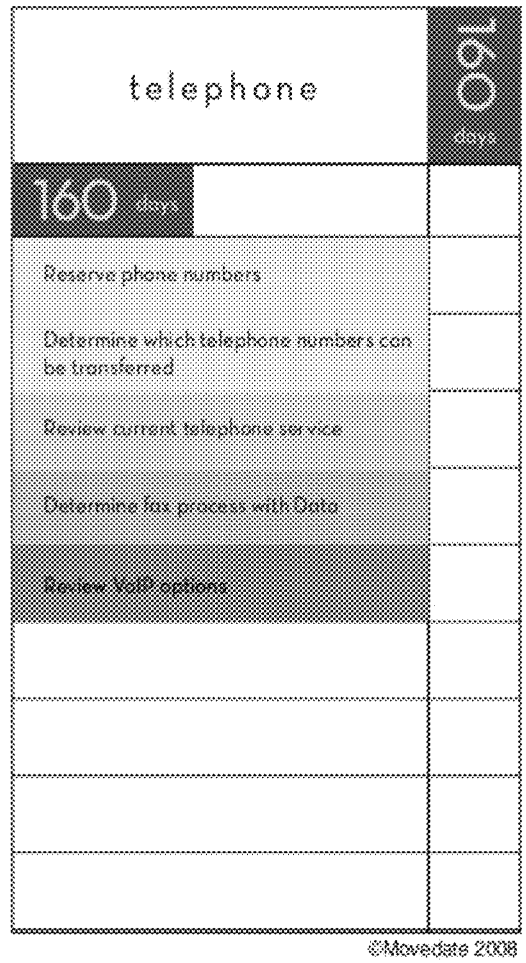
Fig. 8H3

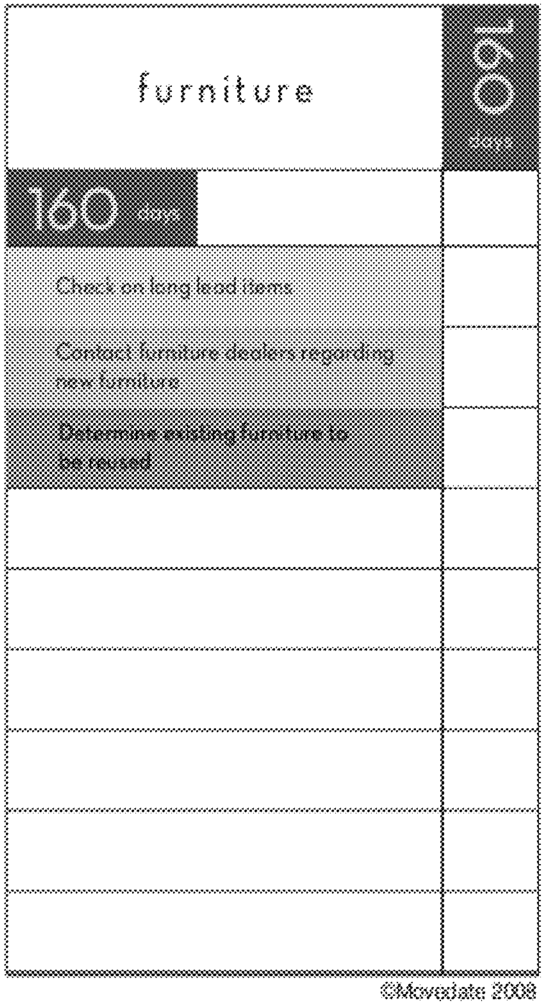
©Movedate 2008
Fig. 8H4
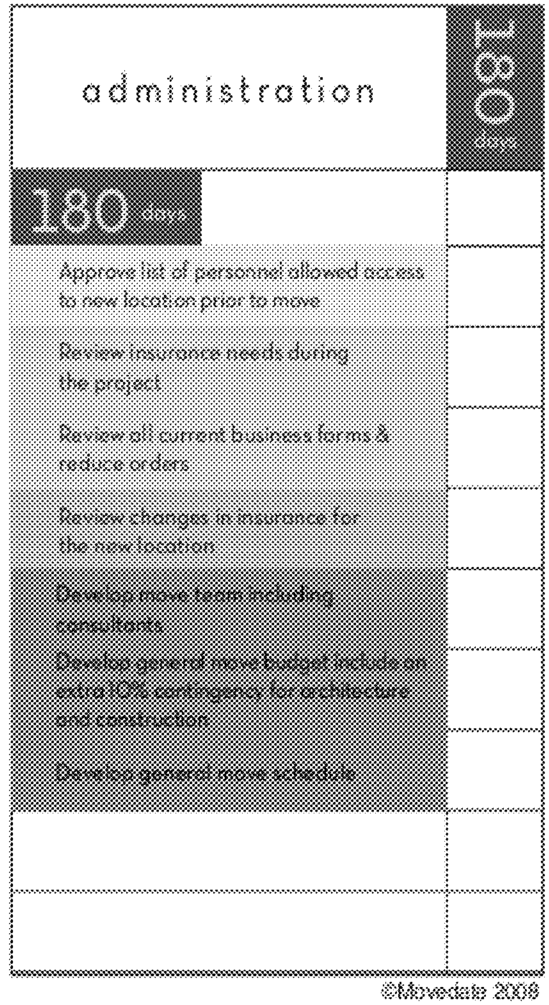
©Movedate 2009
Fig. 8J1

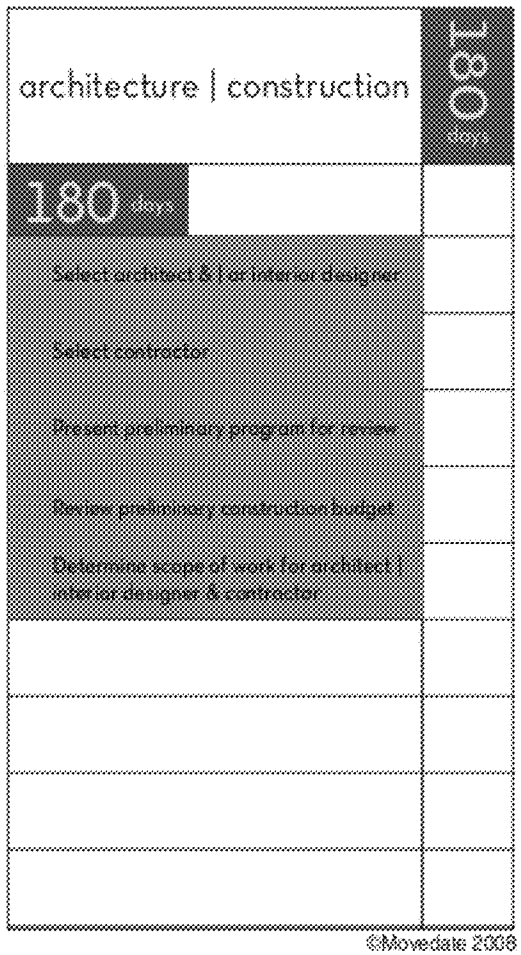
Fig. 8J2
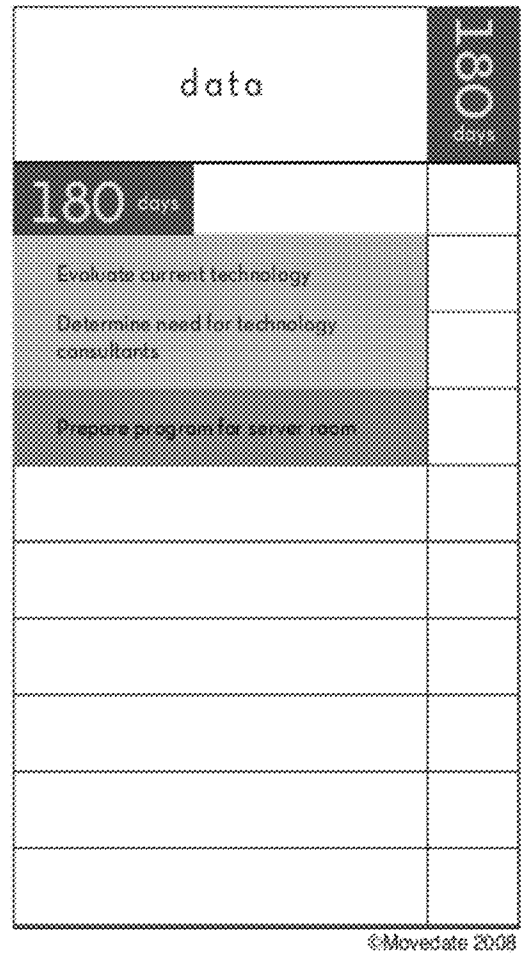
Fig. 8J3

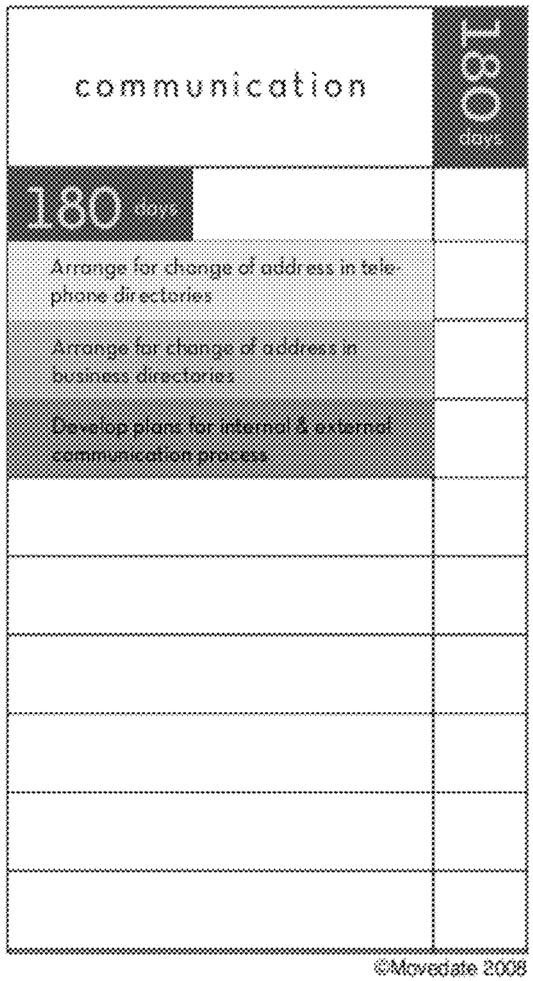
Fig. 8J4
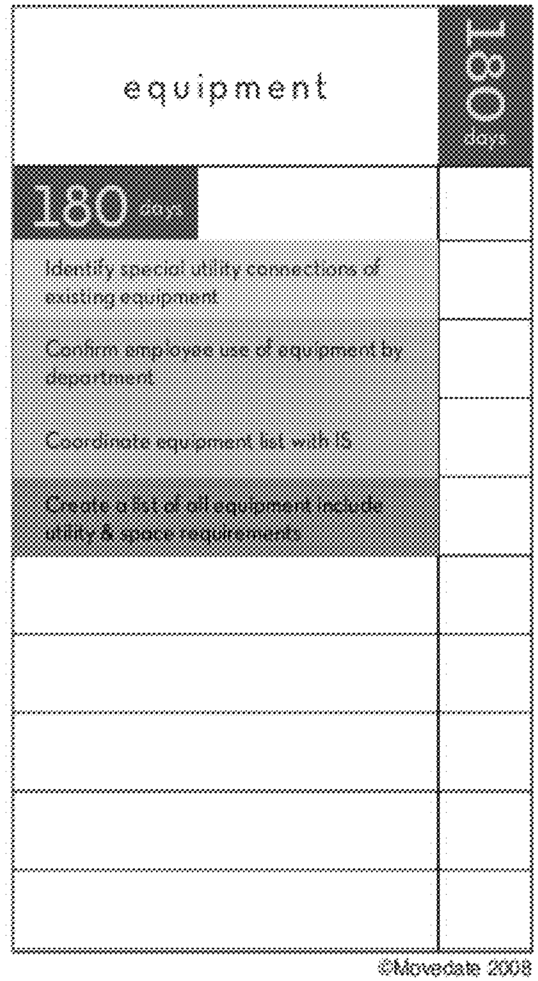
Fig. 8J5

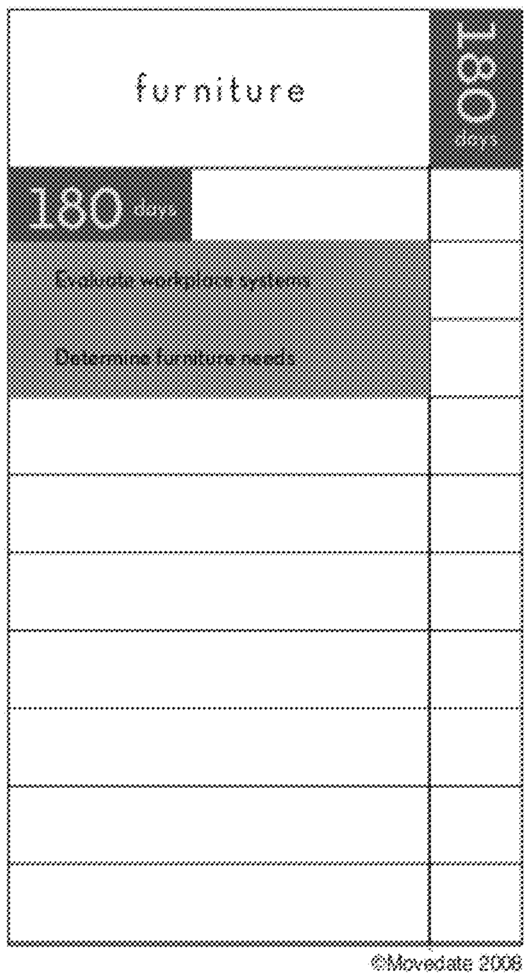
Fig. 8J6
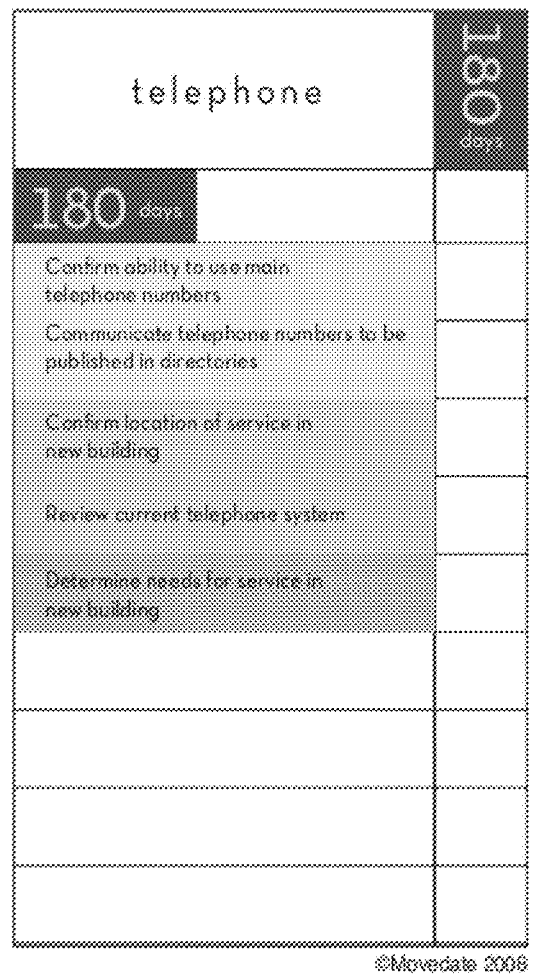
Fig. 8J7

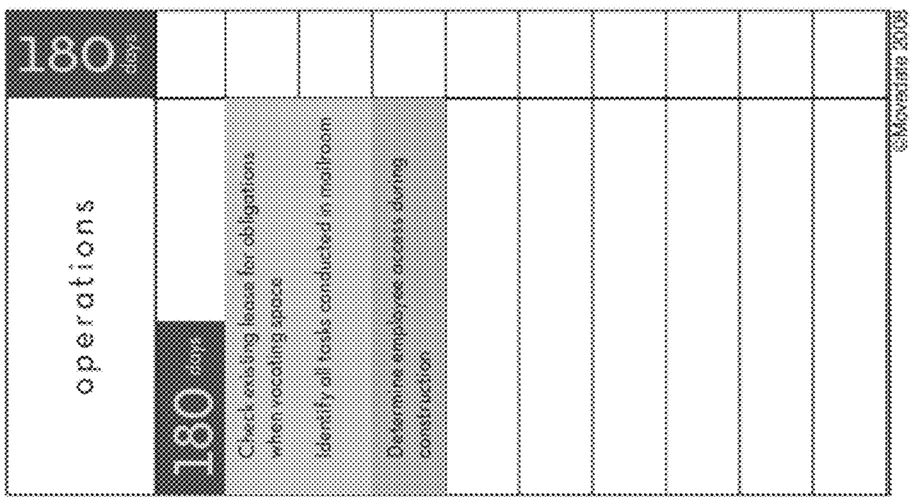
Fig. 8J8

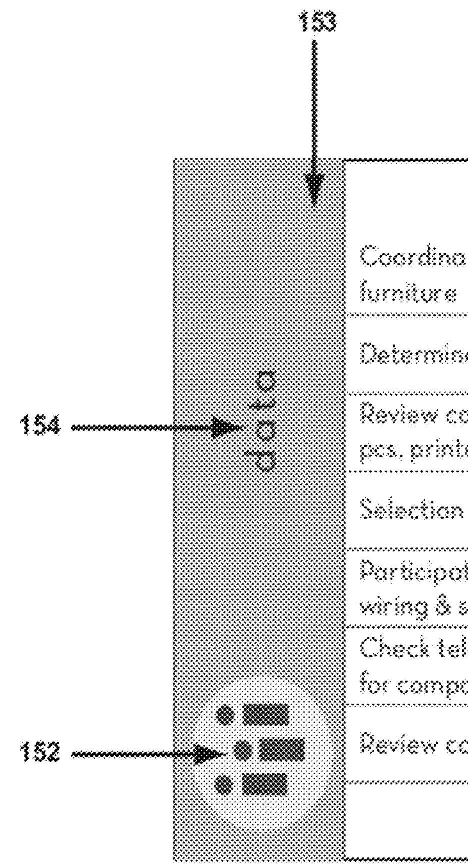

| | ASSIGNED | COMPLETED |
|---|---|---|
| Coordinate electrical & hardware decisions with furniture | | |
| Determine location of printers | | |
| Review computer move process; servers, pcs, printers | | |
| Selection & purchase of new software | | |
| Participate in preparing punch list for data wiring & server room | | |
| Check telephone, data & electric cover plates for compatibility with furniture | | |
| Review computer & printer move schedule | | |
| | | |

©Movedate 2008

Fig. 9C administration

| | ASSIGNED | COMPLETED |
|---|---|---|
| Check insurance policy for coverage | | |
| Review vendor contracts | | |
| | | |
| | | |
| | | |
| | | |
| | | |
| | | |

©Movedate 2008

Fig. 10A1 architecture
construction

| | ASSIGNED | COMPLETED |
|---|---|---|
| Determine signage format for new offices | | |
| | | |
| | | |
| | | |
| | | |
| | | |
| | | |
| | | |

©Movedate 2008

Fig. 10A2 equipment

| | ASSIGNED | COMPLETED |
|---|---|---|
| Make a list of all current equipment (include size & electrical requirements) | | |
| | | |
| | | |
| | | |
| | | |
| | | |
| | | |
| | | |

©Movedate 2008

Fig. 10A3 files|records storage

| | ASSIGNED | COMPLETED |
|---|---|---|
| Inventory existing files by type include size & color | | |
| Identify existing files by department or individual | | |
| | | |
| | | |
| | | |
| | | |
| | | |
| | | |

©Movedate 2008

Fig. 10A4 furniture

| | ASSIGNED | COMPLETED |
|---|---|---|
| Develop list of furniture to be considered for reuse | | |
| Review furniture budget | | |
| | | |
| | | |
| | | |
| | | |
| | | |
| | | |

©Movedate 2008

Fig. 10A5 data

| | ASSIGNED | COMPLETED |
|---|---|---|
| Network Installation Plan | | |
| Determine racking system | | |
| Place cable numbers on plans | | |
| Prepare VoIP analysis | | |
| Review wireless provider options | | |
| | | |
| | | |
| | | |

©Movedate 2008

Fig. 10A6 telephones

| | ASSIGNED | COMPLETED |
|---|---|---|
| Determine economics of cleaning telephones for reuse | | |
| Develop employee telephone list | | |
| | | |
| | | |
| | | |
| | | |
| | | |
| | | |

©Movedate 2008

Fig. 10A7 telephones

| | ASSIGNED | COMPLETED |
|---|---|---|
| Determine economics of cleaning telephones for reuse | | |
| Develop employee telephone list | | |
| | | |
| | | |
| | | |
| | | |
| | | |
| | | |

©Movedate 2008

Fig. 10A8 architecture construction

| | ASSIGNED | COMPLETED |
|---|---|---|
| Determine scope of work | | |
| Confirm critical dates for sign offs | | |
| Confirm power needs | | |
| Review need for a generator | | |
| Coordinate construction schedule with move activities | | |
| Check telephone, data & electric cover plates for compatibility with furniture | | |
| Participate in preparing punch list | | |
| | | |

©Movedate 2008

Fig. 10B1 communication

| | ASSIGNED | COMPLETED |
|---|---|---|
| Determine procedures for internal & external communications | | |
| Set criteria to determine mailing lists for announcements | | |
| Establish list of necessary change of address notifications | | |
| | | |
| | | |
| | | |
| | | |
| | | |

©Movedate 2008

Fig. 10B2 equipment

| | ASSIGNED | COMPLETED |
|---|---|---|
| Identify new location for every piece of equipment | | |
| Identify party responsible for moving each piece of equipment | | |
| | | |
| | | |
| | | |
| | | |
| | | |

©Movedate 2008

Fig. 10B3 files|records storage

| | ASSIGNED | COMPLETED |
|---|---|---|
| Review file plan for public \| department filing | | |
| Review archive storage | | |
| Review use of electronic files | | |
| | | |
| | | |
| | | |
| | | |
| | | |

©Movedate 2008

Fig. 10B4

| furniture | | ASSIGNED | COMPLETED |
|---|---|---|---|
| | Determine size of workstations & furniture to accomplish work | | |
| | | | |
| | | | |
| | | | |
| | | | |
| | | | |
| | | | |
| | | | |

©Movedate 2008

Fig. 10B5

| data | | ASSIGNED | COMPLETED |
|---|---|---|---|
| | Coordinate electrical & hardware decisions with furniture | | |
| | Determine location of printers | | |
| | Review computer move process; servers, pcs, printers | | |
| | Selection & purchase of new software | | |
| | Participate in preparing punch list for data wiring & server room | | |
| | Check telephone, data & electric cover plates for compatibility with furniture | | |
| | Review computer & printer move schedule | | |
| | | | |

©Movedate 2008

Fig. 10B6 move

| | ASSIGNED | COMPLETED |
|---|---|---|
| Set move goals | | |
| Prepare RFP for movers | | |
| Move schedule & plans | | |
| Determine effective move date | | |
| Confirm move dates | | |
| | | |
| | | |
| | | |

©Movedate 2008

Fig. 10B7 operations

| | ASSIGNED | COMPLETED |
|---|---|---|
| Review storage capacity | | |
| Review mailroom & mail delivery procedures | | |
| | | |
| | | |
| | | |
| | | |
| | | |
| | | |

©Movedate 2008

Fig. 10B8 administration

| | ASSIGNED | COMPLETED |
| --- | --- | --- |
| Finalize details for employees needing to work during move | | |
| Distribute final floor plans with employee seating assignments | | |
| Designate new floor Fire Marshals | | |
| Risk management to review space | | |
| Order new supplies for delivery at new location | | |
| Determine what to do with old office supplies | | |
| Purchase wastebaskets, hangers & recycle bins | | |
| | | |

©Movedate 2008

Fig. 10C1 architecture
construction

| | ASSIGNED | COMPLETED |
| --- | --- | --- |
| Participate in punch list | | |
| Confirm Certificate of Occupancy | | |
| | | |
| | | |
| | | |
| | | |
| | | |
| | | |

©Movedate 2008

Fig. 10C2 communication

| | ASSIGNED | COMPLETED |
|---|---|---|
| Send out move notices | | |
| Send out move announcements | | |
| Distribute transportation information | | |
| Distribute parking memos | | |
| | | |
| | | |
| | | |
| | | |

©Movedate 2008

Fig. 10C3 equipment

| | ASSIGNED | COMPLETED |
|---|---|---|
| Arrange for equipment to be properly dismantled prior to move | | |
| Arrange for equipment to be installed in the new location | | |
| Arrange for dispossession of surplus equipment | | |
| | | |
| | | |
| | | |
| | | |
| | | |

©Movedate 2008

Fig. 10C4 files|records storage

| | ASSIGNED | COMPLETED |
|---|---|---|
| Assign department files | | |
| Send memos to employees regarding filing capacity for the new location | | |
| | | |
| | | |
| | | |
| | | |
| | | |
| | | |

©Movedate 2008

Fig. 10C5 furniture

| | ASSIGNED | COMPLETED |
|---|---|---|
| Coordinate installation of furniture, data and electrical | | |
| Clean existing furniture scheduled for reuse | | |
| Arrange for dispossession of surplus furniture | | |
| | | |
| | | |
| | | |
| | | |
| | | |

©Movedate 2008

Fig. 10C6 data

| | ASSIGNED | COMPLETED |
|---|---|---|
| Develop network operation plan | | |
| Test network connections | | |
| Back up computer systems | | |
| Request employees to back up | | |
| | | |
| | | |
| | | |
| | | |

©Movedate 2008

Fig. 10C7 telephone

| | ASSIGNED | COMPLETED |
|---|---|---|
| Coordinate telephone numbers with employee seating chart | | |
| Place numbers on plans | | |
| Create employee telephone list | | |
| Distribute employee telephone list | | |
| | | |
| | | |
| | | |
| | | |

©Movedate 2008

Fig. 10C8 operations

| | ASSIGNED | COMPLETED |
|---|---|---|
| Train reception on new systems & \| or procedures | | |
| Confirm Post Office procedures at new location | | |
| Introduce mailroom staff to new location | | |
| Arrange for pre & post move cleaning of the new location | | |
| Meet lease requirements for returning existing space to landlord | | |
| Confirm toilets in the new location are stocked | | |
| Cancel cleaning contract at existing location | | |
| | | |

©Movedate 2008

Fig. 10C9 administration

| | ASSIGNED | COMPLETED |
|---|---|---|
| Define project goals | | |
| Develop move budget | | |
| Identify move teams | | |
| Identify need for consultants | | |
| Review parking issues | | |
| | | |
| | | |
| | | |

©Movedate 2008

Fig. 10D1 architecture construction

| | ASSIGNED | COMPLETED |
|---|---|---|
| Review program needs with architect \| interior designer | | |
| Review electrical needs per locations | | |
| Approve floor plans | | |
| Approve construction budget | | |
| Obtain permits | | |
| | | |
| | | |
| | | |

©Movedate 2008

Fig. 10D2 data

| | ASSIGNED | COMPLETED |
|---|---|---|
| Minimize software upgrades or coordinate upgrades with move | | |
| | | |
| Determine need for outside consultants<br>Determine need for 24 hour air in server room | | |
| Determine need for back up generator | | |
| RFP for wiring | | |
| Select wiring company | | |
| Develop network wiring plan | | |
| | | |

©Movedate 2008

Fig. 10D3 operations

| | ASSIGNED | COMPLETED |
|---|---|---|
| Explore options for keying of new location | | |
| Determine security systems for new location | | |
| | | |
| | | |
| | | |
| | | |
| | | |
| | | |

©Movedate 2008

Fig. 10D4 equipment

| | ASSIGNED | COMPLETED |
|---|---|---|
| Create master equipment list | | |
| Confirm lease or ownership of equipment | | |
| Determine equipment to be reused | | |
| | | |
| | | |
| | | |
| | | |
| | | |

©Movedate 2008

Fig. 10D5

| files\|records storage | | ASSIGNED | COMPLETED |
|---|---|---|---|
| | Determine retention policy for records | | |
| | Review filing needs per department or task | | |
| | Investigate off site archive options | | |
| | Determine weight load for fire files & \| or high density mobile files | | |
| | | | |
| | | | |
| | | | |
| | | | |

©Movedate 2008

Fig. 10D6

| furniture | | ASSIGNED | COMPLETED |
|---|---|---|---|
| | Develop list of furniture to be reused | | |
| | Determine need to refinish or repair furniture | | |
| | Determine need for new furniture | | |
| | Select furniture | | |
| | Order furniture | | |
| | | | |
| | | | |
| | | | |

©Movedate 2008

Fig. 10D7

ARCHITECTURE | CONSTRUCTION OVERVIEW

| ✓ | DAYS | TASKS |
|---|---|---|
| | 180 | Determine scope of work for architect & contractor |
| | 180 | Select architect &/or interior designer |
| | 180 | Select contractor |
| | 180 | Present preliminary program for review |
| | 180 | Review preliminary construction budget |
| | 160 | Review architectural plans |
| | 160 | Review construction schedule |
| | 160 | Identify all long lead items |
| | 160 | Review construction meeting minutes weekly |
| | 120 | Resolve undecided architecture decisions |
| | 120 | Sign off on construction documents |
| | 120 | Finalize selection of finishes |
| | 120 | Confirm utility needs for coffee/vending service |
| | 90 | Confirm construction schedule |
| | 90 | Review architectural plans |
| | 90 | Confirm adequate coat closets or hooks |
| | 60 | Review architecture plans & conduct walkthrough |
| | 60 | Review construction budget |
| | | |

Fig. 11A1

©Movedate 2008

| | | |
|---|---|---|
| | 60 | Finalize scope of work changes; revise schedule & budget |
| | 60 | Review lighting plan with furniture plan |
| | 30 | Confirm walls can support whiteboards |
| | 30 | Order coat hooks & hangers |
| | 30 | Create plans for plant & art locations |
| | 14 | Review lighting plans & switch locations w/ engineer |
| | 14 | Review temperatures zones w/ engineer |
| | 14 | Sign off on construction punch list items |
| | | COORDINATION |
| | | Review program needs w/ architect/interior designer |
| | | Review electrical needs per locations |
| | | Approve floor plans |
| | | Approve construction budget |
| | | Obtain permits |
| | | Participate in punch list |
| | | Confirm Certificate of Occupancy |
| | | Determine scope of work |
| | | Confirm critical dates for sign offs |
| | | Confirm power needs |
| | | Review need for a generator |
| | | Coordinate construction schedule w/ move activities |
| | | Check compatibility of cover plates w/ furniture |
| | | Participate in preparing punch list |
| | | Determine signage format for new offices |
| | | |

Fig. 11A2

©Movedate 2008

EQUIPMENT OVERVIEW

| ✓ | DAYS | TASKS |
|---|---|---|
| | 180 | Create list of all equipment include utility & space needs |
| | 180 | Coordinate equipment list with IS |
| | 180 | Confirm use of equipment by department |
| | 180 | Identify equipment w/ special utility connections |
| | 120 | Identify equipment to be upgraded or discarded |
| | 120 | Identify equipment to be purchased or leased |
| | 120 | Confirm utility needs of all equipment for new location |
| | 120 | Identify leased equipment & review contracts |
| | 60 | Review product options & service agreements |
| | 60 | Order new equipment |
| | 14 | Confirm dates of equipment prep & move |
| | 14 | Arrange for dispossession of surplus equipment |
| | 2 | Accept delivery of new equipment |
| | 2 | Confirm all new equipment is running properly |
| | 2 | Coordinate existing equipment prep & move |
| | 2 | Coordinate pick up of discarded equipment for after move |
| | | COORDINATION |
| | | Determine equipment to be reused |
| | | |

Fig. 11B1

©Movedate 2008

| | | |
|---|---|---|
| | | Confirm lease or ownership of equipment |
| | | Create master equipment list |
| | | Arrange for equipment to be properly dismantled |
| | | Arrange for equipment to be installed in the new location |
| | | Arrange for dispossession of surplus equipment |
| | | Identify new location for every piece of equipment |
| | | Identify party responsible for moving equipment |
| | | Make a list of all current equipment |

Fig. 11B2

©Movedate 2008

ARCHITECTURE | CONSTRUCTION OVERVIEW

| ✓ | DAYS | TASKS |
|---|---|---|
| | 180 | Determine scope of work for architect & contractor |
| | 180 | Select architect &/or interior designer |
| | 180 | Select contractor |
| | 180 | Present preliminary program for review |
| | 180 | Review preliminary construction budget |
| | 160 | Review architectural plans |
| | 160 | Review construction schedule |
| | 160 | Identify all long lead items |
| | 160 | Review construction meeting minutes weekly |
| | 120 | Resolve undecided architecture decisions |
| | 120 | Sign off on construction documents |
| | 120 | Finalize selection of finishes |
| | 120 | Confirm utility needs for coffee/vending service |
| | 90 | Confirm construction schedule |
| | 90 | Review architectural plans |
| | 90 | Confirm adequate coat closets or hooks |
| | 60 | Review architecture plans & conduct walkthrough |
| | 60 | Review construction budget |
| | | |

Fig. 11C1

©Movedate 2008

| | | |
|---|---|---|
| | 60 | Finalize scope of work changes; revise schedule & budget |
| | 60 | Review lighting plan with furniture plan |
| | 30 | Confirm walls can support whiteboards |
| | 30 | Order coat hooks & hangers |
| | 30 | Create plans for plant & art locations |
| | 14 | Review lighting plans & switch locations w/ engineer |
| | 14 | Review temperatures zones w/ engineer |
| | 14 | Sign off on construction punch list items |
| | | |
| | | |
| | | |
| | | |
| | | |
| | | |
| | | |
| | | |
| | | |
| | | |
| | | |
| | | |
| | | |
| | | |
| | | |
| | | |
| | | |

Fig. 11C2

©Movedate 2008

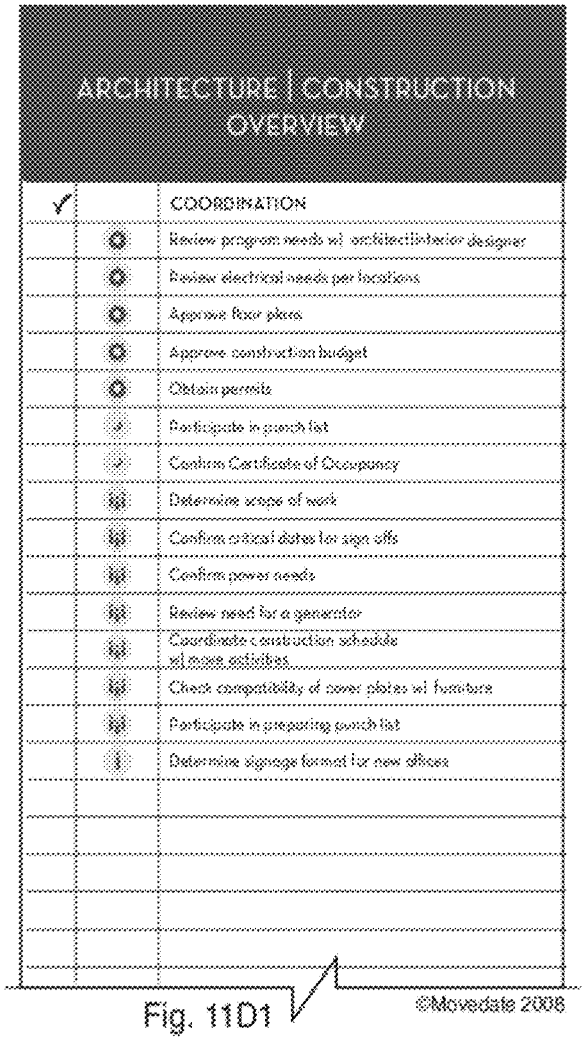
Fig. 11D1
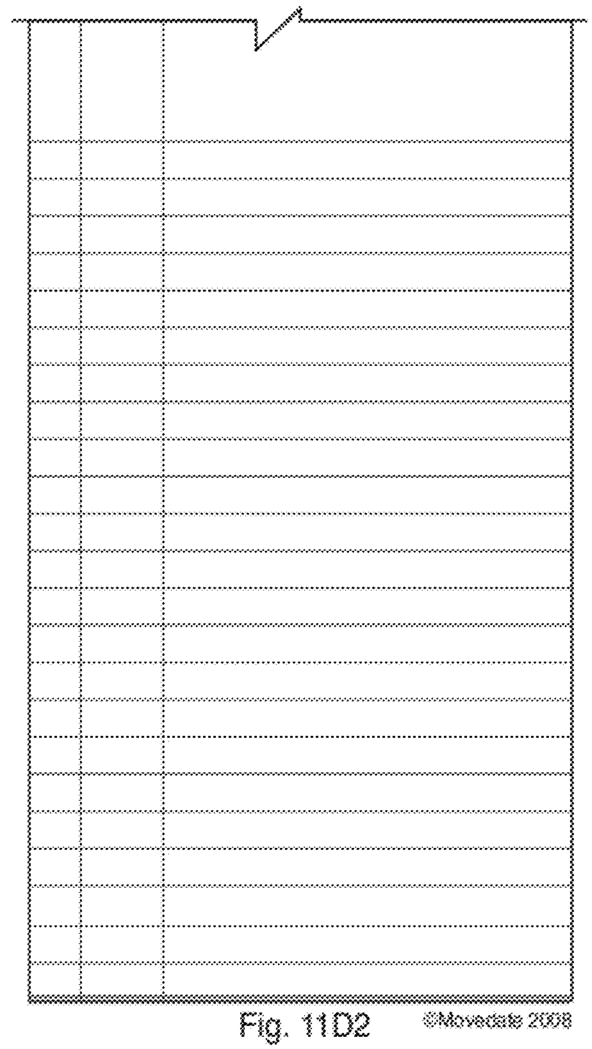
Fig. 11D2

| ADMINISTRATION TOTALS | |
|---|---|
| TOTAL | 99.25 HOURS |
| 15 MIN | 5 TASKS |
| 1 HOUR | 14 TASKS |
| 4 HOUR | 9 TASKS |
| 8 HOUR | 6 TASKS |
| DAYS UNTIL MOVE | TASKS |
| 180 DAYS | 7 TASKS |
| 160 DAYS | 0 TASKS |
| 120 DAYS | 4 TASKS |
| 90 DAYS | 3 TASKS |
| 60 DAYS | 5 TASKS |
| 30 DAYS | 7 TASKS |
| 14 DAYS | 4 TASKS |
| 7 DAYS | 0 TASKS |
| 2 DAYS | 4 TASKS |
| | |

©Movedate 2008

Fig. 12A1

| ARCHITECTURE \| CONSTRUCTION | |
|---|---|
| TOTAL | 135.25 HOURS |
| 15 MIN | 1 TASKS |
| 1 HOUR | 7 TASKS |
| 4 HOUR | 6 TASKS |
| 8 HOUR | 13 TASKS |
| DAYS UNTIL MOVE | TASKS |
| 180 DAYS | 5 TASKS |
| 160 DAYS | 4 TASKS |
| 120 DAYS | 4 TASKS |
| 90 DAYS | 3 TASKS |
| 60 DAYS | 4 TASKS |
| 30 DAYS | 4 TASKS |
| 14 DAYS | 3 TASKS |
| 7 DAYS | 0 TASKS |
| 2 DAYS | 0 TASKS |
| | |

©Movedate 2008

Fig. 12A2

| COMMUNICATION TOTALS | |
|---|---|
| TOTAL | 90.5 HOURS |
| 15 MIN | 2 TASKS |
| 1 HOUR | 10 TASKS |
| 4 HOUR | 10 TASKS |
| 8 HOUR | 5 TASKS |
| DAYS UNTIL MOVE | TASKS |
| 180 DAYS | 3 TASKS |
| 160 DAYS | 0 TASKS |
| 120 DAYS | 3 TASKS |
| 90 DAYS | 4 TASKS |
| 60 DAYS | 4 TASKS |
| 30 DAYS | 4 TASKS |
| 14 DAYS | 3 TASKS |
| 7 DAYS | 3 TASKS |
| 2 DAYS | 3 TASKS |
| | |

©Movedate 2008

Fig. 12A3

| DATA TOTALS | |
|---|---|
| TOTAL | 114 HOURS |
| 15 MIN | 0 TASKS |
| 1 HOUR | 2 TASKS |
| 4 HOUR | 8 TASKS |
| 8 HOUR | 10 TASKS |
| DAYS UNTIL MOVE | TASKS |
| 180 DAYS | 3 TASKS |
| 160 DAYS | 3 TASKS |
| 120 DAYS | 3 TASKS |
| 90 DAYS | 3 TASKS |
| 60 DAYS | 3 TASKS |
| 30 DAYS | 3 TASKS |
| 14 DAYS | 0 TASKS |
| 7 DAYS | 0 TASKS |
| 2 DAYS | 0 TASKS |
| | |

©Movedate 2008

Fig. 12A4

| EQUIPMENT TOTALS | |
|---|---|
| TOTAL | 82 HOURS |
| 15 MIN | 0 TASKS |
| 1 HOUR | 2 TASKS |
| 4 HOUR | 8 TASKS |
| 8 HOUR | 6 TASKS |

| DAYS UNTIL MOVE | TASKS |
|---|---|
| 180 DAYS | 4 TASKS |
| 160 DAYS | 0 TASKS |
| 120 DAYS | 4 TASKS |
| 90 DAYS | 0 TASKS |
| 60 DAYS | 2 TASKS |
| 30 DAYS | 0 TASKS |
| 14 DAYS | 2 TASKS |
| 7 DAYS | 0 TASKS |
| 2 DAYS | 4 TASKS |
| | |

©Movedate 2008

Fig. 12B1

| FILES \| RECORDS STORAGE | |
|---|---|
| TOTAL | 66.5 HOURS |
| 15 MIN | 2 TASKS |
| 1 HOUR | 6 TASKS |
| 4 HOUR | 3 TASKS |
| 8 HOUR | 6 TASKS |

| DAYS UNTIL MOVE | TASKS |
|---|---|
| 180 DAYS | 0 TASKS |
| 160 DAYS | 0 TASKS |
| 120 DAYS | 5 TASKS |
| 90 DAYS | 5 TASKS |
| 60 DAYS | 0 TASKS |
| 30 DAYS | 2 TASKS |
| 14 DAYS | 3 TASKS |
| 7 DAYS | 2 TASKS |
| 2 DAYS | 0 TASKS |
| | |

©Movedate 2008

Fig. 12B2

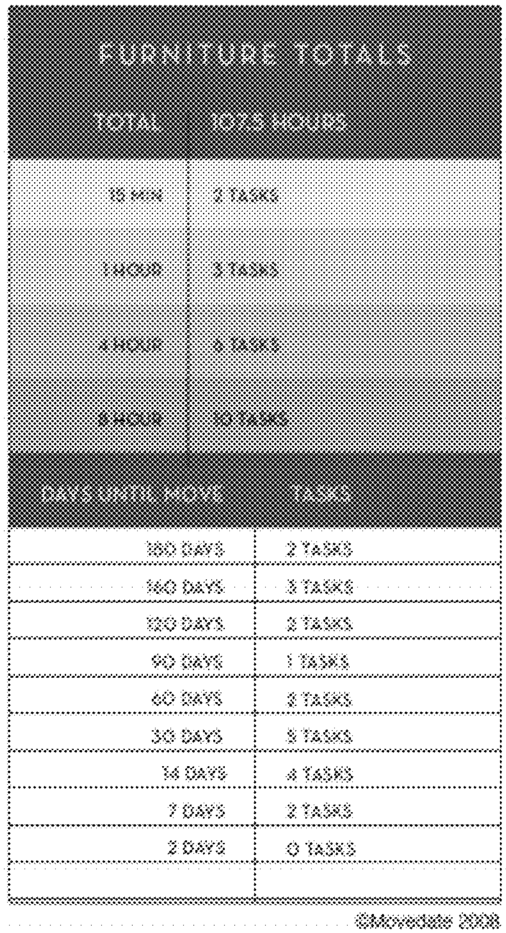
Fig. 12B3
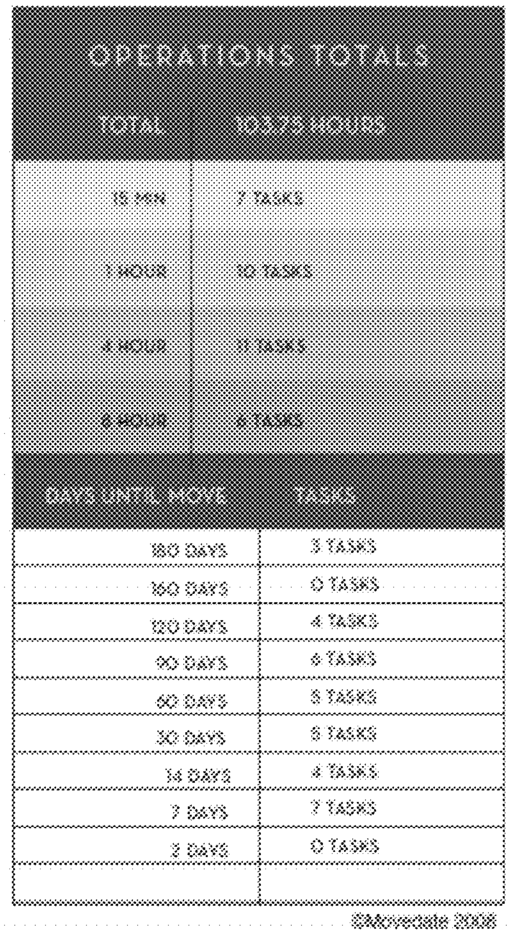
Fig. 12B4

| TELEPHONE TOTALS | |
|---|---|
| TOTAL | 88.5 HOURS |
| 15 MIN | 10 TASKS |
| 1 HOUR | 10 TASKS |
| 4 HOUR | 9 TASKS |
| 8 HOUR | 5 TASKS |
| DAYS UNTIL MOVE | TASKS |
| 180 DAYS | 8 TASKS |
| 160 DAYS | 8 TASKS |
| 120 DAYS | 6 TASKS |
| 90 DAYS | 8 TASKS |
| 60 DAYS | 2 TASKS |
| 30 DAYS | 3 TASKS |
| 14 DAYS | 2 TASKS |
| 7 DAYS | 2 TASKS |
| 2 DAYS | 4 TASKS |
| | |

©Movedate 2008

Fig. 12C1

| MOVE TOTALS | |
|---|---|
| TOTAL | 78.75 HOURS |
| 15 MIN | 3 TASKS |
| 1 HOUR | 6 TASKS |
| 4 HOUR | 10 TASKS |
| 8 HOUR | 4 TASKS |
| DAYS UNTIL MOVE | TASKS |
| 180 DAYS | 0 TASKS |
| 160 DAYS | 0 TASKS |
| 120 DAYS | 1 TASKS |
| 90 DAYS | 1 TASKS |
| 60 DAYS | 3 TASKS |
| 30 DAYS | 6 TASKS |
| 14 DAYS | 5 TASKS |
| 7 DAYS | 4 TASKS |
| 2 DAYS | 3 TASKS |
| | |

©Movedate 2008

Fig. 12C2

©Movedate 2008

202

200

210

210

Alternative Embodiments ~ Customized Relocation kits

| *Employee based:* | *Industry based:* | *Third Party based:* |
|---|---|---|
| 50 or under | Law Firms | Co branded |
| 50 to 100 | Manufacturing | Economic Development |
| 100 to 200 | Creative | |
| 200 to 400 | Apparel | Individual Employee Kits May |
| 400 to 700 | High Tech | include: |
| 700 to 1000 | Medical | |
| +1000 | Government | General Employee kit to work |
| | Insurance | with one of the general kits |
| | Start Up | Employee Self Move |
| | Financial | Individual Department |
| | Satellite Office | Employee Third Place and/or |
| | Brand | Mobile Office Kit |

©Movedate 2008

Fig. 18

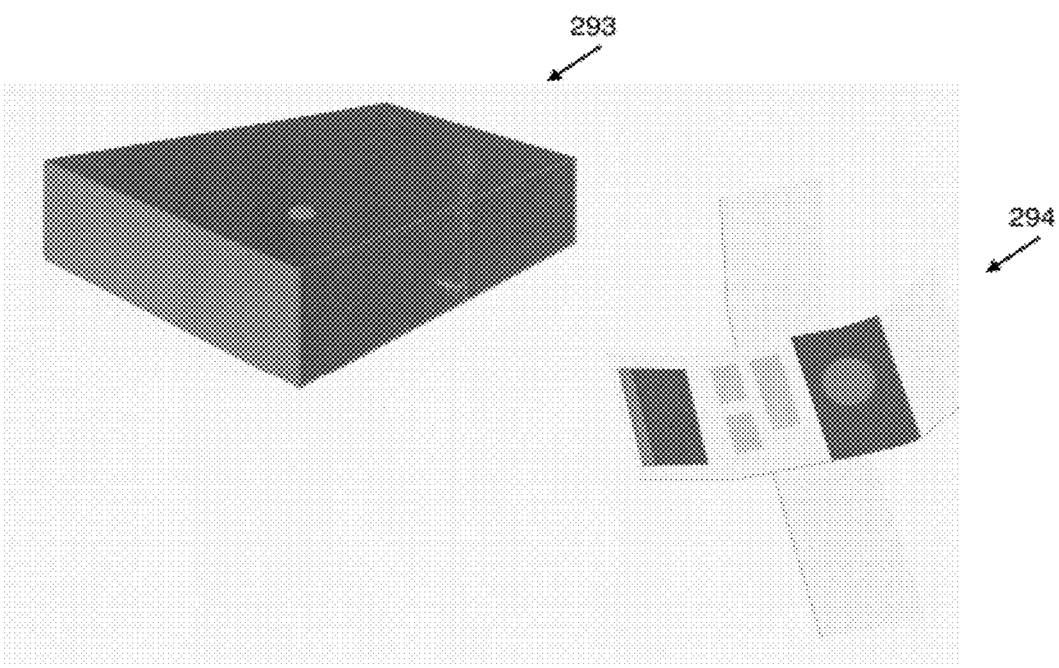

Fig.19

©Movedate 2008 filing dimensions 22" per drawer
44" total
style: front to back filing dimensions
22"
style: front to back filing dimensions
32" per shelf
style: lines + shelf filing dimensions
36"
style: side to side ©Movedata 2008 filing dimensions
90" total
style: linear shelf

METHOD AND SYSTEM FOR MANAGING WORKFORCE MOBILITY WITHIN A BUSINESS ENTITY

RELATED APPLICATIONS

This application claims benefit of provisional patent application number US60/887,768 filed Feb. 1, 2007, which is incorporated herein by reference.

COPYRIGHT NOTICE

© 2008 Relocation Management, LLC dba Movedate. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND

The field of the present disclosure relates to business services, specifically to change management in a corporate, business, or other work environment. A preferred embodiment of a system disclosed relates to tools and aids to facilitate management of business facilities and workers during relocation, construction, remodeling, or other changes in a physical workspace. Another preferred embodiment of the system disclosed relates to managing a mobile workforce.

Relocating a business entity, whether it be moving to a new facility or reconfiguring the physical environment within a current facility, is a disruption that can threaten business on multiple fronts. Statistics indicate that internal employees assigned responsibility for office moves experience a high failure and burnout rate, and frequently are demoted or fired as a direct result of primary participation in such a change management project. Businesses often fail to adjust to a new space without interrupting operational continuity, losing human capital, or losing revenue. Efficient management of a relocation project is an important element, although not the only one, influencing these outcomes.

Many products are currently available to assist with project management of corporate moves: scheduling products, project management tools (e.g., Gantt chart software), and move management tools that are typically part of a large facility management software program. Relocation assistance products tend to be scheduling based or project management based, often utilizing proprietary web-based software to schedule move activities, map re-organization of human resources, and the like. However, existing tools are not comprehensive, and office relocations continue to pose significant financial risk.

Meanwhile, current trends in the workforce indicate that traditional physical workspaces occupied by employees or contractors for an extended period of time are becoming obsolete. Workers are increasingly mobile, often sharing space and facilities on an ad hoc basis, and businesses are increasingly becoming virtual distributed entities without walls. For instance, more and more professionals are working out of the office, only occasionally visiting a home office for face-to-face meetings with colleagues. They may work from home, at a client office, from a local café, or anywhere that a network connection is available, without maintaining a permanent office. Salespeople, consultants, and some employees who may only require access to an office for, say, 20% of their time, may use temporary office space with connectivity outlets and access to office equipment. Field contractors or consultants dispatched to a customer site for a few days to a few weeks or months may cause the workforce to be in a continuous state of flux. Yet, these mobile workers need the support of information technology, human resources, and other business services to be productive, and therefore must stay connected to their co-workers electronically, if not physically.

The present inventor recognizes that corporate culture management during a change event, and providing ongoing services to mobile workers are important, yet sometimes hidden, aspects of a mobile workforce. A healthy corporate culture must weather change and accommodate today's mobile workforce. Uprooting stationary workers from their permanent work spaces can be highly disruptive while many workers without permanent work spaces are constantly on the move. Though assistance tailored to specific needs of a business can be provided by a consultant to assist in integrating cultural elements with a move project, the present inventor recognizes that consultants tend to be cost-effective for large companies and same city businesses while such consulting resources may not be available to small, medium-sized, or remote businesses. Thus the present inventor has recognized that it may be particularly advantageous for these smaller or remote entities, or satellite offices of large companies, to perform the same functions in-house, utilizing proper tools for direction and planning.

SUMMARY

The present disclosure addresses aspects of managing both a traditional and a mobile workforce. The first aspect of the system disclosed for managing a change event is directed toward incorporating corporate culture and employee morale concerns into a relocation management process that can be facilitated from within an organization, as a "self-move." The second aspect of the system disclosed for managing a change event is directed toward organizing and maintaining connectivity with individual mobile workers.

In a preferred method, four main areas of the method and system for managing a change event are identified as: logistics, goals, contingency planning and people. Whereas most corporation relocation systems concentrate entirely on logistics, one process according to a preferred application focuses a large percentage (e.g., 75%) on the other areas that make a pivotal difference between success and failure of a relocation project—by nurturing employees who make up an organization. A system disclosed that corresponds to the described method incorporates change management techniques into project tasks, the system providing information and tools for project management, time management, team building, and improved communication in a workplace undergoing a change event or supporting a mobile workforce. The method disclosed, is operative in ensuring smooth business relocation by acknowledging and managing human factors along with operational tasks. The present disclosure also incorporates and addresses many of the strategic and "soft" issues that influence a change event, creating a holistic process.

One preferred system disclosed allows a user to incorporate existing software tools to manage "nuts and bolts" aspects of planning and executing a change project, with one or more of the following: 1) an information-based change management kit to address human factors elements, the kit a) providing a tangible set of tools to assist change management and to buoy employee morale and b) disseminating information about successful techniques for wider use by remote organizations unable to access or afford a live change consultant; and 2) an information-based mobile worker kit provides a set of tools to facilitate individuals working productively in a constantly changing environment.

Additional aspects and advantages will be apparent from the following detailed description of preferred embodiments, which proceeds with reference to the accompanying drawings.

BRIEF DESCRIPTION OF THE DRAWINGS

FIGS. 8A1-8J8 are graphic images of an example of 67 Category cards grouped by number of days ahead of a deadline, according to a preferred embodiment.

FIG. 9 comprises a layout of a set of Coordination cards and FIGS. 9A, 9B and 9C are graphic images of the Coordination cards as arranged in FIG. 9.

FIGS. 10A1-10D7 are graphic images of an example set of 32 Coordination cards according to a preferred embodiment.

FIG. 12A1-12C2 are graphic images of Totals cards for the following categories: Administration, Architecture & Construction, Communication, and Data (12A), Equipment, Files & Records Storage, Furniture, and Operations (12B). Telephone, and Move (12C).

FIG. 18 is a table listing types of alternative embodiments that may comprise a set of customized versions of the change management kit.

FIG. 19 is a graphic image of the packaging for a preferred embodiment of an individual move kit.

DETAILED DESCRIPTION OF PREFERRED EMBODIMENTS

Figure 1:
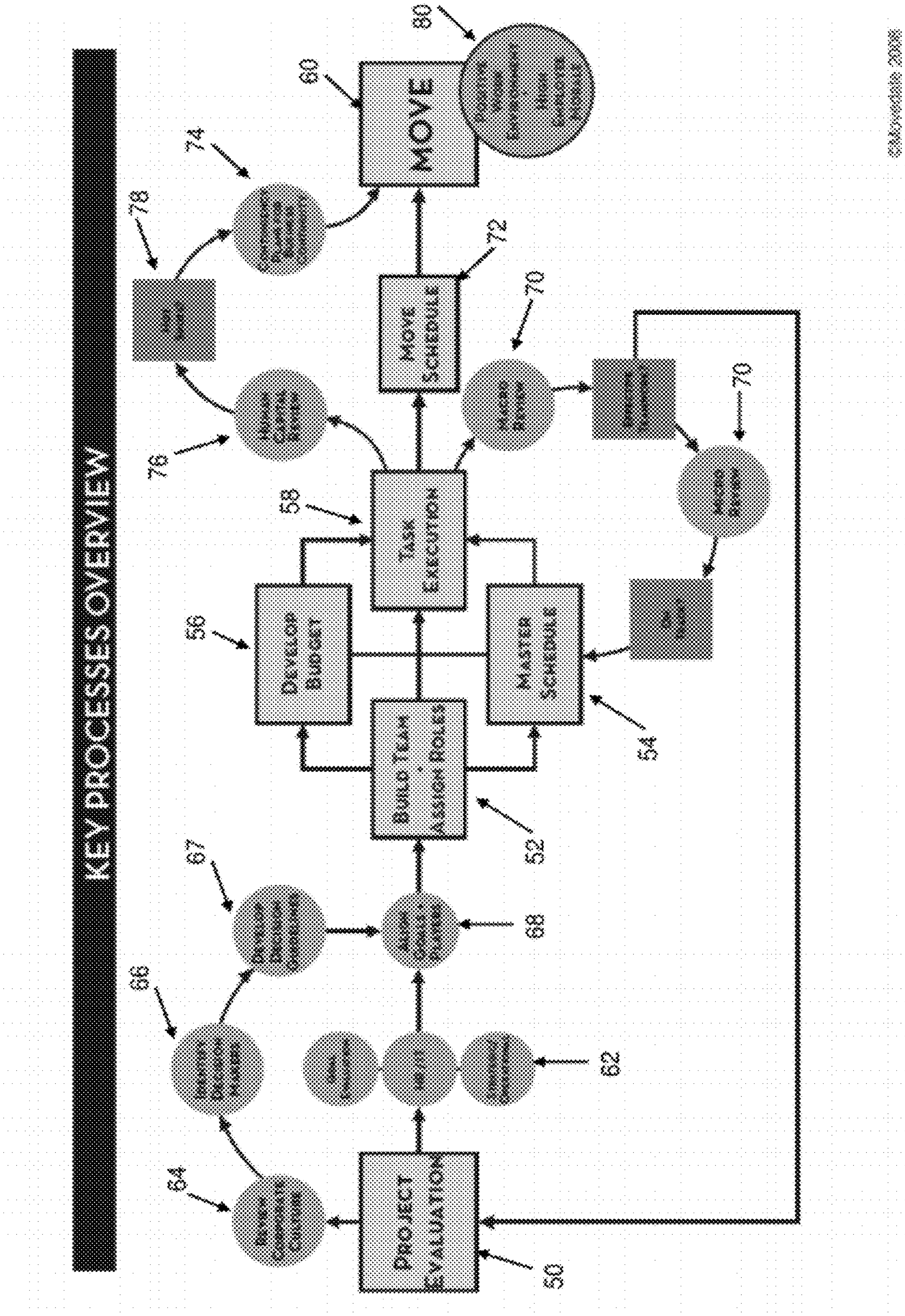
FIG. 1 is a flow diagram of the change management process for managing an office move, according to a preferred embodiment.

Preferred embodiments are described herein with reference to the drawings. FIG. 1 is a flow diagram illustrating steps in managing a change event according to a preferred embodiment, which includes improvements in the form of change management reviews that result in a positive outcome for an organization. The management process described is applicable to a range of change events such as company mergers, reorganizations, and the like; the change event used as an example in FIG. 1 and thereafter is a corporate relocation.

A conventional office move process typically includes a subset of milestones represented in FIG. 1 as grey rectangles in a horizontal arrangement: A typical move manager may begin an office move project with an overview involving a project evaluation 50. Next, the move manager assigns a move team 52, creates a master schedule 54, develops a budget 56, and proceeds to the task execution phase 58. A final move schedule 59 is then created prior to executing the move 60 as planned. What is missing from this scenario is careful consideration of human factors and business continuity throughout the process of managing the move, accompanied by frequent re-assessment and re-alignment.

Additional steps and decision points incorporated by a preferred method are represented by ovals, diamonds, and curved arrows inserted into FIG. 1 between the grey rectangular milestones: overall business strategy and operational goals of the organization, along with human resources (HR) and information technology (IT) goals 62 are evaluated at the outset. This formative planning stage is the time for examination of the culture of the existing organization from the perspective of how the goals and the move might influence the culture. Corporate culture plays an intricate part in a move project by creating an experience unique to an individual organization and allowing for change management to be effective. A corporate culture review 64 assesses the current culture, anticipates how the corporate culture will be affected during and after the move. Changes recommended by the reviewing body may be incorporated into the process. Qualified decision makers are identified 66 at this early stage to coordinate key decision milestones with decision makers' schedules and to maintain multilevel checks and balances for the duration of the project. Defining decision guidelines 67 early in the process creates a clear guide for decision-making by tying decisions directly to the goals of the project. Because goals shift during a move, it is important to have the decision makers involved from the outset to align goals and players 68.

When assembling a team, best results are achieved when both external and internal sources of human capital are tapped.

As the move project progresses through task execution phase 58, ongoing assessments of team communication and effectiveness against goals offer a chance to address special needs and adjust team membership in mid-stream. Regular monitoring of task status is completed via a cycle of reviews 70, which are reflected in adjustments to role assignments 52, master schedule 54 and budget 56, culminating in a final move schedule 59. Changes in goals are reflected via the feedback system provided through repeated cycles of assessments and updates. Review cycles may be repeated several times throughout a change management process, or on a periodic or a more frequent basis.

Most importantly, comprehensive contingency plans 74 are formed in response to ongoing reviews 76 of the effects of move-related activities on departments and individual employees. For instance, such reviews may reveal that a key activity in one department conflicts with scheduled move activities, or that key people are scheduled to be absent on the move date, or that individual employees have special needs and concerns that, if omitted from consideration in the move plan, could result in low morale and compromised productivity. Contingency plans 74 are initiated by the move coordinator and the move team prior to the target move date, thereby preventing unexpected crises, or "hot spots" 78 from derailing operations and on-time delivery, and providing a positive work environment 80 immediately, in the new locale.

A preferred embodiment corresponding to the system disclosed is presented in the form of a change management kit configured for managing an office relocation. The kit may be modified as needed to suit management of other change events. A preferred relocation kit 100 and its component parts are illustrated in FIGS. 2-17. Relocation kit 100 is designed to simplify the relocation process and help managers and employees who are moving their workspace experience a sense of control, order, calm, and fun throughout a seamless transition.

Such positive feelings are inspired by a set of custom graphic motifs as shown in various photographs of a preferred embodiment. With reference to FIGS. 2-5, components of relocation kit 100 are decorated with four custom graphic motifs: a first graphic motif is designed to convey a sense of freshness, rebirth, and new possibilities, things one would hope for when moving to a new location. In a preferred embodiment, an image used to illustrate this mood is a soft focus close-up photograph of blades of spring green grass 110 (FIG. 3). A second graphic motif is designed to elicit a sense of calm, simplicity, and order—a desirable mindset for a move manager. In a preferred embodiment, an image used to illustrate the desired calm, simple, orderly mood is an abstract line drawing 114 suggesting the blades of spring green grass 110 of the first motif, and featuring bright white outlines on a dark brown background with matte gold lower case lettering 116. A third graphic motif, shown later, is an inverted graphic similar to line drawing 114 that appears on some components in "reverse field" i.e., outlines are drawn in dark taupe on a light taupe background with accent lines in matte gold. A fourth graphic motif entails the use of bright color accents 118 throughout the kit, to convey a sense of playful excitement and fun that a move manager might hope to inspire in team members. A color scheme chosen for this purpose in a preferred embodiment is graduated shades of pink and fuchsia.

Figure 2:
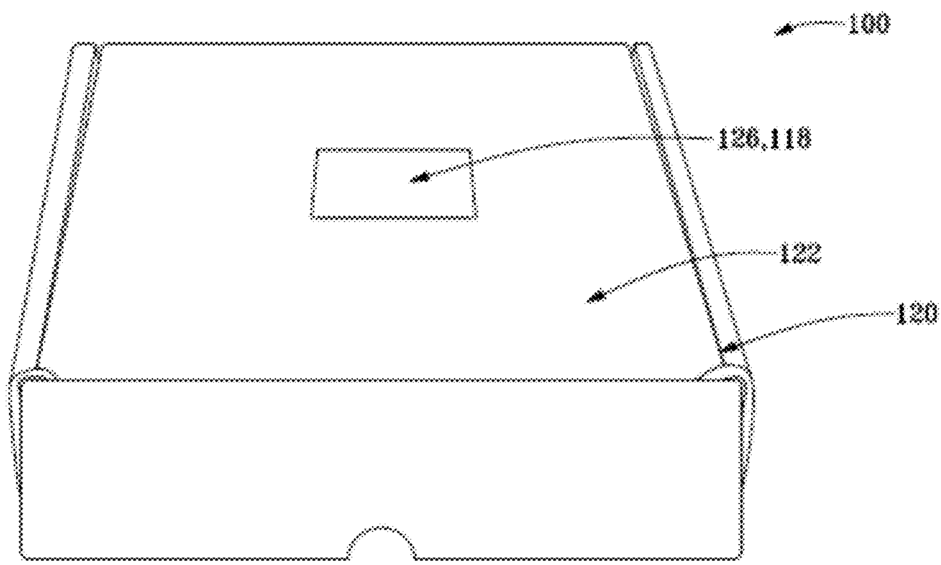
FIG. 2 is a perspective view of the exterior of a presentation container for a preferred embodiment of a change management kit.
Figure 3:
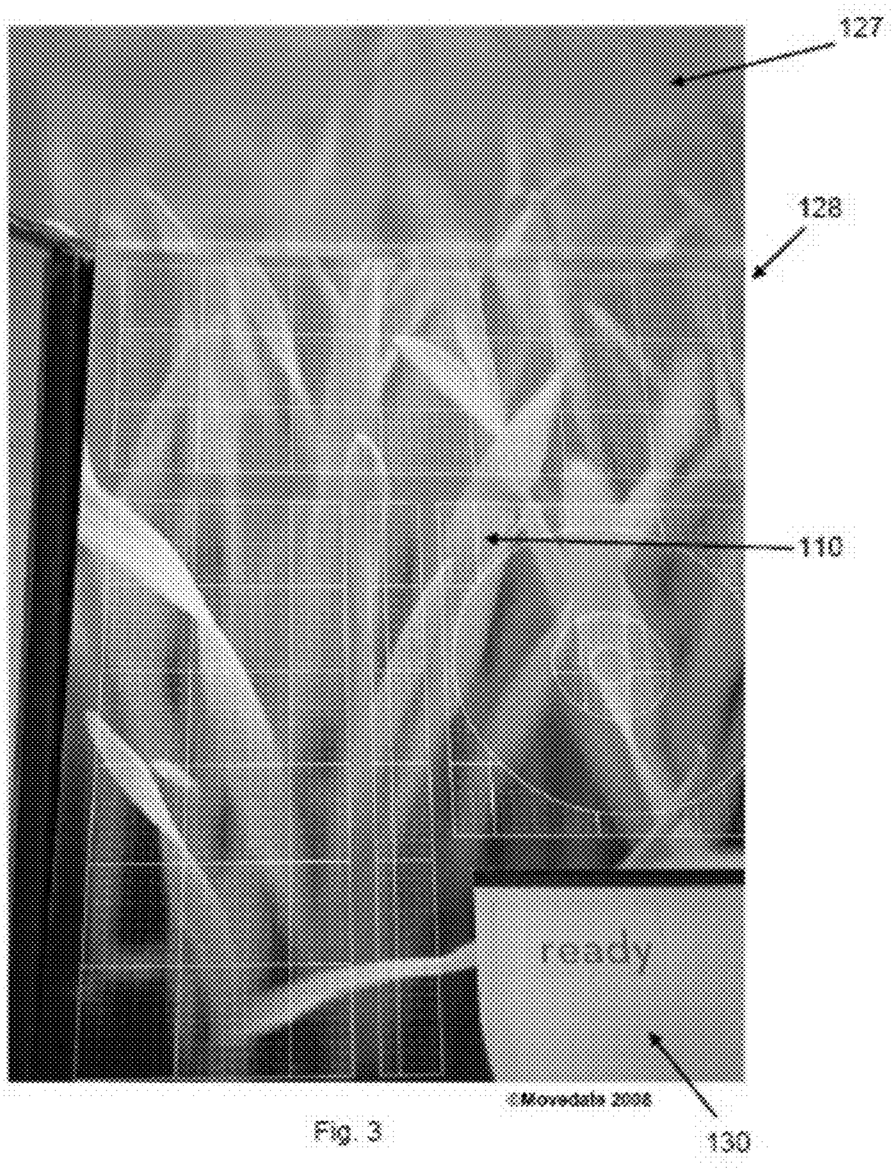
FIG. 3 is a photograph of a graphically decorated horizontal divider that covers and protects compartments within the kit of FIG. 2.
Figure 4:
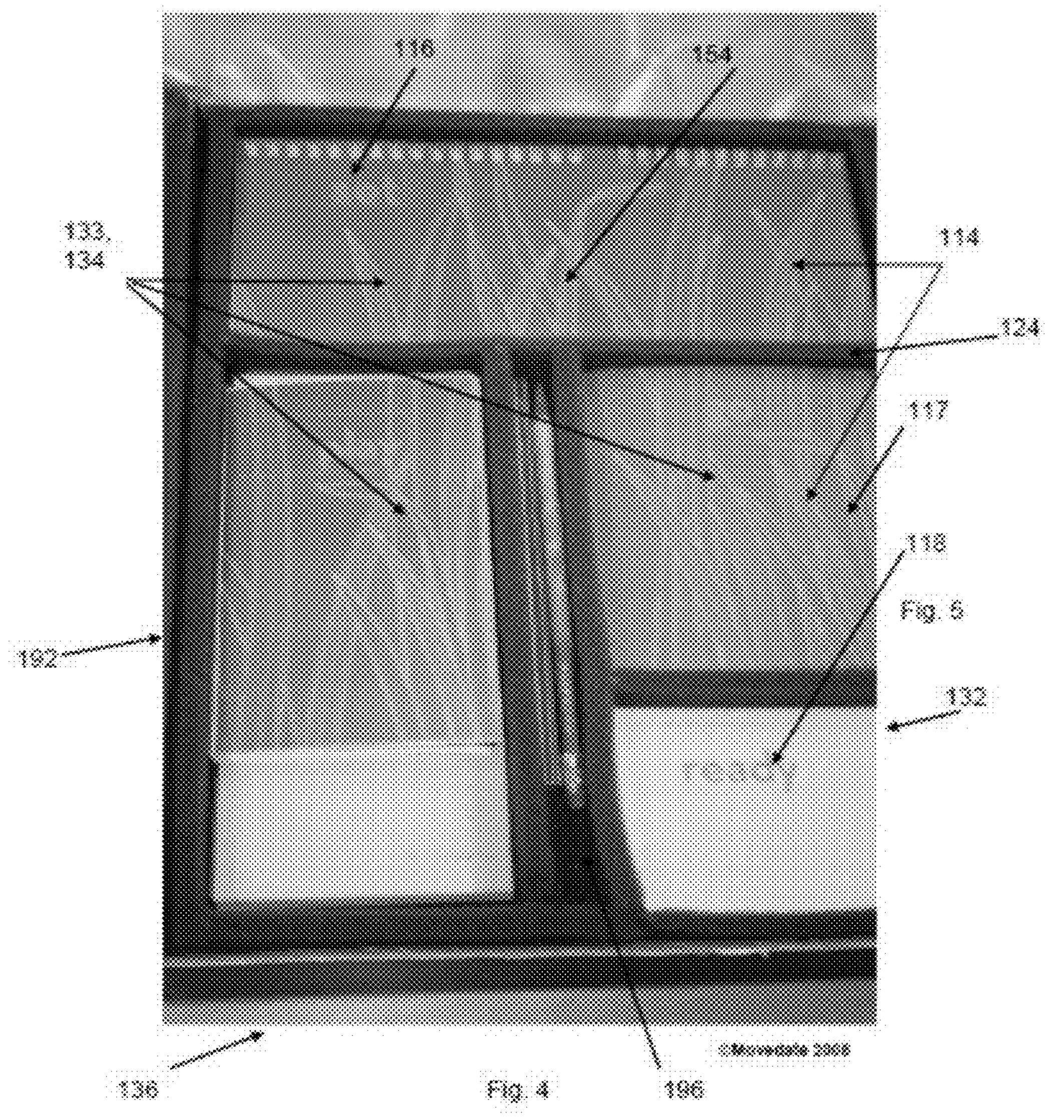
FIG. 4 is a photograph of components of the relocation kit stored in their compartments.
Figure 5:
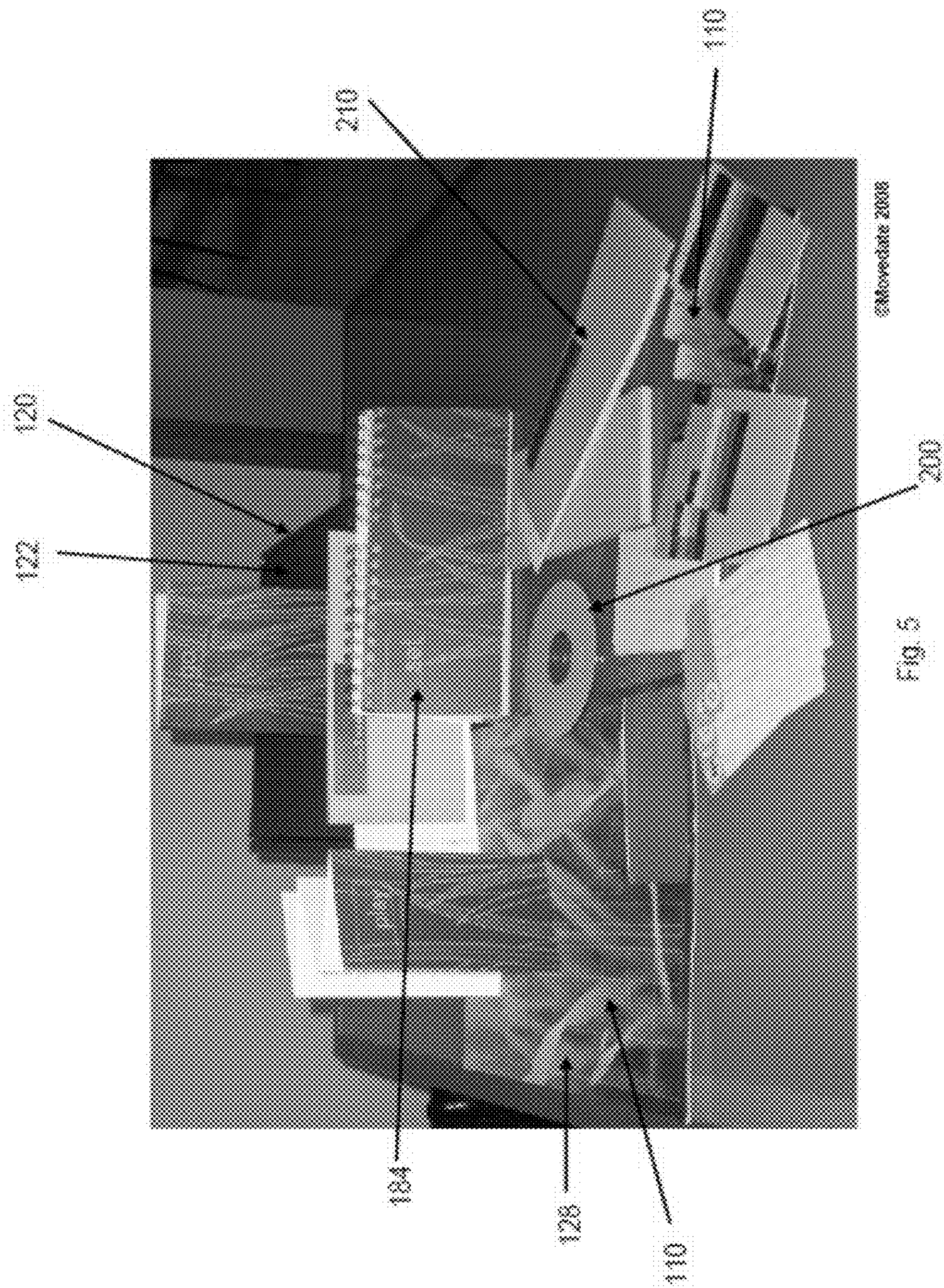
FIG. 5 is a photograph of the preferred change management kit of FIG. 2 with its contents removed.

With reference to FIGS. 2 and 4, a preferred embodiment of relocation kit 100 is shown as being housed in a multi-layer printed cardboard presentation box or container 120 with a hinged lid 122, segmented by vertical dividers 124 into five rectangular compartments, each compartment of a different size and shape. The exterior of relocation kit 100, shown in FIG. 2, resembles a motivational gift box, sturdy and elegant, with a simple square fuschia label 126 on a dark brown background. The interior cover 127 of hinged lid 122 is printed with the calming color graphics of the first motif. A rigid horizontal divider 128, printed with a continuation of the same graphic image 110 as is depicted on interior cover 127 with a superimposed white line grid 129, hides and protects the box contents. A rectangular cutout in the lower right corner of rigid horizontal divider 128 exposes a compartment 130 containing a solid cover card 132 labeled "READY" in fuchsia lettering. Underneath rigid horizontal divider 128, printed covers 133 of components 134 reading "SET", "GO", and "PLAY" in matte gold lettering, collectively resemble a motivational game 136 (FIGS. 4 and 5). Printed covers 133 match each other, each cover having the line drawing 114 as a graphic motif. Paper items are printed with matching graphics and stylized sans serif fonts throughout. Card stock and paper stock background colors are in muted tones, easy on the eyes, with text in a darker shade of the background color.

Each compartment of kit 100 houses one or more different components of the relocation kit, each component being a change management tool or set of tools designed to be used by employees, consultants, or advisors tasked with facilitating the move process. Component materials within the compartments of kit 100 shown in FIG. 4 are designed to be handheld, and as such, are small, removable, configurable, and modular so that all components promote building levels of inclusivity, by allowing for senior managers and employees to be part of the process. Components of kit 100 may be used in working meetings, laid out on conference tables, stacked and re-organized, disseminated to individual team members, or carried in a pocket (FIG. 5). Kit materials may be used in conjunction with computer-based tools, without requiring project managers to depend on computer screens for access to necessary information. Components can be used independently or as part of a cohesive system.

For each topic included in the kit, the user is led through a process of considering the topic from a bird's eye view and then focusing on the details, to complete the project on schedule. Multiple versions of the relocation kit are envisioned for businesses of different types and sizes where the content of each tool is customized accordingly. For example, content for a 1000-person medical facility may be different from that for a 50-person satellite office move in a financial services business.

Figure 6:
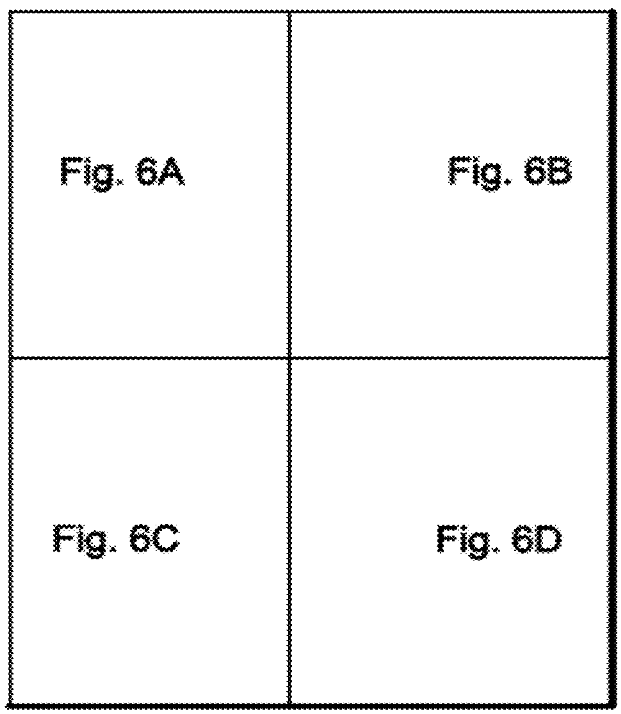
FIG. 6 (comprised of FIGS. 6A-6D) is a layout of graphic images of the three subsets of cards comprising "READY:" Category cards, Coordination cards, and Total & Overview cards.
Figure 6B:
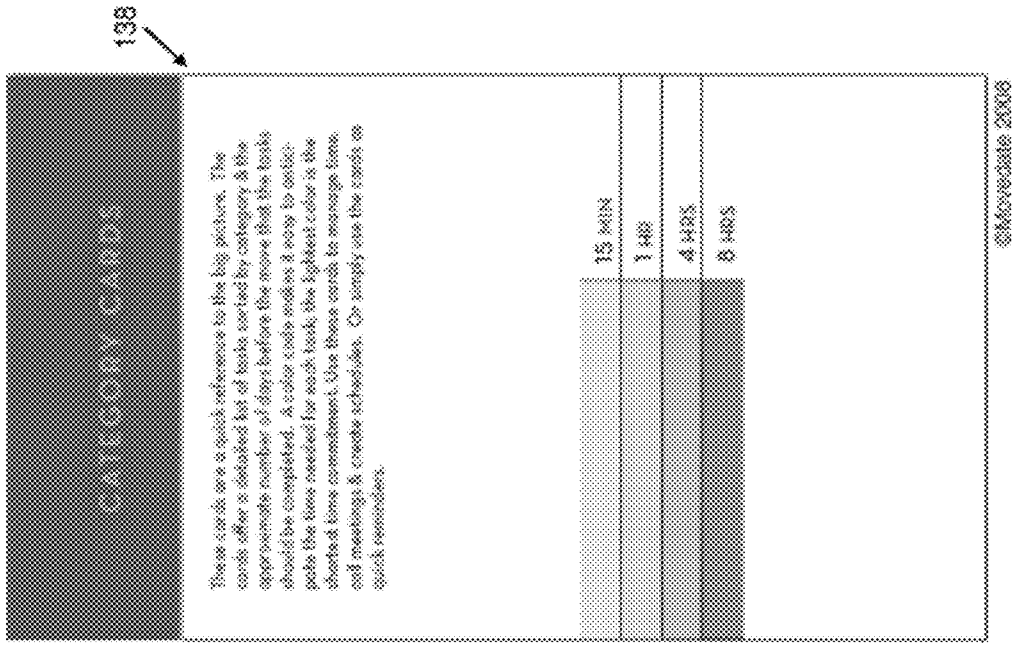
Figure 6A:
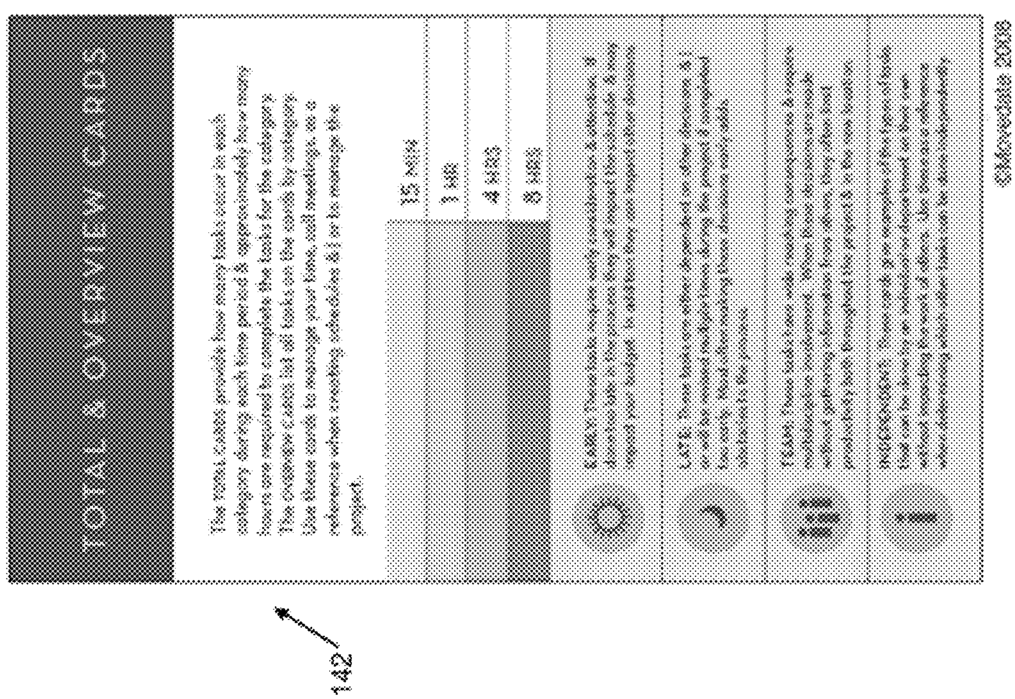
Figure 6D:
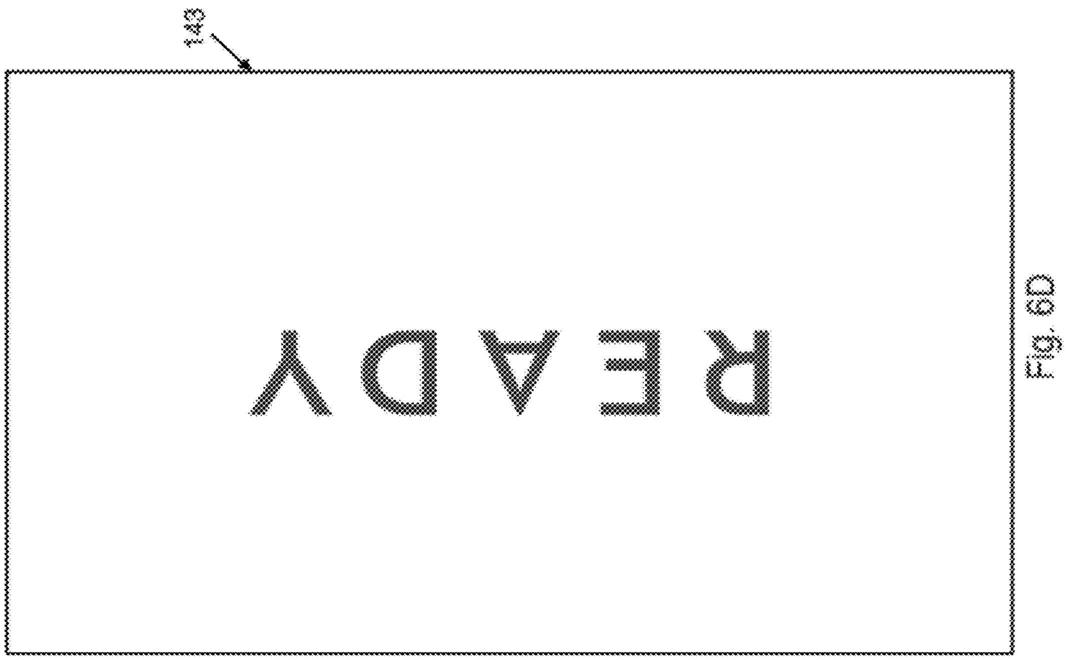
Figure 6C:
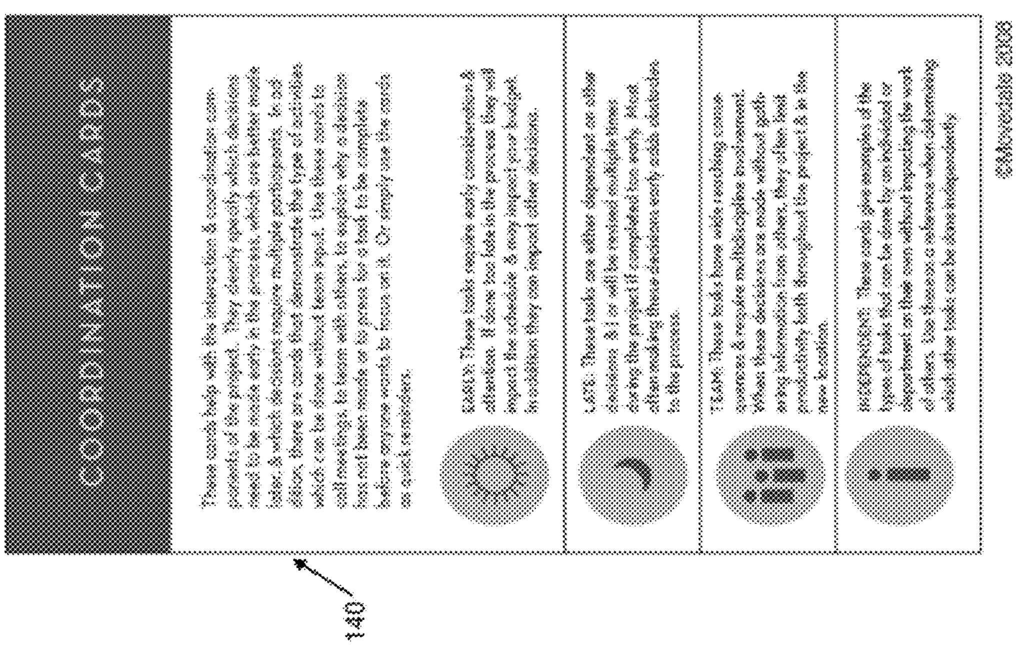

Underneath the "READY" cover card (FIG. 4) 132 in compartment 130 are found three distinct subsets, or decks, of rigid printed cards: Category Cards 138, Coordination Cards 140, and Total & Overview cards 142 (FIGS. 6, 6A-6D). Each deck of cards includes a summary card, on the reverse side 143 of which is printed with the word "READY" as shown in FIG. 6D. Cards are also available for download in electronic form.

Figure 7:
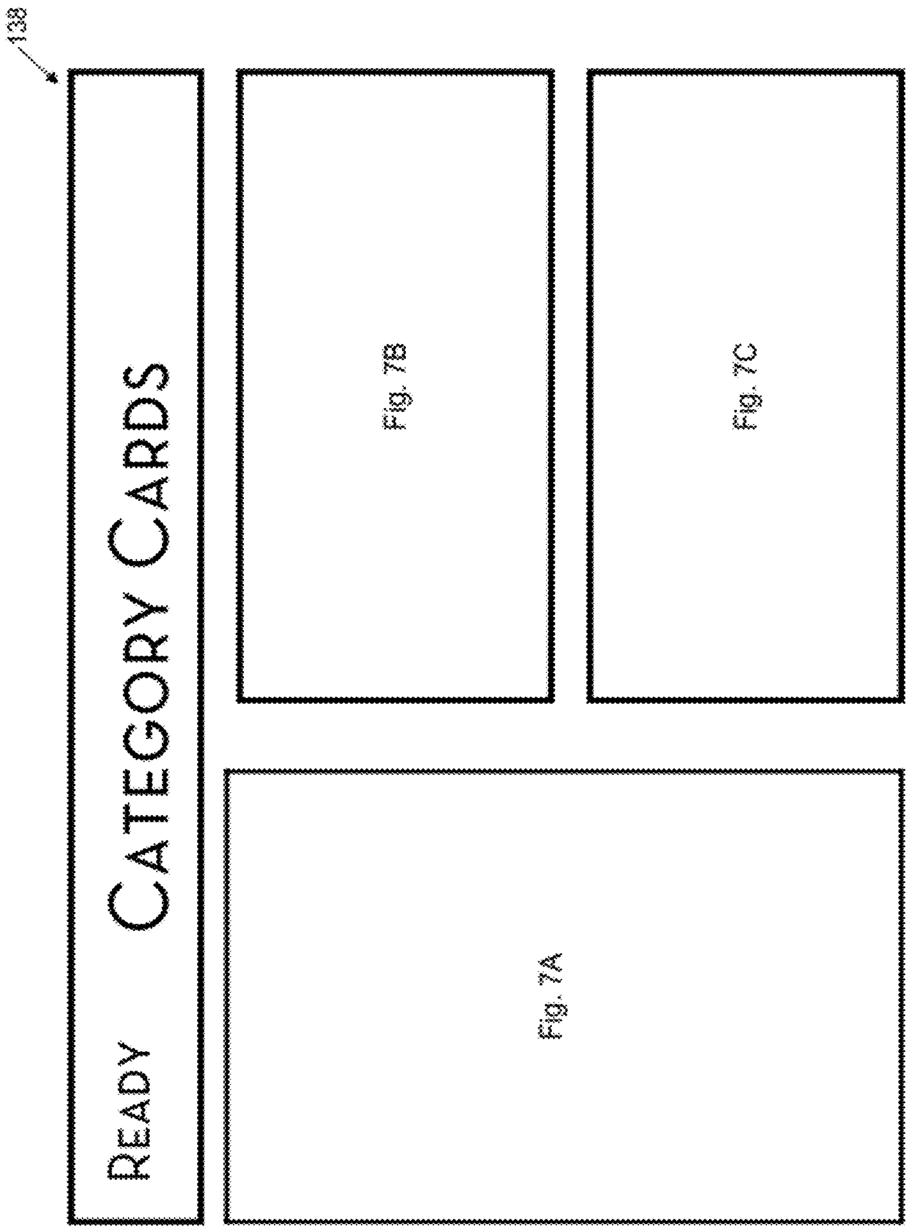
FIG. 7 comprises a layout of a set of Category cards and FIGS. 7A, 7B and 7C are graphic images of the Category cards as arranged in FIG. 7.
Figure 7A:
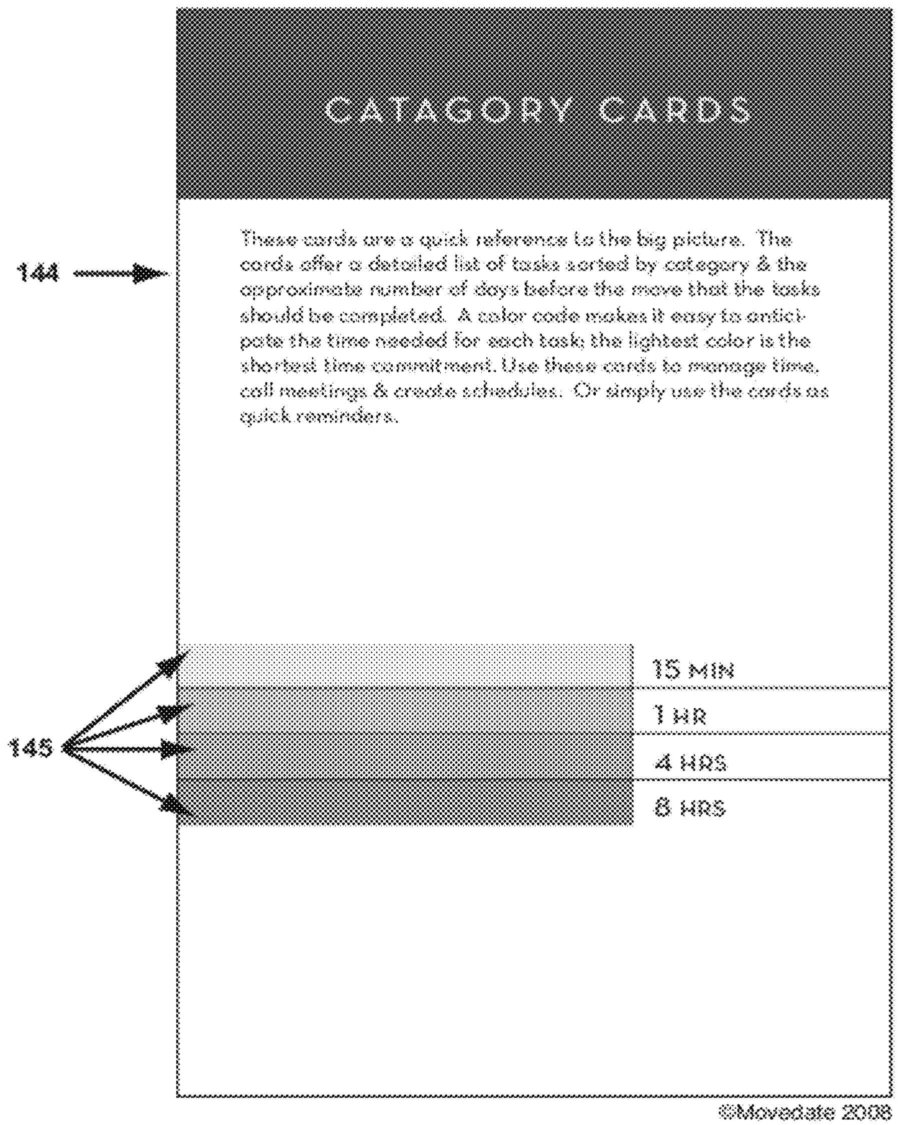
Figure 7B:
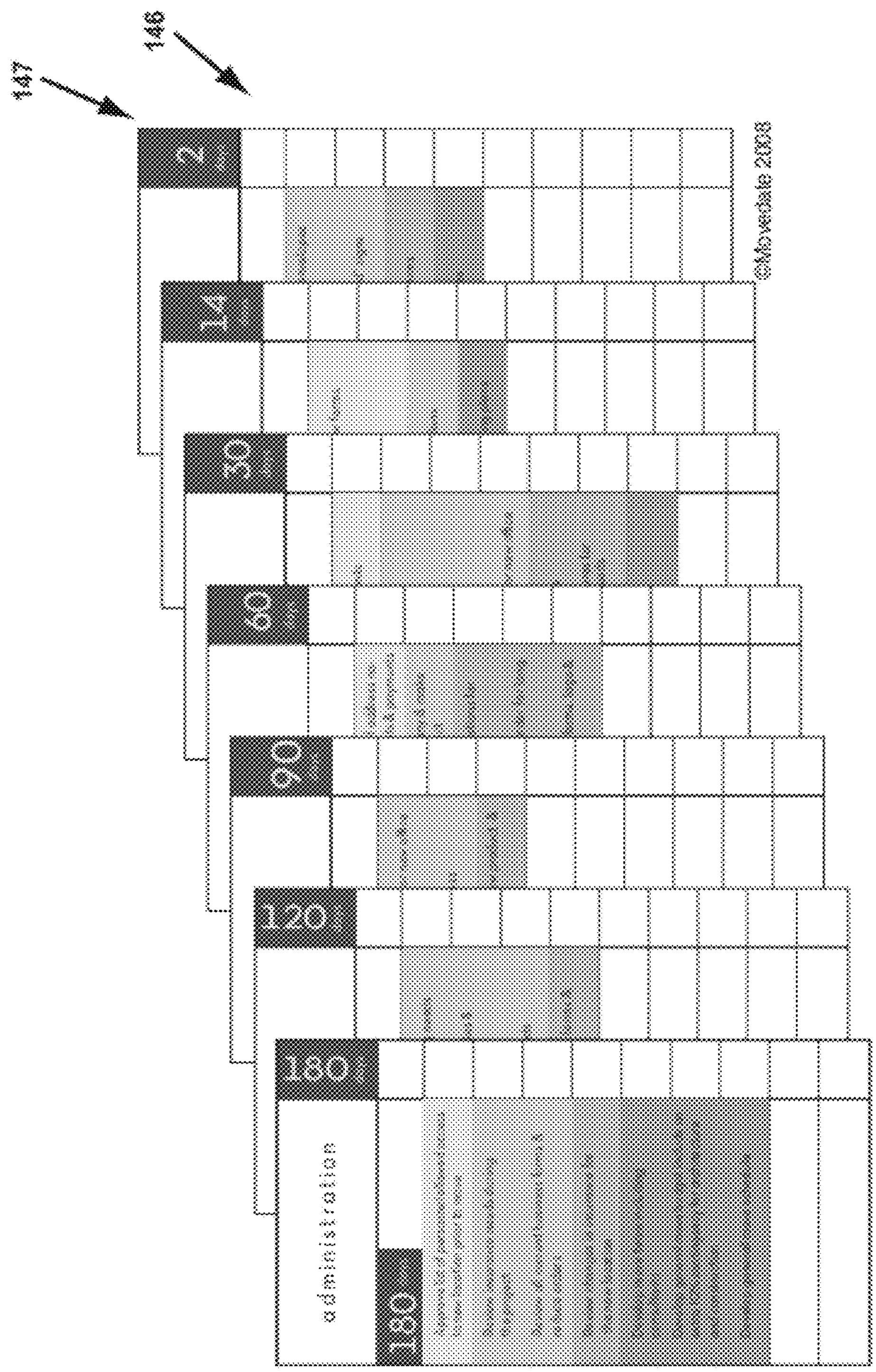
Figure 7C:
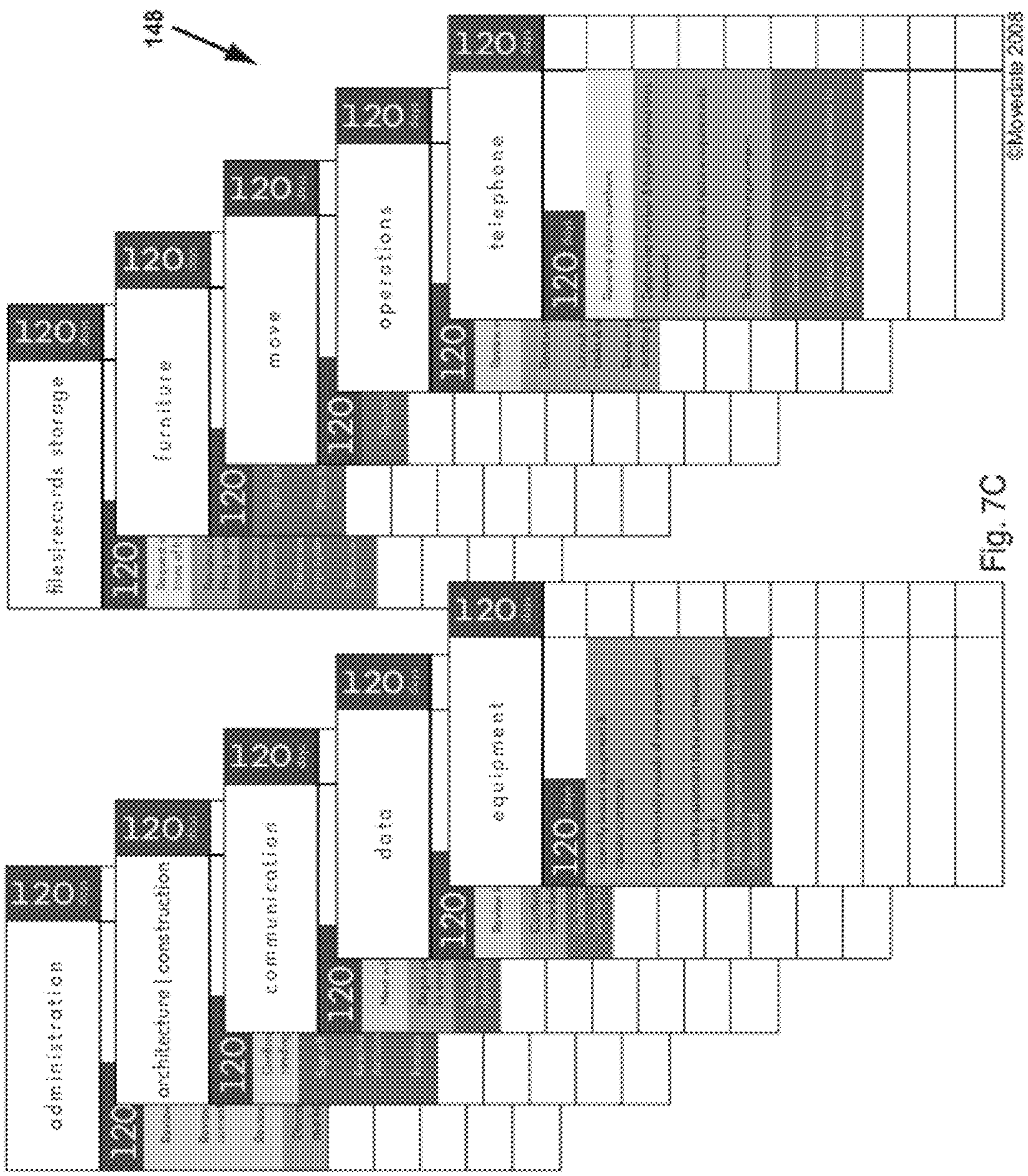

FIG. 7 illustrates a layout of task Category cards 138 comprising the first subset. Category cards are integral to the overall process, as tools for effective meetings and for maintaining accountability, or simply as quick reminders. They can be used independently or with other subsets of cards. Category cards 138 can be used to manage time, call and organize meetings, assign tasks, communicate with team members track project activity, and create project schedules. They offer a detailed list of tasks sorted by category, along with an estimate of the amount of time each task will take in hours and minutes, and an approximate time reference indicator in days. The estimates of time required to do specific tasks are based on industry best practices. Shorter duration tasks are listed at the top of the card; the most time-consuming tasks are listed at the bottom of the card. A summary card 144 on the left of FIG. 7 defines a color code 145 for scheduling and facilitating time management. The color code darkens progressively from the top to the bottom of the card according to length of time commitment needed to complete each task, the lightest color corresponding to the shortest time commitment, and subsequent darker colors corresponding to progressively longer time commitments. A first fanned-out deck 146 of administration Category cards provides a "days countdown" via a time reference indicator 147 in the upper right hand corner indicating the number of days remaining before a deadline (e.g., the move date). A second fanned-out deck 148 of Category cards groups together tasks to be done 120 days ahead of the deadline.

Figure 8K:
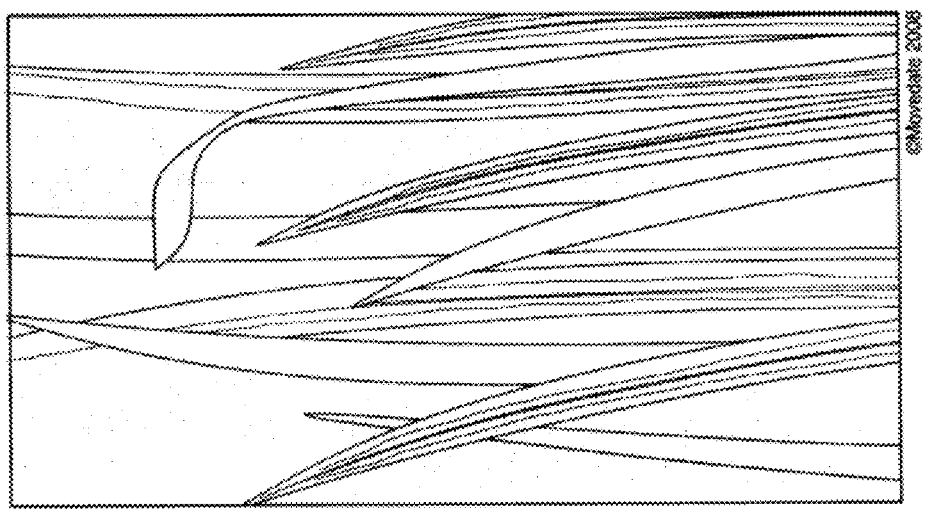
FIG. 8K is a sample graphic motif that appears on the reverse side of each Coordination card.

In a preferred embodiment, each of 23 categories (e.g., Telephone, Security, Furniture, Administrative, Computer, etc.) listed below in Table 1 is represented in the set of Category cards. Categories may be combined under a common heading to simplify and reduce the number of cards. Thus, a full collection of Category cards for a move project may exceed 100 cards, or it may be as small as 20 cards; a representative set of 68 example Category cards is presented in FIGS. 8A1-8K. FIG. 8K includes a sample of the inverted graphic 149 (the third graphic motif) that appears on the reverse side of each Category card.

TABLE 1

| Task Categories | | |
|---|---|---|
| Accounting | Equipment | Personnel |
| Administrative | Files | Schedules |
| Announcements & Notices | Furniture | Security |
| Architecture & Construction | Mail | Selections |
| Budgets | Move | Supplies |
| Cleaning | Notices | Telephone |
| Communication | Office Services | Transportation |
| Data | Operations & Procedures | Workplace |

Coordination cards 150 comprising, as the second subset, a decision-based system of organization, are designed to assist a manager with the interaction and coordination components of a project. Coordination cards 150 highlight requirements for additional communication between teams that may not normally be in contact with each other, and to encourage timely decisions. Coordination cards 150 also may be used individually or with subsets. The cards are laid out to clearly specify which decisions need to be made early in the process, which decisions are better made later, and which decisions require multiple participants. In addition, there are cards that demonstrate the types of activities that can be done without team input. Coordination cards 150 are used to call meetings, to team with others, to justify why a decision has not been made, to motivate task completion, or simply as quick reminders.

Figure 9:
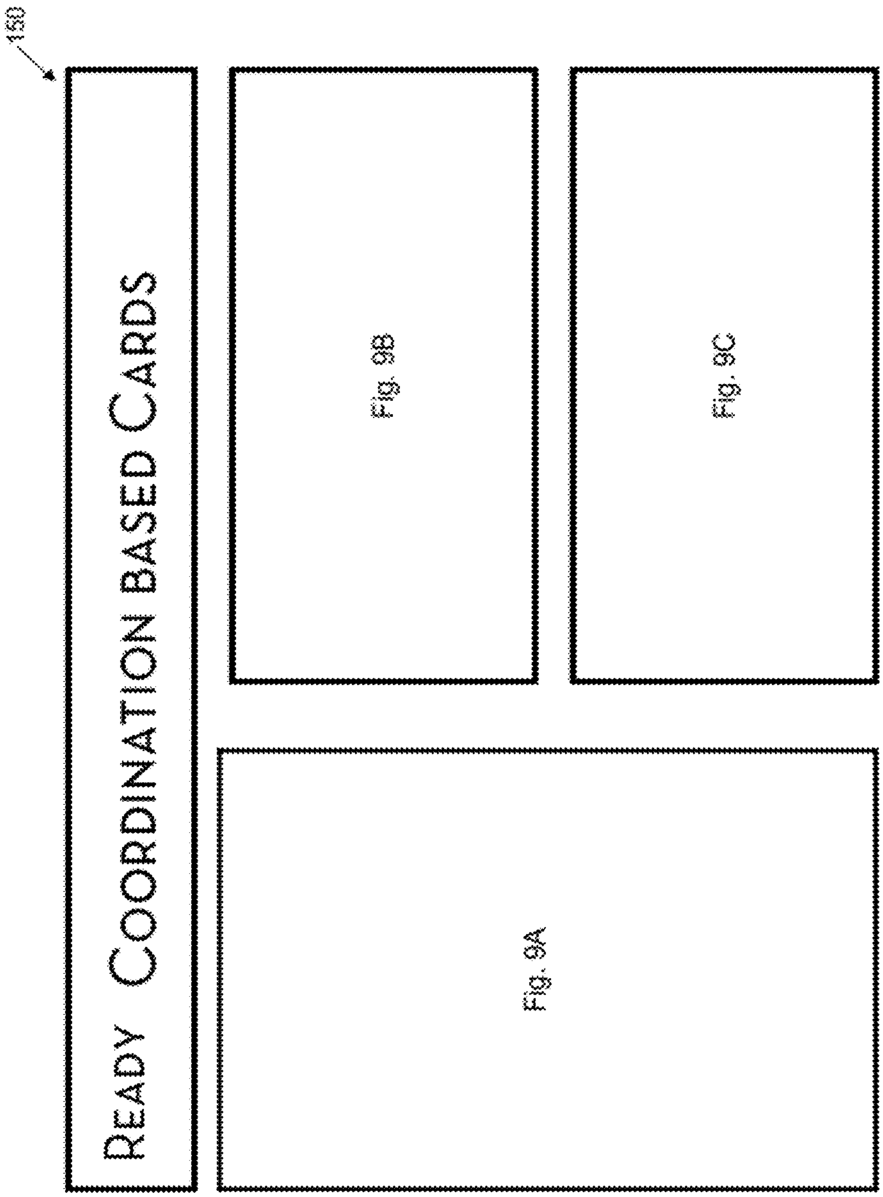
Figure 9A:
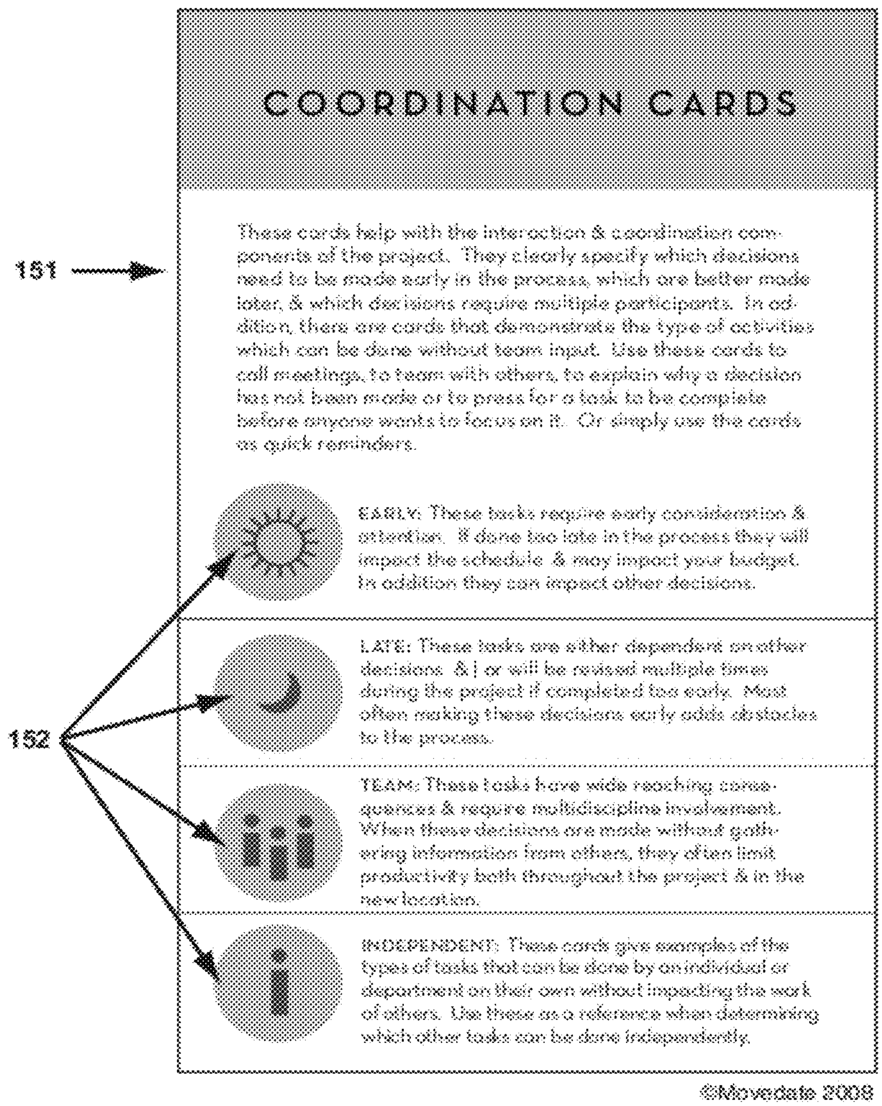
Figure 9B:
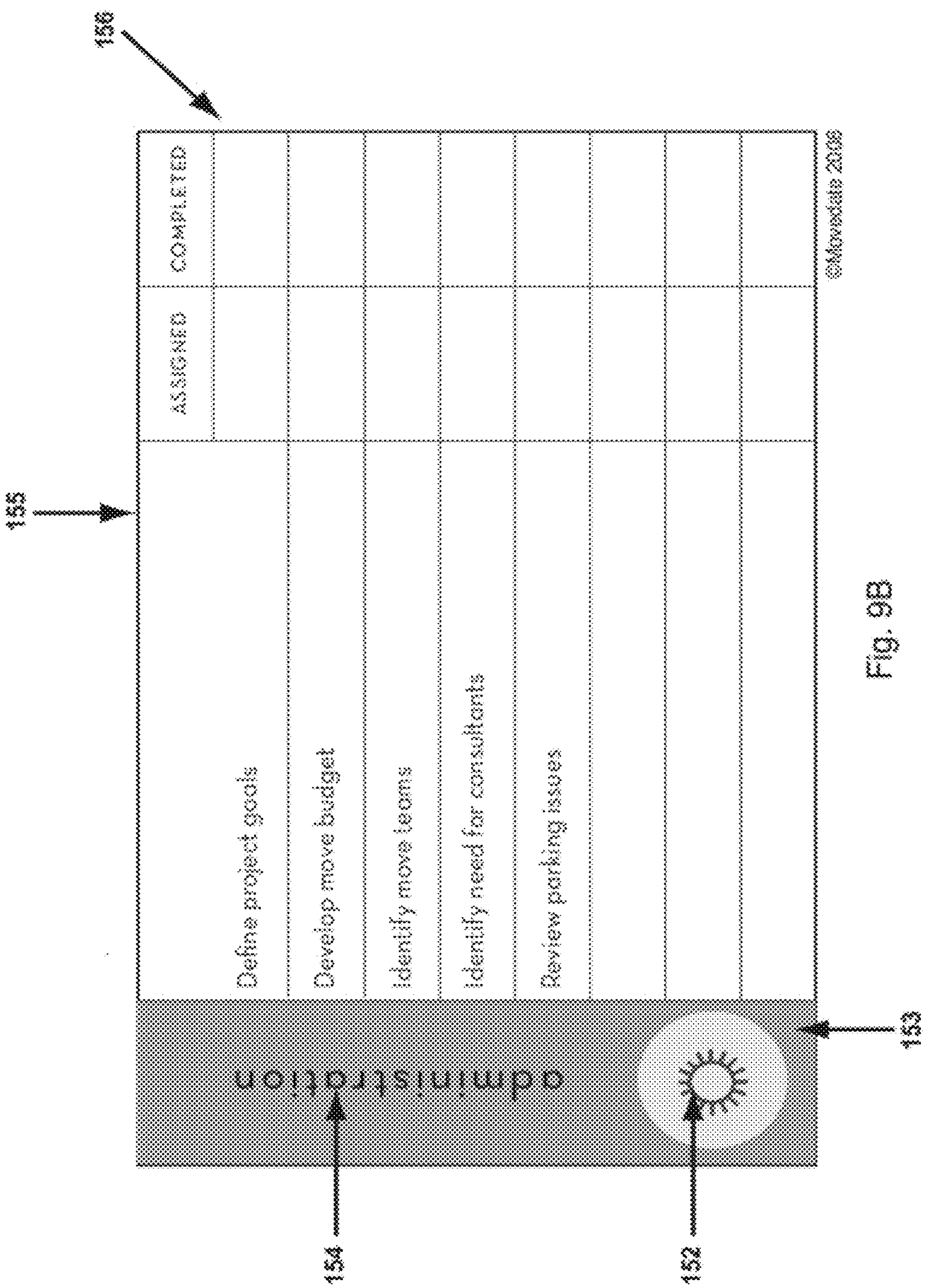
Figure 10E:
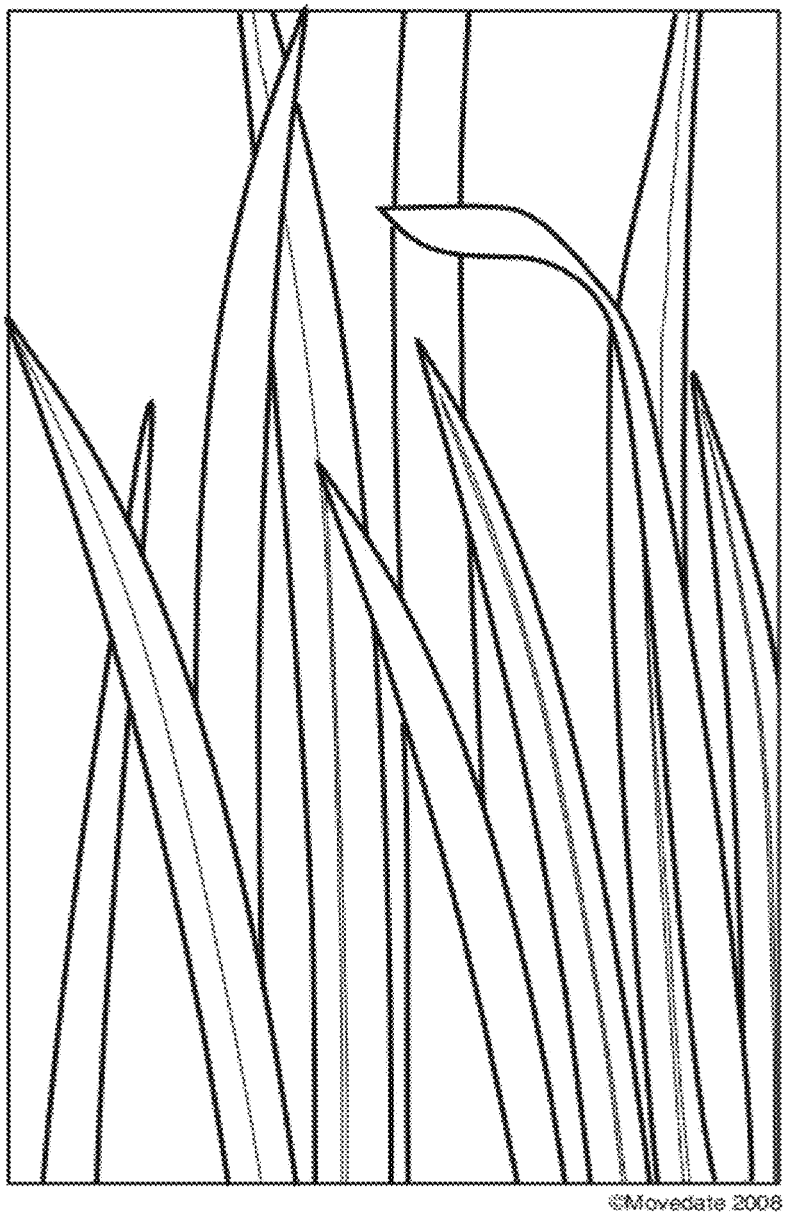
FIG. 10E is a sample graphic motif that appears on the reverse side of each Coordination card.

With reference to FIG. 9, a layout of three coordination cards is shown, details of the three cards being illustrated in FIGS. 9A-9C, wherein a summary Coordination card 151 arranged on the left in FIG. 9 and illustrated in FIG. 9A, defines task dependency icons 152: sun (early), moon (late), i (independent), and iii (team/interdependent). In a preferred embodiment, task dependency icons 152 are printed in fuschia within a solid taupe circle. Coordination cards are printed on one side in landscape orientation. Each Coordination card includes a title bar 153 containing a category heading 154 and one of icons 152. The body of the Coordination card is a coordination activity list 155. Checkbox columns 156 to the right of coordination activity list 155 facilitate tracking task assignment and completion. An arrangement of two sample Coordination cards are shown on the right of FIG. 9, details of the two cards are shown in FIGS. 9B and 9C: a card listing Administration tasks with early deadlines (sun icon), and a card listing data-related tasks that require teamwork to complete (team icon). Use of bright colors and clearly identifiable icons on Coordination cards facilitate organization at a glance. Coordination cards for a preferred embodiment are displayed in FIGS. 10A1-10D7. FIG. 10E includes a sample of inverted graphic 149 (the third graphic motif) that appears on the reverse side of each Coordination card.

Figure 11A:
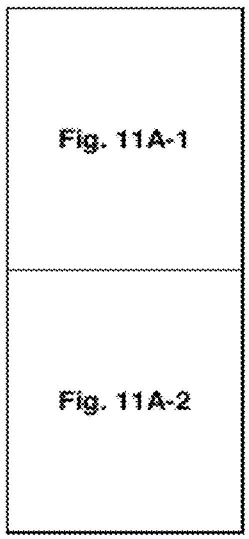
FIG. 11A (comprised of FIGS. 11A1 and 11A2) and FIG. 11B (comprised of FIGS. 11B1 and 11B2) are graphic images of Overview cards for the categories Architecture/Construction and Equipment, including tasks grouped by time reference indicators and by coordination icons.
Figure 11B:
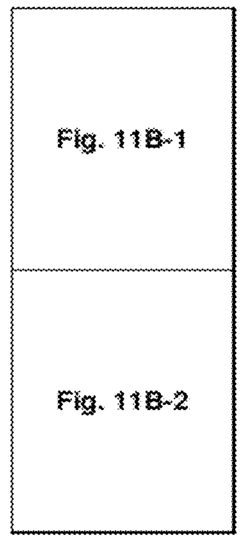
FIG. 11C (comprised of FIGS. 11C1 and 11C2) and FIG. 11D (comprised of FIGS. 11D1 and 11D2) are graphic images of Overview cards for the categories Architecture/Construction, in which FIG. 11C lists tasks by time reference indicator, and FIG. 11D lists tasks by coordination icon.
FIG. 11E is a sample graphic motif that appears on the reverse side of each Overview card.
Figure 11C:
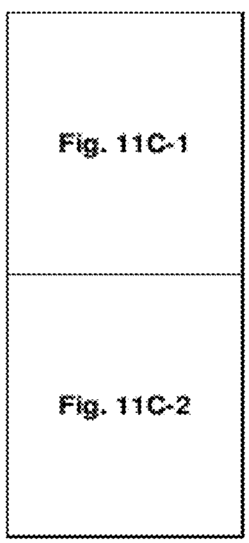
Figure 11D:
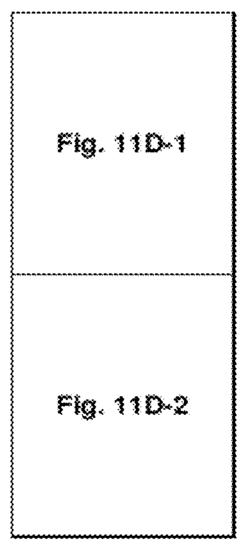
Figure 11E:
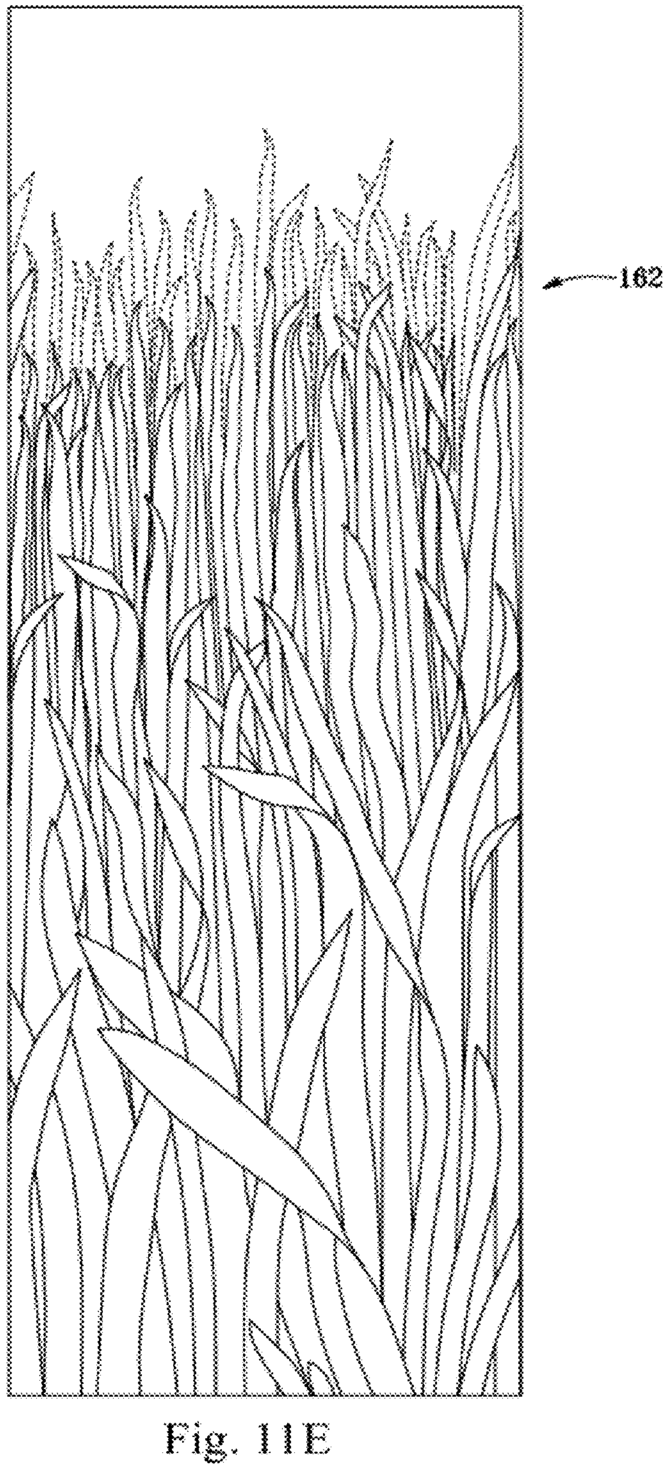
Figure 12D:
FIG. 12D is a sample graphic motif that appears on the reverse side of each Totals card.
Figure 13:
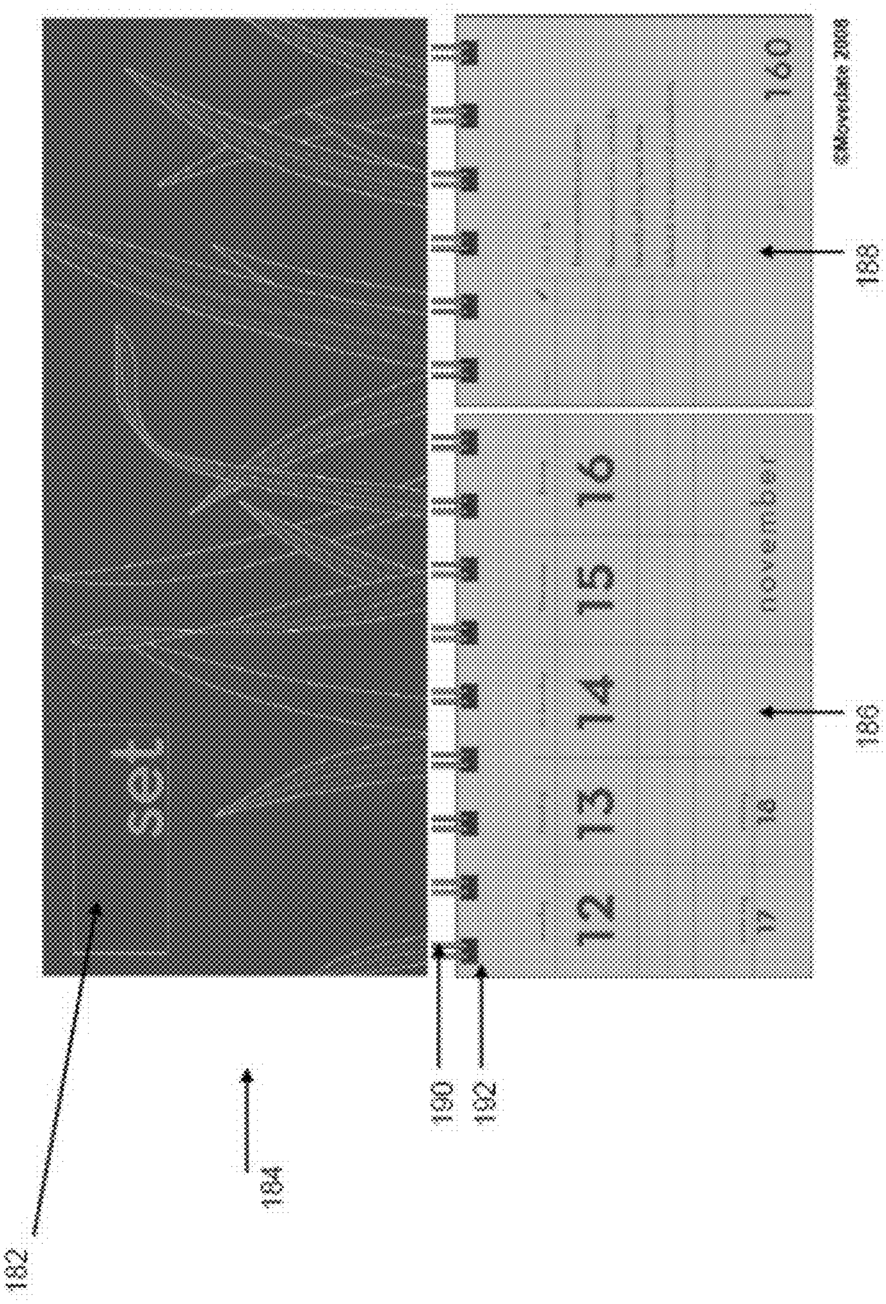
FIG. 13 is a graphic image of a "SET" time management device.

Overview cards 160 and Total cards 170 are intended for use by a move manager, project manager, or by senior management for assigning tasks to members of a team, tracking team member progress, planning work distribution, and managing time. Overview cards fold out to double length, as shown in FIGS. 11A-11D. The inside of each Overview card exhibits a table listing tasks within its associated category, with a checkmark column on the left. For instance, examples of Construction tasks include specific action items such as "select contractor" and "review architectural plans." A first type of Overview card shown in FIGS. 11A and 11B combines tasks and their associated time reference indicators 147 from the Category deck with coordination activities 155 and their associated task dependency icons 152 from the Coordination deck. A second type of Overview card shown in FIG. 11C lists tasks only by time reference indicators 147. A third type of Overview card shown in FIG. 11D lists tasks only by their task dependency icons 152. Reverse sides 162 of Overview cards 160 are printed with calming graphics of the first motif as shown in FIG. 11E, thus matching interior cover 127 of presentation box 120.

Total cards 170, shown in FIGS. 12A1-12C2, summarize the number of tasks for each time duration and at each time reference indicator. Total cards indicate how many tasks occur in each category during each time period and approximately how many total hours are required to complete the tasks for the category. These cards can be used with the Category subset, or they can be used independently by account or project leads, administrators, managers and supervisors. Total and Overview cards can be used together or alone on a project to manage time, call meetings, or serve as a reference when creating schedules. Reverse sides of Total cards 170 bear the graphic shown in FIG. 12D.

A kit compartment 180 containing a tool 182 labeled "SET" houses a time management device and quick reference tool designed to assist a project manager with organizing meetings, and tracking the detailed scope of the project and recommended completion times. In a preferred embodiment, the "SET" tool 182 takes the form of a two-section horizontal side-by-side free-standing flip calendar 184 (FIG. 13) in which the left section 186 of the 18 to 24-month calendar is a standard calendar presented in a matrix format so that information can be organized into daily lists. The right hand section 188 integrates a list of certain project tasks and a time reference indicator showing how many days prior to the project completion the tasks should be completed, thus tracking task progress as the countdown proceeds until moving day. Free-standing calendar 184 is designed for situations when computer access is limited or unavailable, or it is inconvenient to print a master schedule. Each section of calendar 184 may flip independently via a double reinforced metal spiral binding 190 along the top edge perforated with square holes 192. Calendar 184 has a rigid cardboard cover as well as a rigid back accordion cover which folds out into a triangular support structure allowing the calendar to stand upright on a table. Alternatively, tasks may also be downloaded into an electronic calendar system.

Used independently, "SET" tool 182 provides a general overview of a project, while including detailed tasks required for completion in the appropriate time frame and connecting those tasks to the project schedule. "SET" tool 182 can be used to create project schedules or manage the project team. Because calendar 184 is so simple to use, senior management can focus on a few pages of tasks that correspond to a specific time schedule in the project and know instantly what activities are planned at that time. Calendar 184 also allows a senior manager to track a project without reviewing an overly-detailed project schedule, and it lessens the need for detailed updates, calls, and memos. Thus, expending minimal time and effort, upper management can remain readily connected to the project.

Figure 14:
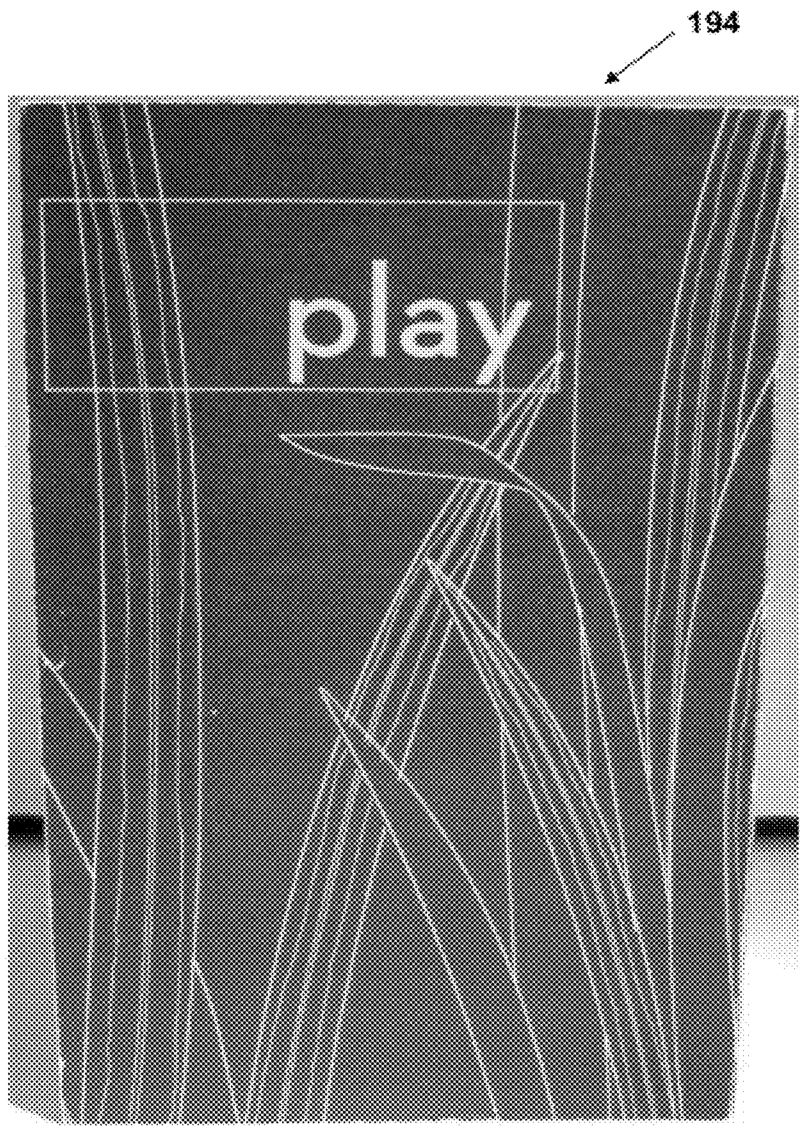
FIG. 14 is a photograph of a "PLAY" rigid accordion-style foldout.
Figure 15:
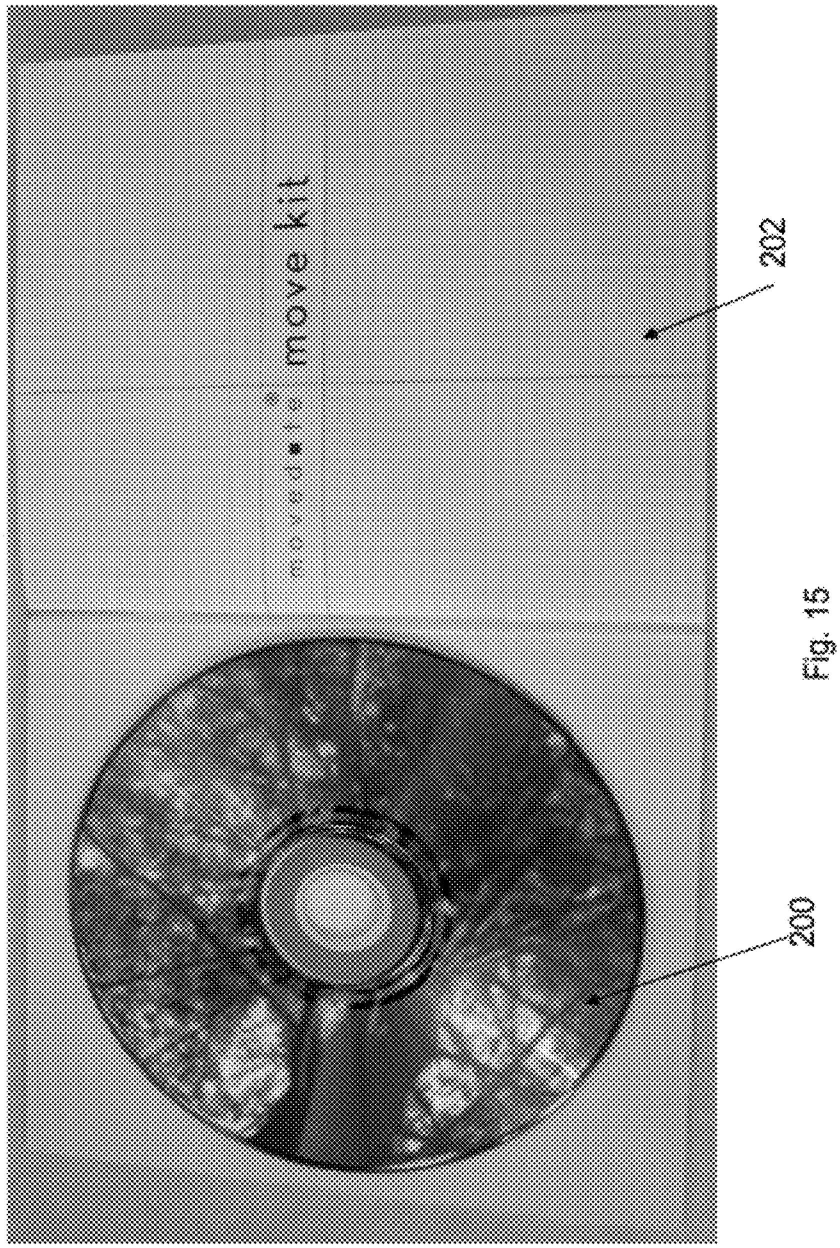
FIG. 15 is a photograph of a "GO" booklet and accompanying CDs.
Figure 16:
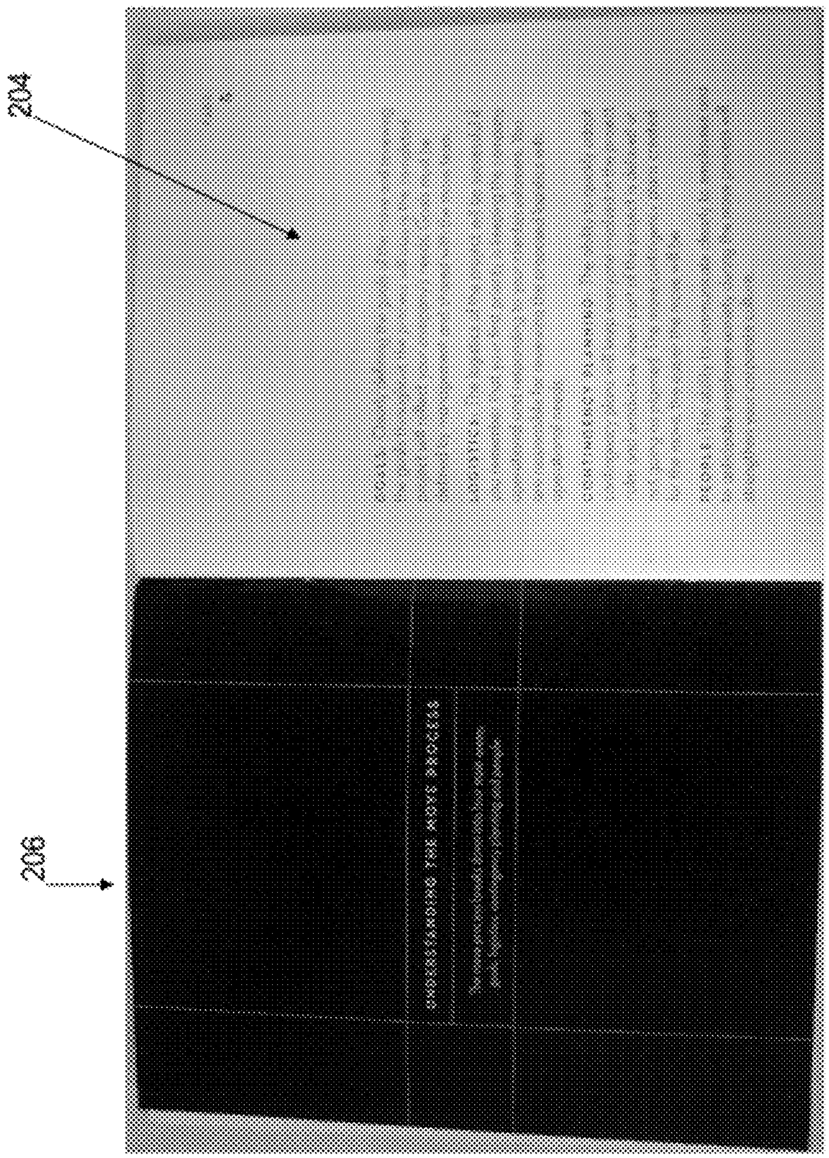
FIG. 16 is a photograph of a section of the "GO" booklet entitled, "Getting Right To Work."

Compartment 192, labeled "PLAY" houses a simple rigid accordion-style foldout 194, shown in FIG. 14, suggesting morale-building activities and ideas for employee informational sessions "PLAY" is a tool that brings employees into the mix. The "PLAY" tool can be used in conjunction with "GO" CD1, "GO" CD2, and the communication tasks included in the "READY" cards. The content of foldout 194 focuses on employee concerns, enhancing communication, obtaining employee buy-in, involving employees in the relocation process, and addressing an important aspect of relocation ignored by many businesses: adaptation to the new environment. The new living environment, the new working environment, and the new community all define a "Sense of Place". Highlighted in fuchsia within the foldout is a single reminder that "Moves, Ultimately, Are About People". In a preferred embodiment, suggestions for team-building activities designed to dissipate anxiety are listed under each of six topics: Communication, Transportation Fair, Art & Memorabilia, Move Coordinators, Brown Bags, and Employee Open House. To the extent that businesses use the recommendations in foldout 194 to implement precautions to smooth individual employee transitions, impact on operational efficiency is minimized.

In a preferred embodiment, compartment 192 labeled "PLAY" also includes office supplies such as a rectangular pad of paper whose color and paper stock matches the color and paper stock of calendar 184. Compartment 196 includes pencils or other writing instruments printed with the kit logo and the signature custom graphics motif used on the inside cover of presentation box 100.

Compartment 117 labeled "GO" contains a compact disk set 200 and a "GO" booklet 202 (FIGS. 15 and 16), packaged similarly to an audio CD set with an extensive booklet of program notes. The CD set 200 has gold matte labels and may be housed in the inside cover of the booklet. "GO" booklet 204 comprises an overview followed by four sections, entitled, "Understanding the Move Process", "Getting Right to Work," "Stories," and "Tips and Tricks." The first section, entitled "Understanding the Move Process" explains the four main areas of the move process: goals, logistics, contingency planning, and people. The second section, "Getting Right to Work" 206 encourages clients to evaluate the present status and information, and begin planning by identifying objectives and goals. "Getting Right to Work" includes a general checklist, and transitions clients to the interactive compact disk CD1.

CD1, entitled, "Getting Right to Work," contains informational and "how-to" material, useful for evaluating project status, establishing and reviewing goals, organization, and project completion. In a preferred embodiment, a common set of information for each of the 23 categories listed in Table 1 is organized under four headings, "Insight" (evaluate the current status of the process, and use a step-by-step guide), "Need to know" (tips and hints), "Templates and examples" (standard copy for use in creating documents such as contracts, budgets, schedules, and forms), and "White papers" (detailed information on the category topic). Examples of a preferred embodiment include an Employee Move Instruction document, a Request for Proposals (RFP) document to advertise a competitive bid contract to prospective moving companies, a document detailing responsibilities of a Move Coordinator position, and a white paper setting forth special considerations for a large move.

A sample list of white papers that could be provided in a preferred embodiment of the relocation kit is presented in Appendix A, followed by the full text of each of three copyrighted white papers pertaining to a relocation event entitled, "Technology", "Security", and "Furniture Budget." The full text of a sample form, a Request for Proposals (RFP) for use in selecting a moving contractor is presented in Appendix C. In a preferred embodiment, the information layout on CD1 resembles an internet web site, and it could be located on a web site with exclusive client access. CD1, like a web site, includes highlighted items with selectable web links and a selectable index.

CD2 is a "Sense of Place" compact disk, containing information about the new office environment and the destination neighborhood, city, or town. The information included in CD2 provides a look at the new and prepares for changes that will occur in the new environment. Information on CD2 can be used as part of an employee welcome package. CD2 is divided into sections according to Table 2, which sections may be placed on an electronic bulletin board or otherwise accessed via selectable web or intranet links. Designed in outline form, CD2 may be

TABLE 2

Summary of preferred "Sense of Place" information provided in compact disk format.

| Section | Topic | Content |
|---|---|---|
| Section 1 | Saying Goodbye | The place to acknowledge what will no longer be and provide space to say goodbye and get ready for the new. Include: office space; neighborhood; systems; furniture; parking; procedures; logos etc . . . |
| Section 2 | The New Environment-Overview | Introduction to the main aspect of the new Neighborhood, Building, Systems, Policies |
| Section 3 | Vision | Introduction to the new vision -- a step by step procedure beginning with the original goals of the project and concluding with the message to convey to employees. This is where the request for employee buy-in begins. |
| Section 4 | Manifestation | Begins exploring the key elements supporting the vision and concludes with how the vision will be shaped. |
| Section 5 | Furniture | Details and information from furniture dealers or representatives. |
| Section 6 | Architecture and Interiors | Floor plans and information provided by architect or interior designer. Highlights, shared areas, special considerations, lighting and HVAC. |
| Section 7 | The New Environment | What amenities are in the neighborhood? building? office? What is the storage capacity? filing capacity? This section addresses these details as well as: sustainability, files, recycling, parking, food and beverage, opens spaces, special spaces, equipment. |

TABLE 2-continued

| Summary of preferred "Sense of Place" information provided in compact disk format. | | |
|---|---|---|
| Section | Topic | Content |
| Section 8 | Policy and Procedures | How is the new work place different? This section reviews the details of how employees will work in the new space and guides the development of policy and procedures for the new office. |
| Section 9 | How it affects you | A tool to help communicate specific changes and/or introduce to employees new ways of working. |
| Section 10 | Welcome to your new office | Organize the above information to create a strong sense of place. |

customized by a user, consultant or third party vendor, or modified by the move team. The "Stories" section of the "GO" booklet presents a set of example case studies to avoid repeating. It describes unfortunate events and strange employee behaviors experienced in conjunction with office moves, which undermined efficiency or employee morale. Each testimonial highlights the impact of a particular human factor element on the success or failure of an actual business move. Titles include: "The Posters", "Chairs", "Shoes", "The Pack Rat", "Telephone", "Office Furniture", and "Cleaning Out Space." "The Posters" and "Chairs" concern employees' attachments to their furniture and artwork, emphasizing the importance of the "Sense of Place" concept. A true story entitled "Shoes" describes an employee projecting her move-related anxiety. "The Pack Rat" describes how to manage employees' hoarding behaviors. "Telephone" and "Office Furniture" illustrates the importance of contingency planning with real-life examples. Finally, "Cleaning Out Space" anticipates the consequences of not doing so. Full text of the story, "The Posters" is provided as an example in Appendix B. "Stories" can be used as training/discussion materials for a move team training session for awareness, and analysis of how to prevent problematic situations. Consideration of past stories is intended as preparation for goal definition and strategy formation well ahead of operational disruptions; the stories may be reviewed again as needed throughout the process.

The final section of the "GO" booklet, entitled "Tips and Tricks," features lessons learned from previous business moves. Tips and Tricks are categorized under headings such as "Close Watch Necessary", "If Applicable", and "General." For example, one tip in the "General" section states, "Residential dishwashers do not fit in commercial spaces."

Figure 17A:
FIG. 17A is a photograph of a 3-week envelope and sample instructions found within the envelope.
Figure 17B:
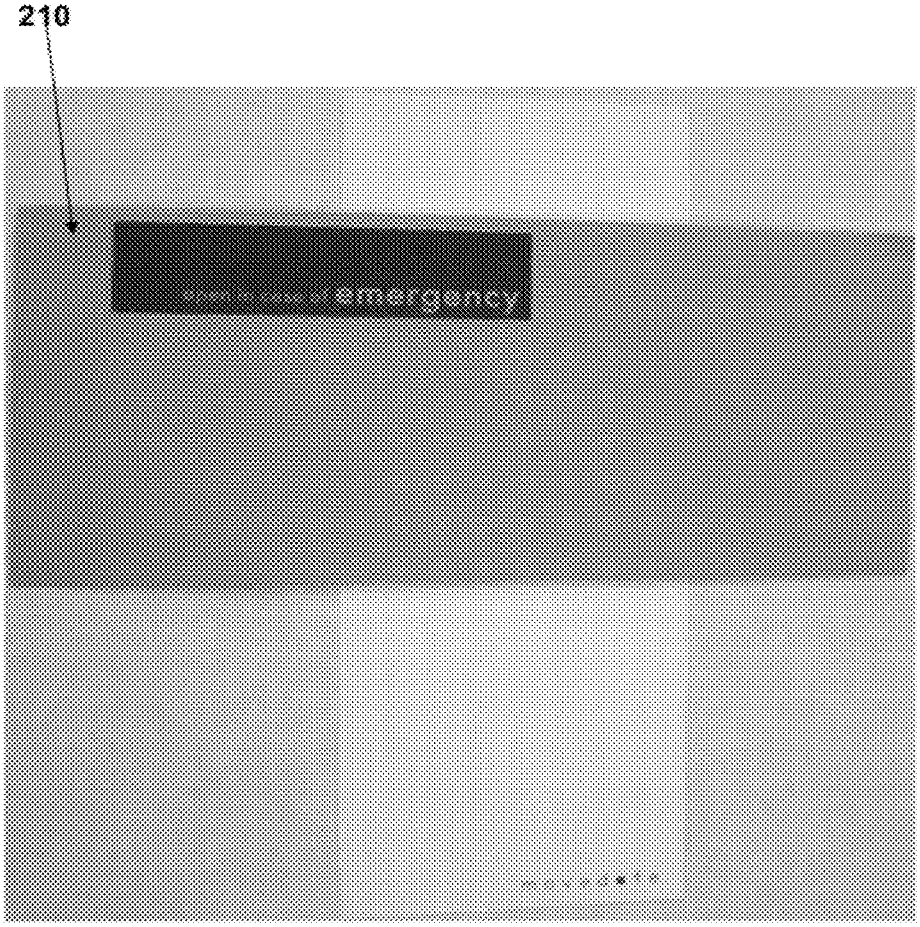
FIG. 17B is a photograph of an emergency envelope and sample instructions found within the envelope.

Underneath calendar 184 is located a pair of sealed "secret envelopes" 210 to be opened by the move manager at key points in the process—three weeks prior to the move date, and in case of an emergency (FIGS. 17A and 17B). Envelopes in the preferred embodiment are light taupe with fuchsia labels and matching light taupe lettering. The three-week envelope contains additional reminders, suggestions, coaching, and strategic instructions to help adjust the move manager's mindset for the next phase of the move process. For example, "Now is the time to talk to your boss and plan to participate in non-move related work immediately after the move." The second envelope, labeled "Open in case of emergency" contains contact information for consulting advice.

TABLE 3

| Summary of information provided in a preferred mobile worker kit | | |
|---|---|---|
| Section | Topic | Content |
| Section 1 | Orientation | A brief orientation booklet and/or CD that directs the employee to what he/she needs to know to get right to work. Information includes IT, telephone, location options, work protocol, corporate policies, sustainability, corporate connectivity, where to find, who to contact. |
| Section 2 | Motivation | System of required connections within the corporation to assure that the employee has everything needed and is successfully working. Topics include: checking in, troubleshooting, meeting goals, where are my peers?, connecting. System includes cards that are two dimensional and/or electronic and items with corporate identity. |
| Section 3 | Inspiration | Includes CD and cards. This section is about maintaining connection with the business after initial set up. The CD includes links to intranet pages for prompt and fluid flow of information. It also offers connectivity to other employees allowing for a sense of community. The cards might include gift cards for coffee/tea; supplies; transportation; intranet access or cards exchangeable for gifts. |

Relocation kit 100 may be customized based on the size or function of the business entity, and based on different change events to be managed. A list of potential versions envisioned by the inventor is included in the table within FIG. 18. One version, an individual worker relocation kit 290, is designed for individual workers who are required by their companies to perform self moves. Individual relocation kit 290 is similar to, but smaller than, relocation kit 100 intended for relocation managers and their teams. Individual relocation kit 290 is represented in FIG. 19, in which a preferred embodiment includes a set of two to ten cards 292; envelopes 294 containing instructions to be executed before, during, and after a move; a version 296 of CD2 containing move destination information and associated web links; a version 298 of CD1 tailored for individual workers including lists of contacts, checklists, file/record storage information, answers to frequently-asked questions, intranet web links, self-move instructions, and a post-move evaluation form. An example of one of the elements on CD1, the file/record storage information, is presented in Appendix D.

Figure 20:
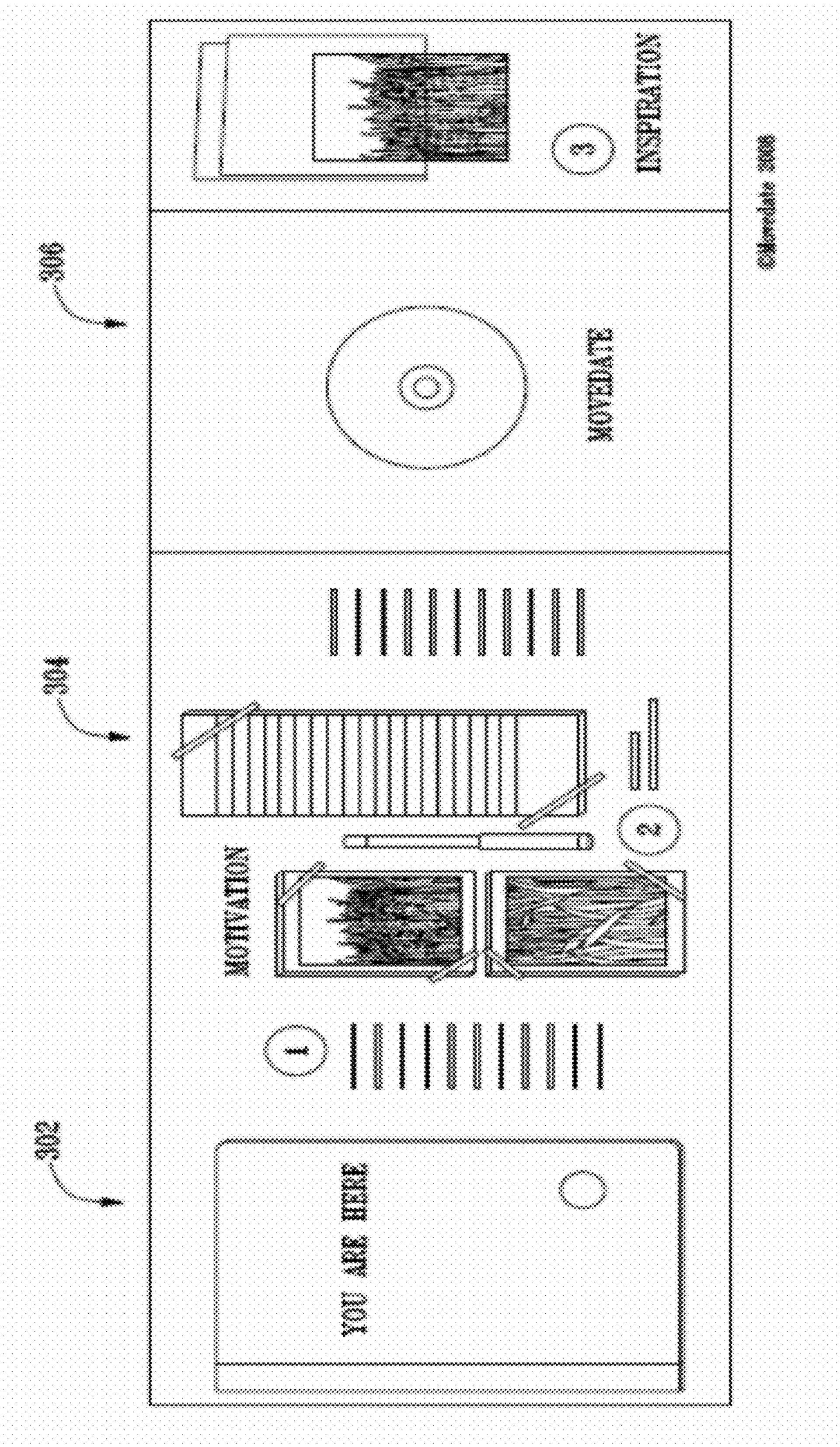
FIG. 20 is a graphic image of a preferred embodiment of the contents of a mobile worker kit.

A companion version of relocation kit 100, configured for an individual mobile employee, is represented by a graphic image of a mobile worker kit 300 shown in FIG. 20. Mobile workers include both corporate employees and contractors. Mobile worker kit 300 may be used in conjunction with either relocation kit 100 or individual relocation kit 290, but it also has multiple uses separate from the relocation kit. The mobile worker kit is designed for individual employees who are, for example, telecommuting, working as flexible (hoteling) workers, are on temporary duty at a particular location. The mobile worker kit is divided into three primary sections according to Table 3: orientation 302, motivation 304, and inspiration 306.

Figure 21:
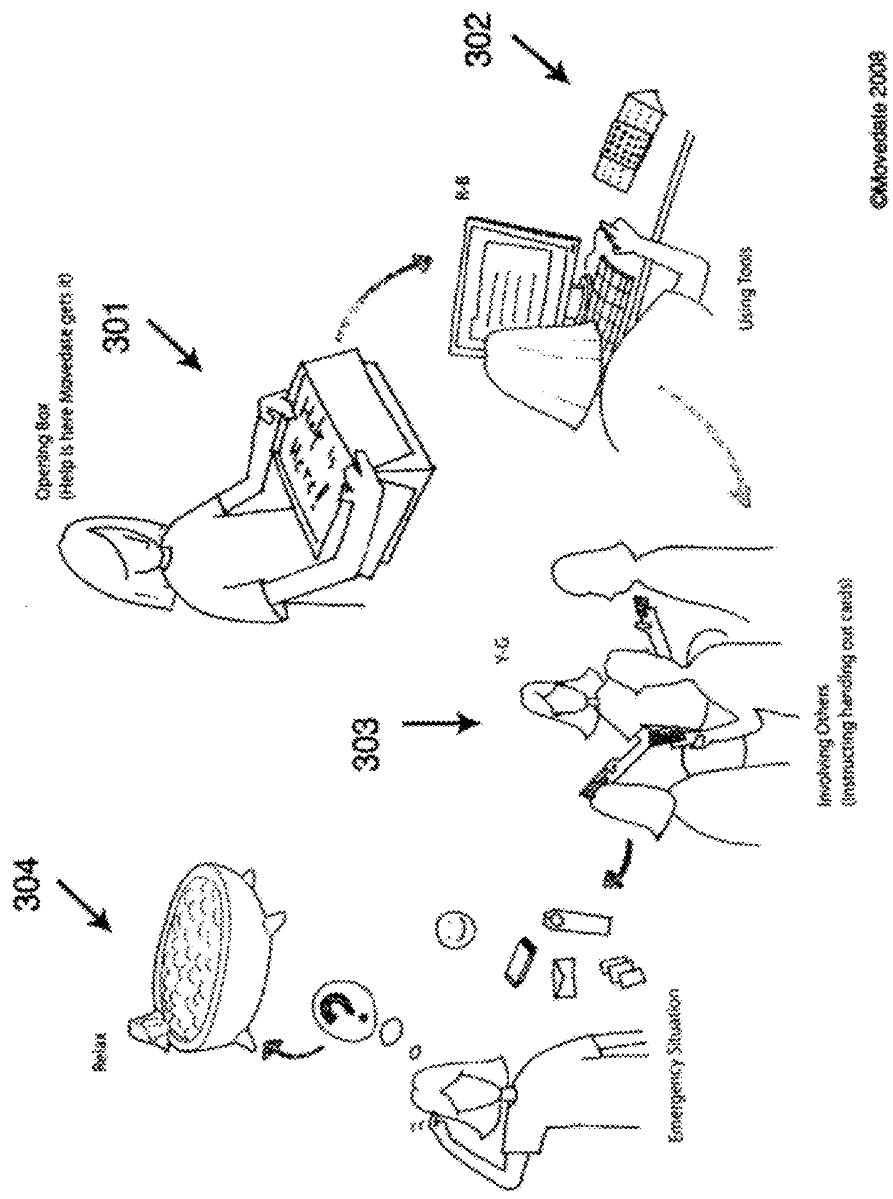
FIG. 21 is a sketch describing how use of a change management kit fosters organizational and individual well-being.

FIG. 21 is a summary graphic, or "360-degree scenario," providing a synopsis of positive effects that the disclosed methodology and relocation kit 100 may have on individuals experiencing a relocation: the graphic depicts use of the kit translating into a cycle of productive interactions by providing a gift of help 310 to defuse stress, a collection 312 of useful task-oriented tools, a teamwork game 313 facilitating communication and collaboration, and a management tool 314 that inspires the team leader to maintain a sense of confidence and control in a crisis.

Figure 22A:
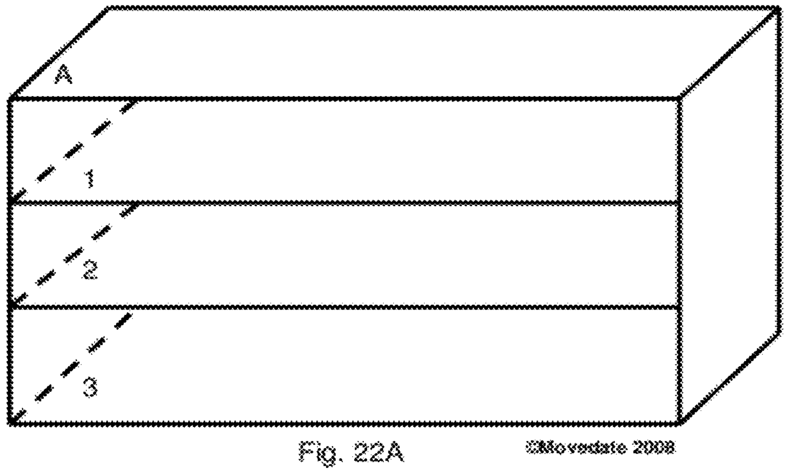
FIGS. 22A-22F are line drawings representing different types of filing systems.
Figure 22B:
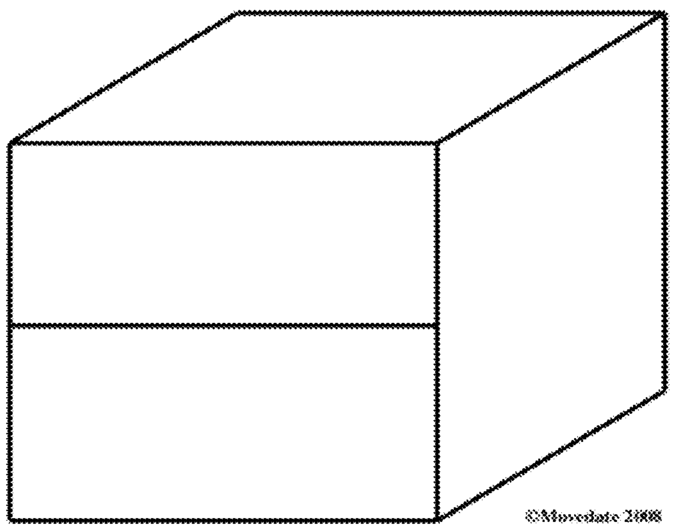
Figure 22C:
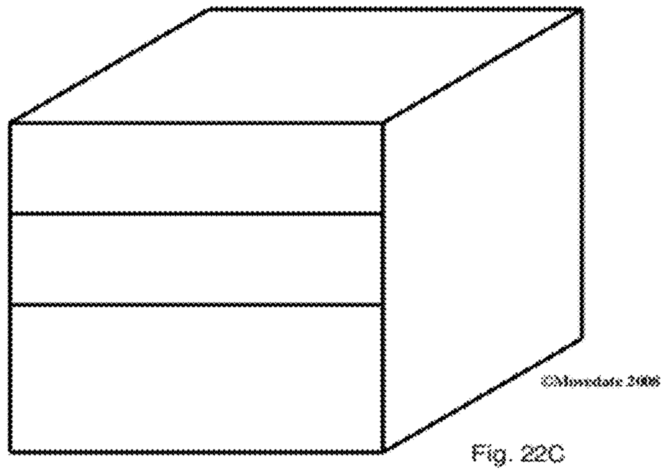
Figure 22D:
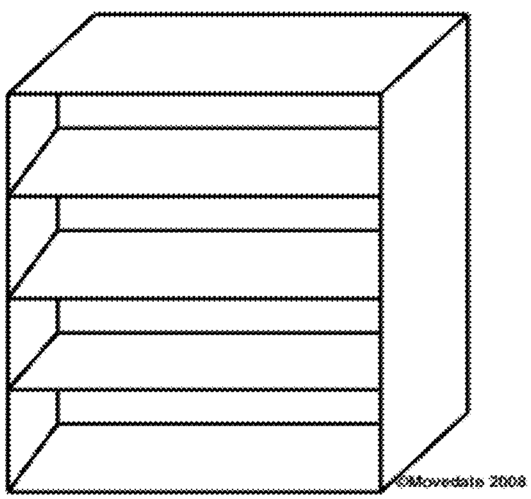
Figure 22E:
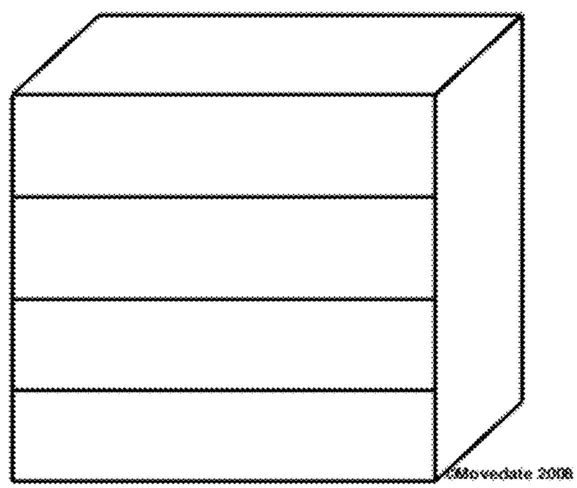
Figure 22F:

Smooth relocation of files is especially important to a seamless move for business such as a medical office, which requires continuous access to patient files, or a legal practice which requires continuous access to case files. A set of six sample file diagrams, FIGS. 22A-22F accompanying information in Appendix D, provide an example of a unique tool included on "GO" CD1 to aid in advance planning for file storage needs. Such diagrams may be presented to an employee to show what facilities are available at the destination of an office move so they can plan accordingly. FIG. 22A shows a lettering and numbering scheme for charting destination file locations ahead of a move event. Files are then similarly identified with their destination location, and thus can be placed in the correct order and location immediately upon arrival at the new facility. FIGS. 22B-22F are a set of specific file storage receptacles with dimensions indicating their capacities.

It will be obvious to those having skill in the art that many changes may be made to the details of the above-described embodiments without departing from the underlying principles of the invention.

Appendix A

List of White Papers with Examples

Sample List of White Papers

Corporate Relocations
Setting Up a Satellite Office
Schedules
Budgets
Furniture Budget
Selecting an Architect
Interior Design
Responsibilities of Consultants
Technology
Office Protocols
The Importance of Employee Communication
Selecting Furniture
Security
Optimizing Your Vendors
The Importance of Employee Communication
Special Considerations for a Large Move

I. Furniture Budget

The furniture budget is one of the most flexible of the separate budgets in the General Relocation Budget. Whatever is originally allocated to furniture can be amended upward or downward as more information about the fixed costs of construction and technology become clear. Before putting together a furniture budget it is important to evaluate both your existing furniture and the furniture requirements for the new facility. This will enable you to assess furniture to be purchased and existing furniture to be moved.

All furniture will fall into one of two categories: furniture necessary for the business to function and furniture that will establish the corporate image. Corporate priorities and move goals will influence how the furniture budget is allocated.

Functional furniture includes:

Furniture needed
- by employees to perform tasks
- to support equipment

Furniture for establishing a corporate image includes:
- Public spaces:
- Reception
- Conference/Boardroom Evaluating Furniture The Furniture Program establishes the furniture required for the new location. An Existing Furniture Inventory identifies furniture that can be reused in the new location. Using these tools, determine the furniture items that will be reused and moved and those that will be purchased new.

New Furniture

New furniture can be either factory new or pre-owned. When budgeting for factory new furniture, list pricing might be adjusted by 20% to 75% depending on the volume ordered and the manufacturer. Pre-owned furniture can be purchased by a used office furniture dealer "as is" or refurbished. Pre-owned furniture might also be purchased from another company that is relocating or downsizing.

Consider the delivery and installation costs when budgeting for new furniture.

Existing Furniture

All existing furniture moved into a new location will appear older, dirtier and in worse condition than in your existing space. For budget purposes, consider having the furniture cleaned and/or refinished. Also include the costs of deinstallation, moving and installation.

Consider the soft costs of potential longer downtime during the actual move when using existing furniture.

II. Security

The security system and security procedures differ during the construction phase, the move-in phase, and after move-in. Begin to develop the permanent security system at the start of the project. At the same time, security during the transitional stages, construction and move-in phases needs to be taken into consideration.

Security During Transition

Security during transition includes the security of the premises from the beginning of construction until the move-in phase is completed.

Construction Phase

The contractor is responsible for the safety and security of the construction site, all subcontractors and all materials until the space is turned over. A sign-in/sign-out sheet or temporary ID badges for your team and for consultants, as well as scheduling of special site visits, can be discussed at the construction kickoff meeting.

Review with the contractor how they are going to secure the site with regard to:
- Perimeter
- During construction working hours:

Secure site with limited and/or controlled access points that provide:
- Access for deliveries and waste management
- Access procedures for other consultants
- Access procedures for your staff
- Access procedures for special visits After construction hours:
- Secure site with procedures in place for:
- Off-hour visits by you or your staff
- An established contact in case of a security breach Interior
- Establish areas for material storage
- Protection of finished areas Move-In Phase As the construction winds down and the contractor is getting ready to turn the space over, there is often a period of time in which both you and the contractor need to share the space in order to meet your move-in deadline. The move-in phase is broken out into two distinct areas: sharing the building with the contractor when the contractor has not yet turned over the building, and sharing after the building has been turned over.

Sharing the Building

Technically, until the contractor turns the building over, building security is the contractor's responsibility. Often there is a need to begin delivery and fit up of your furniture and fixtures before actual possession takes place. Discussion of agreed-upon procedures to handle this phase must occur prior to bringing equipment into the building.

Items Subject to Early Arrival

For everything brought on-site, security procedures need to be defined. General procedures can be established for access to space, freight elevator use and loading dock coordination. Guidelines need to be set to determine how to assess responsibility for damage or theft. Specific procedures need to be established when locked rooms are required and completed projects are in open areas.

Please review the following list of items often required to be on-site before the contractor has left:

- Technology
- New computer racking
- New servers
- New UPS
- New telephone systems
- Telephone and data termination equipment Furniture New systems furniture Custom-case goods that are not part of the construction contract Security During Move-In Phase Once the contractor has turned over the building, the tenant is responsible for security. The permanent security system may or may not be fully functioning at this time. Regardless of the status of the permanent system, security for the move needs to be tailored for move-in activities.

Move-In Phase

During the move-in process, at a minimum there will be movers, employees and technology staff on-site. Furniture and other vendors, consultants and contractors working on punch-list items may also need to be on-site. Deliveries to the new space will begin.

Minimum security to the premises includes:

- Limited access to the loading dock and one designated entry
- Uniforms for movers
- Sign-in and sign-out sheets for all workmen and visitors on the premises
- Identification by uniform, ID badges or colored t-shirts to allow those working to identify others without having to question their authority
- Locked door off the construction master with a move-in cylinder or temporary move-in code to increase security during and after the move-in phase
- Established lock-down procedures Permanent Security Permanent security includes planning, installing and enabling new security systems for the premises and for your technology. Evaluate your present security system.

Consider:

- Suppliers
- System currently installed
- Current vendor(s) or provider(s)
- Landlord-provided building security
- Main public entry security, including hours of operation, means of control and access outside of business hours Perimeter Security:

- Employee entry and exit
- Employee identification, tracking and means of access
- Surveillance
- Fire exit security
- Parking area security
- Loading bay security
- Notification procedures for security breaches Internal Security:

- Number and location of locked rooms and offices
- Security of storage areas, AV room, supply rooms
- Location and use of safes and vaults
- Security in special departments, e.g. human resources, accounting
- Employee identification/passes and procedures for issuing, returning or reporting lost keys or cards Technology Security:

- Firewalls
- Passwords
- Security of computer room and telephone closets

If you are satisfied with your current security system(s) provider(s), and/or have an ongoing contract with the provider(s) for services, have the provider(s) evaluate your new premises and design a new system for you.

Alternatively, you may wish to hire a security consultant to advise you on new security technology and systems, or have a number of security firms offer evaluations and bids.

III. Technology

Technology is the single most important element of a relocation. Everything else is dependent upon incorporating technology criteria early in the planning stages and keeping it in the loop throughout the process. Technology includes all data, telephone and AV equipment included in the project.

Evaluate your technology; understand the infrastructure of the new building; identify the type of equipment to be installed in the new location; determine the locations for key equipment; coordinate, coordinate, coordinate. Coordinate technology with the building infrastructure and construction.

Evaluate Current Technology

Evaluate your current technology. Is it state-of-the art, future-forward or conventional, market-tested product? Check the technology department's plans for scheduled upgrades or changes to hardware and/or software. Determine the responsible person for telephone/voicemail, data/IT and AV. Don't forget to include faxes and copiers. Evaluate in-house expertise and decide on the consultants needed to design the systems:

- Network system
- Wiring
- Server room plan
- Telephone
- AV

Infrastructure

The infrastructure of the new location—plumbing, mechanical and electrical systems—will have an effect on technology design. In addition, options for fire safety in the server room and HVAC for both the server room and telephone closets should be explored early. Areas to consider include:

- Server room
- Location
- Ceiling height
- Infrastructure in the ceiling
- Telephone Closets
- Location
- Wiring
- Access
- Floor or Ceiling
- Plenum
- Need for plenum rated cable
- Conduit Type of equipment Determine the type of equipment to be used in the new building at move-in and for the anticipated duration of occupancy as it will affect the planning. Although technology equipment needs to be independently programmed, the equipment requirements must be incorporated into the main program. Again, it is important to coordinate all changes in relation to their impact on technology.

The type of equipment to take into consideration includes:
- Network system
- Servers
- Switches
- Racks
- Computers
- Printers
- Copiers
- Telephones
- Switch (es)
- Reception console
- Handsets
- Special Areas
- Conference rooms
- Call Centers/Customer Service
- AV
- Plasma screens
- Teleconferencing equipment
- Speakers
- Sound system
- Wired tables or podiums Faxes/Copiers Paging System Location of equipment The location of each piece of equipment needs to be identified as early in the process as possible. When placing equipment consider:
- Heat load
- 24-hour HVAC requirements
- Space required for use and for service
- Connections
- Network
- Telephone Electrical Changes will occur throughout the relocation process. When others initiate the change, consider the effect on the designated location of equipment and systems. In addition, there will be changes originating from technology, which must be coordinated with engineering, construction and architecture.

Coordination

Coordination is essential throughout the project so that technology needs are always considered. It is common for technology to be overlooked when reviewing the final construction documents or field changes on a project.

If the workplace is to be efficiently wired within budget, the engineer must interface with the technology team and review plumbing, mechanical, electrical and fire sprinkler with network wiring and the paging system to avoid conflicts. Any changes need to be evaluated for the impact on all systems.

The low voltage network wiring should be considered when reviewing the construction schedule. All too often the contractor does not want the low-voltage work interfering with the construction schedule or disrupting the subcontractors. Discussing how to best to schedule the work at the beginning of the project will eliminate finger-pointing and possibly realize cost savings.

Coordination is also required with the furniture selections: conference tables for speaker phones, electrical and data connections; smartboard locations for outlets and network jacks.

Other items include:

Systems Furniture for:
- connections
- number of network jacks and electrical outlets
- wire management Office furniture:
- grommets
- wire management
- location of network jacks and electrical outlets with furniture location If applicable, coordinate with building management to review availability and location of telephone service connections and/or approval of your service decisions.

Appendix B

Example Story

"The Posters"

At the end of a move of a prestigious law firm we couldn't locate three posters a senior associate had hanging in his office. He remembered tagging the glass with his tags before going on vacation the week of the move. Both the mover and the move coordinator remembered the tagged posters and remembered placing them on the cart to move. Where they went was an absolute puzzle. Three weeks after the move we were in the process of determining a claim when the senior associate announced that he located his posters. They were hanging in the office of a junior partner on another floor. The senior associate was puzzled because the posters were inexpensive and could have been purchased framed at a number of poster shops for about $100.00 each. Delicately, we asked the junior partner where he got the posters and if they could possibly belong to the senior associate. His reply was simple and very revealing: "I passed the posters on my way to my office for five years. We are in different departments on different floors and I wouldn't have an opportunity to see them every day so I switched tags and hung them in my office."

Appendix C

Sample Form

RFP for Moving Company

Request for Proposal for Move Services for __________

The information you are about to read is confidential. Move dates have not been announced. By responding to this Request for Proposal you have agreed to keep all information confidential.

We request you provide answers to the following RFP no later than __________ to:

E-mailed responses are accepted on __________ only. Please do not e-mail responses earlier.

Please answer all questions in the order and format with which they appear. Your answers will be deemed confidential and used internally for __________ mover evaluation only. Please forward any questions by e-mail to __________.

The move will begin the week of __________. We anticipate the move to be complete by __________. The location of the new facility, destination, is __________ the location we will be moving out of are __________, origin, unless otherwise noted.

Security

This is a high security project. All movers are required to be in uniform through out the move. Movers who are not in uniform will not be allowed on the project. All movers will be required to sign in at each location. Drivers will identify themselves to security at each loading dock. Drivers will be required to sign in upon entering the facility.

Staff

We require two lead people, one at origin, and one at destination, to be consistent throughout the project. We request that the staff remain consistent throughout the project. It is important to maintain teamwork and morale. We anticipate working evenings and weekends. We are flexible and approve of having __________ long as they are consistent throughout the project.

General Guidelines

Systems furniture will be torn down, staged and reinstalled by others. It is the responsibility of the Mover to move systems furniture to destination. The Mover will be required to attend furniture coordination meetings.

The Computer Room will be moved by __________. The Mover will be required to attend Computer Room coordination meetings.

Desk top PC's, Printers and laptops will be prepared by others. They will be turned off, disconnected and cabling will be placed in bags (supplied by Mover). The Mover will place PC's on carts and shrink wrapped.

PC's are a priority item and will require a specific team and small truck to guarantee our time restraints. This work to be done by full time experienced employees only. A minimum of one full time experienced employee for every two temporary employees through out the project.

Provide carts as needed for __________ approximately one month after move. This is in addition to carts required for actual move.

Mover will be responsible for numbering the new building with move numbers identified from the move plan designed by __________

Mover is responsible for protecting the building including but not limited to padding the elevator, corner boards, and Masonite on the floor.

Mover will take down whiteboards and bulletin boards, which are tagged. Movers are not required to reinstall the boards.

All public artwork will be taken down by others, the Mover will be required to pack and move all public artwork.

Employees are responsible for all personal belongings, including artwork, knick-knacks, and radios.

Plants will be moved by others.

Shelving plans will be provided and shelves will be tagged.

New Building Loading Docks and Elevator Access

Existing Building Loading Docks and Elevator Access

The loading dock and elevators will be available to the Mover in accordance with the schedule we create.

Pre and Post Moves

In order to accommodate the work schedule of __________ we will be scheduling pre and post moves. Our objective remains for each employee to have access to all materials needed to perform his or her work throughout the move process.

Main Move

After Move

Activities after the move at the new location, will include shifting of furniture, collecting boxes and equipment.

Schedule (preliminary schedule for bidding purposes)

Response Sheet

Name of proposed lead people __________

__________

List names of proposed crews and years of employment:

Describe security clearance of the proposed crew.

Hourly fee per lead person __________

Hourly fee per mover __________

Hourly fee per truck and one driver __________

Number and type of trucks proposed for this project:

Evenings:

Weekends:

Proposed number of hours driving time:

From Mover office to job site:

From Origin to Destination:

Cost of packing __________:

Cost of unpacking __________:

Number of cartons required:

Cost per carton: Cost after return:

Number of equipment carts to be used:

Number of carts available to use for staging:

Number of totes available to use for staging:

Number of special boxes required:

Cost per special box:

Estimate of total labor and truck expense:

Estimate of total material expense:

Approximate schedule including day, hours and manpower required to complete this project in a professional and cost efficient manner.

Comments or restrictions to your bid:

Appendix D

Sample Component of an Employee Relocation Kit Detailing File and Record Storage Information for Use at the Move Destination Individual Filing Capacity Workstation A 1 File/file—2 drawers total 44" front to back style 1 Mobile—2 small drawers, 1 file drawer 22" front to back style 1 4-shelf high storage cabinet approximately 32" per shelf 1 4-drawer lateral file total 136" side to side style 2 48" overheads total 90" of shelf space 1 Pencil drawer In order to prepare for your new workstation please use the attached sheets to organize your files.

1. Each sheet represents a piece of furniture in your workstation.
2. Use of the sheets to plan your new workstation.
3. Examine your current work environment. Consider the files currently in your work area that are designated for departmental files.
4. Anticipate the flow of files and storage through the year(s).
5. Remember to leave room for future expansion.
6. If your files and shelving requirements exceed the space provided please see your move coordinator.

Appendix E

Sample Information on the Category Topic "Files" as Provided in go CD1

CD 1

Sample

Files

Insight: Paper files vs. digital files; individual files vs. department or shared files; off sight files; file retention policy; business culture vs. business needs; Accounting; HR.

1. Questions:
   A) Is the file retention policy up to date? Are there different policies for different departments?

B) Is the office moving toward digital files?

1) Who is responsible for initiating the conversation?

2) Who participates in the decision process?

3) Who is responsible for the conversion?

4) Will the conversion coincide with the move?

C) How much filing capacity does the individual need at hand? How much filing capacity is department related or shared by departments?

D) What is the capacity of the off site storage? Does it need to be relocated? Is it economical to digitalize?

E) How is the current file capacity distributed?

F) Do employees keep duplicate copies at their desks?

G) Are you introducing new file standards?

H) How will mobile workers access their files?

I) How many files are confidential?

J) What exceptions need to be made in the new file policy for Accounting and HR?

K) How are the new file policies going to be communicated?

L) Who will be responsible for addressing "problem" situations?

2. Find out who is responsible for the file retention policy (typically the legal department) and confirm that it is up to date. Distribute policy to department heads for review.

3. Determine what files will be digital and which will remain paper.

4. Determine how to calculate department file needs and individual file needs. Question how frequently files are accessed. Question if there are duplicate files.

5. Determine how many "needed" file cabinets are used for extra supplies or personal items. Take these files out of the file calculation but use when determining storage needs and supply policy. Communicate information to people determining supply storage and department storage.

6. Determine whether new or existing files will be used. If using existing files take an inventory for size, style and color in order to match files at each location.

7. Determine how to distribute department files.

8. Review special needs of Accounting and HR departments. Determine floor load of fire files if necessary.

9. Determine storage location, distribution and access to files used by mobile workers. Have this incorporated into the mobile work policy.

10. Establish policy to present to Managers regarding department and individual files.

11. Establish guidelines for file "exceptions".

12. Coordinate all file related communications for consistency with file policy and the move communication process.

Need to Know:

File location can be determined by access requirements:

Are the files accessed multiple times a day? Locate near employees.

Once a day or more than one time a week? Locate in department area on the same floor as employees.

Once a week or multiple times a month? Recommend keeping files on premises if possible; can be in a centralized location.

Files accessed once a month or once a year can go to off site storage.

Legal requirements:

Are there files that need to remain on site for legal reasons? These files can go to a centralized location.

Are there legal requirements to maintain other files for a specific duration? These files can often be stored off site.

The floor under fire files might need to be reinforced.

Existing files can be electrostatic painted to match.

Employees are often attached to files that they do not use.

If ordering new files remember to include file bars for the appropriate style of filing.

Packing with knowledge of the new file system will allow for an easier transition to the new and will allow maximum purging to take place at the existing location.

After the retention policy has been distributed, set up a few purge days complete with large bins and extra shred-it boxes (or consider a shred-it truck) prior to the move.

Files can be moved so that employees have access to their files through out the move process.

Files can often be part of the pre move.

The invention claimed is:

1. A project management system for managing a change event within a business entity, the system comprising:

a plurality of system elements, including (a) a time management device integrated with a list of certain tasks for facilitating tracking of task progress, (b) a first group of handheld cards, each card displaying to a user in readable form (i) a task category and a group of related tasks, (ii) a time reference indicator indicating approximate time to commence the group of tasks, (iii) for each task, an indicator of an approximate amount of time commitment needed for completion of the task by the user, (c) a first compilation of information about a prescribed set of categories, including document templates, procedures, and instructions for use in managing the change event, and (d) a second compilation of information about a new environment existing after completion of the change event, the second compilation of information providing a sense of place associated with experiencing the new environment; and a physical presentation container grouping the system elements therewithin, wherein the system is assembled in the form of a kit.

2. The system of claim 1, further comprising a collection of suggestions for team-building activities.

3. The system of claim 1, wherein the kit is operative to aid a team whose members are employees or contractors of the business entity.

4. The system of claim 1, further comprising office supplies.

5. The system of claim 1, further comprising a chronicle of examples selected from the group consisting of: observations of employee behaviors in response to change events.

6. The system of claim 1, in which the first compilation of information and the second compilation of information are provided in an electronic form such as a compact disk (CD) or other memory device, or a computer memory located at a remote site that is accessible via connection through an electronic network.

7. The system of claim 1, in which the change event to be managed is an office move.

8. The system of claim 1, in which the presentation container is a compartmentalized box.

9. The system of claim 1, in which the time management device is constructed and arranged in the form of a calendar.

10. The system of claim 1, in which the group of cards is constructed and arranged to assist in managing task ownership, task scheduling, time management of individuals responsible for tasks, and coordination among team members.

11. The system of claim 1, in which at least some system elements are embossed with stylized, matching graphics.

12. The system of claim 11, in which the stylized, matching graphics include colors, fonts, and motifs intended to reduce anxiety and to evoke a sense of enjoyment while managing the change event.

13. The system of claim 1 further comprising a set of category cards relating tasks by subject category coordinated with the categories in the first and second compilations, each card displaying (a) a subject category, (b) a time reference indicator prior to the change event, (c) a list of tasks, and (d) for each task, an estimate of the time required to do the task by the user.

14. The system of claim 1 wherein the time reference indicator illustrates how many days prior to completion of the change event that the tasks should be completed.

* * * * *